US006819025B2

(12) United States Patent
Egawa et al.

(10) Patent No.: US 6,819,025 B2
(45) Date of Patent: Nov. 16, 2004

(54) CORE OF ROTATION APPARATUS, METHOD FOR MANUFACTURING CORE, AND ROTATION APPARATUS

(75) Inventors: Kaname Egawa, Toyohashi (JP); Toshio Yamamoto, Kosai (JP); Keiichi Uemura, Kariya (JP); Yasuhiro Toyama, Toyohashi (JP); Shinji Santo, Toyohashi (JP); Yoshiyuki Takabe, Hamamatsu (JP); Takahiro Nakayama, Hamakita (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 0 days.

(21) Appl. No.: 10/087,036

(22) Filed: Feb. 28, 2002

(65) Prior Publication Data

US 2002/0121831 A1 Sep. 5, 2002

(30) Foreign Application Priority Data

Mar. 2, 2001 (JP) .......................... 2001-058567
Dec. 25, 2001 (JP) .......................... 2001-392482

(51) Int. Cl.<sup>7</sup> ............................................... H02K 1/00
(52) U.S. Cl. ....................... 310/216; 310/261; 310/233; 310/218
(58) Field of Search .............................. 310/216–218, 310/233–234, 261, 267

(56) References Cited

U.S. PATENT DOCUMENTS 4,246,505 A * 1/1981 Yasaka et al. .............. 310/218
5,003,208 A * 3/1991 Hama et al. ............... 310/68 C
5,982,055 A * 11/1999 Matsushita et al. ... 310/40 MM
6,700,295 B2 * 3/2004 Kanno et al. ................ 310/261
2003/0030345 A1 * 2/2003 Enomoto et al. ........... 310/216

FOREIGN PATENT DOCUMENTS

| JP | 55-125069 | 9/1980 | .......... H02K/23/54 |
| JP | 55-147964 | 11/1980 | .......... H02K/23/58 |
| JP | 60128840 | 7/1985 | ............ H02K/1/24 |
| JP | 63-187545 | 12/1988 | ............ H02K/1/18 |
| JP | 09-46941 | 2/1997 | ............ H02K/1/18 |
| JP | 09-191588 | 7/1997 | ............ H02K/1/18 |
| JP | 10-004640 | 1/1998 | ............ H02K/1/12 |
| JP | 10-174403 | 6/1998 | .......... H02K/23/32 |
| JP | 10341562 | 12/1998 | .......... H02K/23/00 |
| JP | 11-252843 | 9/1999 | ............ H02K/3/18 |
| JP | 11-341755 | 12/1999 | ........... H02K/15/09 |
| JP | 2001275327 | 10/2001 | .......... H02K/23/26 |

* cited by examiner

*Primary Examiner*—Thanh Lam
(74) *Attorney, Agent, or Firm*—Synnestvedt & Lechner LLP

(57) ABSTRACT

A motor includes a stator having magnets, a rotor having teeth, a commutator secured to the rotor, and brushes. A coil is wound about each tooth. The commutator is connected to the coils. The brushes slidably contact the commutator. The number of the magnets and the number of the teeth are determined such that the resultant of torque vectors that act on the teeth is zero. For example, the number of the magnet is six, and the number of the teeth is eight. As a result, the rotor is prevented from vibrating.

9 Claims, 56 Drawing Sheets

| | | | \multicolumn{8}{c}{n} | | | | | | | |
|---|---|---|---|---|---|---|---|---|---|---|
| | | | 3 | 4 | 5 | 6 | 7 | 8 | 9 | 10 |
| 2m | 2 | K | 0.866 | 0.707 | 0.588 | 0.500 | 0.434 | 0.383 | 0.342 | 0.309 |
| | 2 | TF | 0.866 | 0.000 | 0.363 | 0.000 | 0.241 | 0.000 | 0.182 | 0.000 |
| | 2 | NF | 0.500 | 0.000 | 1.118 | 0.000 | 0.945 | 0.000 | 1.032 | 0.000 |
| | 2 | H | 6 | 4 | 10 | 6 | 14 | 8 | 18 | 10 |
| | 4 | K | 0.866 | | 0.951 | 0.866 | 0.782 | 0.707 | 0.643 | 0.588 |
| | 4 | TF | 0.866 | | 1.176 | 0.000 | 0.386 | 0.000 | 0.446 | 0.000 |
| | 4 | NF | 0.500 | | 0.000 | 0.000 | 1.247 | 0.000 | 1.347 | 0.000 |
| | 4 | H | 12 | | 20 | 12 | 28 | 8 | 36 | 20 |
| | 6 | K | | 0.707 | 0.951 | | 0.975 | 0.924 | 0.866 | 0.809 |
| | 6 | TF | | 0.000 | 1.176 | | 1.564 | 0.000 | 0.000 | 0.000 |
| | 6 | NF | | 0.000 | 0.000 | | 0.445 | 0.000 | 0.000 | 0.000 |
| | 6 | H | | 12 | 30 | | 42 | 24 | 18 | 30 |
| | 8 | K | | | 0.588 | 0.866 | 0.975 | | 0.985 | 0.951 |
| | 8 | TF | | | 0.363 | 0.000 | 1.564 | | 1.970 | 0.000 |
| | 8 | NF | | | 1.118 | 0.000 | 0.445 | | 0.879 | 0.000 |
| | 8 | H | | | 40 | 24 | 56 | | 72 | 40 |
| | 10 | K | | | | 0.500 | 0.782 | 0.924 | 0.985 | |
| | 10 | TF | | | | 0.000 | 0.386 | 0.000 | 1.970 | |
| | 10 | NF | | | | 0.000 | 1.247 | 0.000 | 0.879 | |
| | 10 | H | | | | 30 | 70 | 40 | 90 | |
| | 12 | K | | | | | 0.434 | 0.707 | 0.866 | 0.951 |
| | 12 | TF | | | | | 0.241 | 0.000 | 0.000 | 0.000 |
| | 12 | NF | | | | | 0.945 | 0.000 | 0.000 | 0.000 |
| | 12 | H | | | | | 84 | 24 | 36 | 60 |
| | 14 | K | 0.866 | | | | | 0.383 | 0.643 | 0.809 |
| | 14 | TF | 0.866 | | | | | 0.000 | 0.446 | 0.000 |
| | 14 | NF | 0.500 | | | | | 0.000 | 1.347 | 0.000 |
| | 14 | H | 42 | | | | | 56 | 126 | 70 |
| | 16 | K | 0.866 | | | | | | 0.342 | 0.588 |
| | 16 | TF | 0.866 | | | | | | 0.182 | 0.000 |
| | 16 | NF | 0.500 | | | | | | 1.032 | 0.000 |
| | 16 | H | 48 | | | | | | 144 | 80 |
| | 18 | K | | 0.707 | | | | | | 0.309 |
| | 18 | TF | | 0.000 | | | | | | 0.000 |
| | 18 | NF | | 0.000 | | | | | | 0.000 |
| | 18 | H | | 36 | | | | | | 90 |
| | 20 | K | | | | | | | | |
| | 20 | TF | | | | | | | | |
| | 20 | NF | | | | | | | | |
| | 20 | H | | | | | | | | |
| | 22 | K | | 0.707 | 0.588 | | | | | |
| | 22 | TF | | 0.000 | 0.363 | | | | | |
| | 22 | NF | | 0.000 | 1.118 | | | | | |
| | 22 | H | | 44 | 110 | | | | | |
| | 24 | K | | | 0.951 | | | | | |
| | 24 | TF | | | 1.176 | | | | | |
| | 24 | NF | | | 0.000 | | | | | |
| | 24 | H | | | 120 | | | | | |

Radial Force Exists   Nonfunctioning as Motor

Fig.8

| | | | \|n| | | | | | |
|---|---|---|---|---|---|---|---|---|---|
| | | | 19 | 20 | 21 | 22 | 23 | 24 | 25 |
| 2m | 2 | K | 0.165 | 0.156 | 0.149 | 0.142 | 0.136 | 0.131 | 0.125 |
| | 2 | TF | 0.083 | 0.000 | 0.075 | 0.000 | 0.069 | 0.000 | 0.063 |
| | 2 | NF | 0.993 | 0.000 | 1.006 | 0.000 | 0.995 | 0.000 | 1.004 |
| | 2 | H | 38 | 20 | 42 | 22 | 46 | 24 | 50 |
| | 4 | K | 0.325 | 0.309 | 0.295 | 0.282 | 0.270 | 0.259 | 0.249 |
| | 4 | TF | 0.154 | 0.000 | 0.163 | 0.000 | 0.129 | 0.000 | 0.135 |
| | 4 | NF | 0.895 | 0.000 | 0.880 | 0.000 | 1.088 | 0.000 | 1.099 |
| | 4 | H | 76 | 20 | 84 | 44 | 92 | 24 | 100 |
| | 6 | K | 0.476 | 0.454 | 0.434 | 0.415 | 0.398 | 0.383 | 0.368 |
| | 6 | TF | 0.375 | 0.000 | 0.000 | 0.000 | 0.257 | 0.000 | 0.275 |
| | 6 | NF | 0.669 | 0.000 | 0.000 | 0.000 | 1.220 | 0.000 | 1.241 |
| | 6 | H | 114 | 60 | 42 | 66 | 138 | 24 | 150 |
| | 8 | K | 0.614 | 0.588 | 0.563 | 0.541 | 0.520 | 0.500 | 0.482 |
| | 8 | TF | 0.099 | 0.000 | 0.087 | 0.000 | 0.442 | 0.000 | 0.476 |
| | 8 | NF | 0.960 | 0.000 | 1.032 | 0.000 | 0.594 | 0.000 | 0.556 |
| | 8 | H | 152 | 40 | 168 | 88 | 184 | 24 | 200 |
| | 10 | K | 0.736 | 0.707 | 0.680 | 0.655 | 0.631 | 0.609 | 0.588 |
| | 10 | TF | 0.835 | 0.000 | 0.917 | 0.000 | 0.103 | 0.000 | 0.000 |
| | 10 | NF | 1.792 | 0.000 | 1.878 | 0.000 | 0.941 | 0.000 | 0.000 |
| | 10 | H | 190 | 20 | 210 | 110 | 230 | 120 | 50 |
| | 12 | K | 0.837 | 0.809 | 0.782 | 0.756 | 0.731 | 0.707 | 0.685 |
| | 12 | TF | 0.088 | 0.000 | 0.000 | 0.000 | 0.999 | 0.000 | 1.082 |
| | 12 | NF | 1.022 | 0.000 | 0.000 | 0.000 | 1.964 | 0.000 | 2.050 |
| | 12 | H | 228 | 60 | 84 | 132 | 276 | 24 | 300 |
| | 14 | K | 0.916 | 0.891 | 0.866 | 0.841 | 0.817 | 0.793 | 0.771 |
| | 14 | TF | 0.222 | 0.000 | 0.000 | 0.000 | 0.173 | 0.000 | 0.077 |
| | 14 | NF | 1.176 | 0.000 | 0.000 | 0.000 | 0.866 | 0.000 | 0.967 |
| | 14 | H | 266 | 140 | 42 | 154 | 322 | 168 | 350 |
| | 16 | K | 0.969 | 0.951 | 0.931 | 0.910 | 0.888 | 0.866 | 0.844 |
| | 16 | TF | 0.119 | 0.000 | 0.239 | 0.000 | 0.071 | 0.000 | 0.065 |
| | 16 | NF | 1.065 | 0.000 | 1.198 | 0.000 | 1.015 | 0.000 | 0.988 |
| | 16 | H | 304 | 80 | 336 | 176 | 368 | 48 | 400 |
| | 18 | K | 0.997 | 0.988 | 0.975 | 0.959 | 0.942 | 0.924 | 0.905 |
| | 18 | TF | 4.060 | 0.000 | 0.000 | 0.000 | 0.077 | 0.000 | 0.106 |
| | 18 | NF | 3.018 | 0.000 | 0.000 | 0.000 | 0.974 | 0.000 | 0.932 |
| | 18 | H | 342 | 180 | 126 | 198 | 414 | 72 | 450 |
| | 20 | K | 0.997 | | 0.997 | 0.990 | 0.979 | 0.966 | 0.951 |
| | 20 | TF | 4.060 | | 4.481 | 0.000 | 0.087 | 0.000 | 0.000 |
| | 20 | NF | 3.018 | | 3.444 | 0.000 | 1.040 | 0.000 | 0.000 |
| | 20 | H | 380 | | 420 | 220 | 460 | 120 | 100 |
| | 22 | K | 0.969 | 0.988 | 0.997 | | 0.998 | 0.991 | 0.982 |
| | 22 | TF | 0.119 | 0.000 | 4.481 | | 4.904 | 0.000 | 0.088 |
| | 22 | NF | 1.065 | 0.000 | 3.444 | | 3.869 | 0.000 | 1.047 |
| | 22 | H | 418 | 220 | 462 | | 506 | 264 | 550 |
| | 24 | K | 0.916 | 0.951 | 0.975 | 0.990 | 0.998 | 1.000 | 0.998 |
| | 24 | TF | 0.222 | 0.000 | 0.000 | 0.000 | 4.904 | 0.000 | 5.326 |
| | 24 | NF | 1.176 | 0.000 | 0.000 | 0.000 | 3.869 | 0.000 | 4.295 |
| | 24 | H | 456 | 120 | 168 | 264 | 552 | 24 | 600 |

Radial Force Exists    Nonfunctioning as Motor

Axial Tangent Force

0° Position

Axial Normal Force

0° Position

10° Position

10° Position

Axial Tangent Force

20° Position

Axial Normal Force

20° Position

30° Position

30° Position

70° Position

70° Position

10° Position

10° Position

20° Position

20° Position

30° Position

30° Position

50° Position

50° Position

Axial Tangent Force

0° Position

Axial Normal Force

0° Position

Axial Tangent Force

10° Position

Axial Normal Force

10° Position

20° Position

20° Position

Axial Tangent Force

30° Position

Axial Normal Force

30° Position

40° Position

40° Position

Axial Tangent Force

50° Position

Axial Normal Force

50° Position

Axial Tangent Force

60° Position

Axial Normal Force

60° Position

Fig.67(a) (Prior Art)
Fig.67(d) (Prior Art)
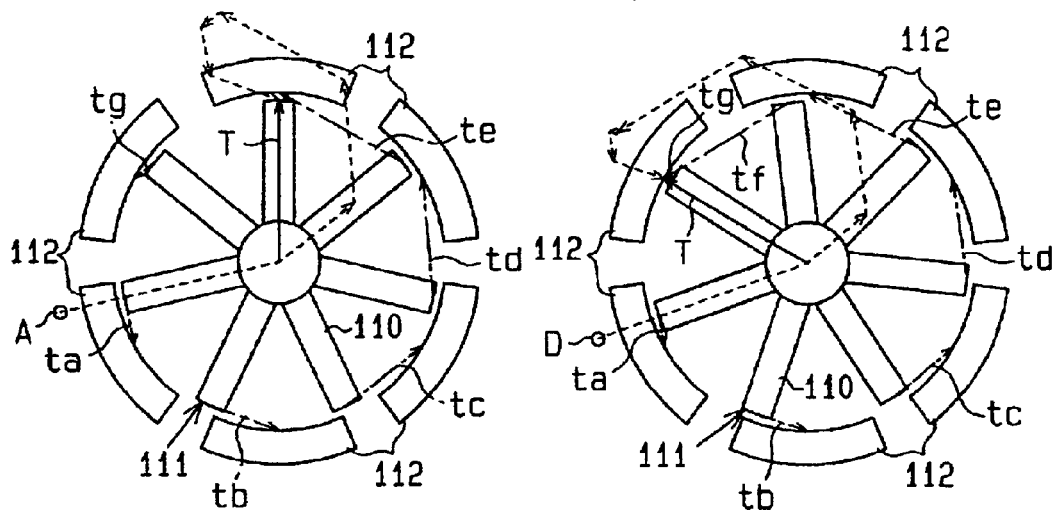
Fig.67(b) (Prior Art)
Fig.67(e) (Prior Art)
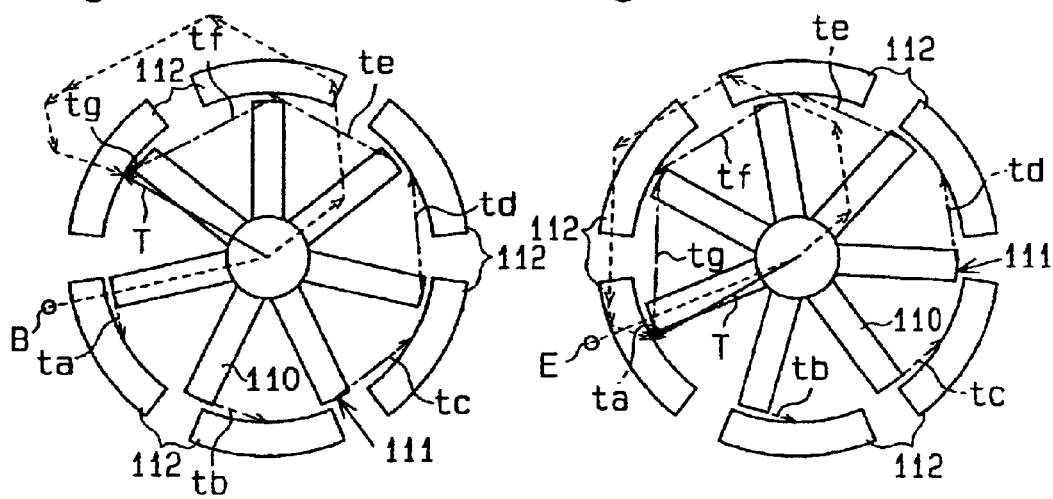
Fig.67(c) (Prior Art)
Fig.67(f) (Prior Art)
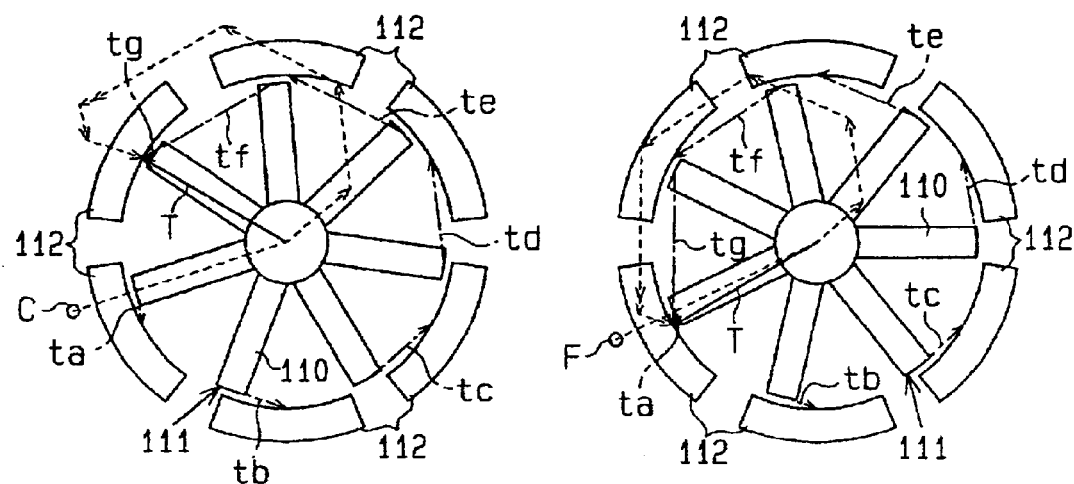

CORE OF ROTATION APPARATUS, METHOD FOR MANUFACTURING CORE, AND ROTATION APPARATUS

BACKGROUND OF THE INVENTION

The present invention relates to a core of a rotation apparatus, a method for manufacturing the core, and a rotational apparatus that reduce vibration.

Japanese Laid-Open Patent Publication No. 55-147964 discloses a direct-current motor that includes magnets, an armature having a core, and a commutator. The number of the magnets is represented by a product 2mn. The number of the teeth in the core of the armature is represented by a product m(2n±1). The number of the segments in the commutator is represented by a product mn(2n±1). In the products listed above, the sign m is an integer that is equal to or greater than one, and the sign n is an integer that is equal to or greater than three. When m is one and n is three, the number of magnet is six, the number of the teeth is seven or five, and the number of the segments is twenty-one or fifteen.

Since the motor has an odd number of teeth, the resultant of magnetic forces acting on the teeth, or the resultant of the torque vectors in the teeth is not zero. The resultant torque constantly acts on the rotor in radial directions.

FIGS. 67(a) to 67(f) show the states of the torque vector resultant in the teeth of a prior art six-pole seven-slot (seven-tooth) motor. As shown in the drawings, the motor includes a rotor 111, which is an armature. The rotor 111 includes seven teeth 110. Six magnets 112, which function as a stator, are arranged about the rotor 111. When the rotor 111 rotates counterclockwise from a position A shown in FIG. 67(a) to a position F shown in FIG. 67(f), the directions and the magnitudes of magnetic forces acting on the teeth 110 change as represented by single-dotted line arrows in FIGS. 67(a) to 67(f). The torque vector resultant T, which is obtained by summing the torque vectors ta to tg in the teeth 110, changes as represented by solid line arrows in FIGS. 67(a) to 67(f). Therefore, when rotating, the rotor 111 constantly receives a radial force that is produced by the resultant torque T, which is always above zero. This vibrates the rotor 111, or the motor.

FIG. 68 illustrates an armature 120 of a typical rotation apparatus such as a direct-current motor and the generator. The armature 120 includes a core 113 having teeth 114 and coils 115, each of which is wound about one of the teeth 114. The armature 120 shown in FIG. 68 is an inner type. If the armature 120 is used as a rotor, magnets arranged about the armature 120 function as a stator. If the armature 120 functions as a stator, the magnets function as a rotor.

To wind each coil 115 about the corresponding tooth 114, the circumferential distance W1 between the distal ends of each adjacent pair of the teeth 114 needs to be sufficiently wide. Also, to systematically and easily wind the coils 115 about the teeth 114, the space S1 between each adjacent pair of the coils 115 needs to be sufficiently wide. However, if each distance W1 is widened, the cogging torque is also increased, and thus the vibration of the rotation apparatus is increased. If each space S1 is widened, the space factor of the corresponding coils 115 is decreased, and thus the performance of the rotation apparatus deteriorates.

FIG. 69 illustrates an outer type armature 119. The armature 119 also may function either as a stator or a rotor. Magnets are arranged in the hollows in the armature 119. The magnets function either as a rotor or a stator. Like the armature 120 of FIG. 68, the armature 119 includes a core 116 having teeth 117 and coils 118, each of which is wound about one of the teeth 117.

The armature 119 of FIG. 69 has the same drawbacks as those of the armature of FIG. 68. That is, the distance W2 between the distal ends of each adjacent pair of the teeth 117 and the space S2 between each adjacent pair of the coils 118 need to be sufficiently wide. Therefore, the vibration of the rotation apparatus is increased and the performance of the apparatus deteriorates.

To solve the problems presented in the arts shown in FIGS. 68 and 69, Japanese Laid-Open Patent Publications No. 9-191588 and No. 10-4640 disclose arts in which coils are wound about separately formed teeth and then the teeth are integrated with a core.

However, since the arts disclosed in publications No. 9-191588 and No. 10-4640 require a core and a plurality of separate teeth, the number of parts is increased. This complicates the production control. Also, in the art disclosed in the publication No. 10-4640, half of the teeth are formed completely separately from a core body and the engaged with the core body to form a core. Therefore, the engaging portions of these teeth have a higher magnetic reluctance compared with the teeth that are integrally formed with the core body. As a result, the teeth have different magnetic reluctances. If this core is used as an inner rotor, centrifugal force loosens the engaging portions. This makes the magnetic forces acting on the teeth uneven and thus causes the motor to vibrate.

SUMMARY OF THE INVENTION

Accordingly, it is an objective of the present invention to provide a core of a rotation apparatus, a method for manufacturing the core, and a rotational apparatus that reduce vibration.

To achieve the foregoing and other objectives and in accordance with the purpose of the present invention, a core used in an armature of a rotation apparatus is provided. The core includes a first piece and a second piece. Each core piece includes a ring having a first engaging portion, and a tooth radially extending from the ring. The tooth includes an integral tooth member, which is integrally formed with the ring, and a separate tooth member, which has the same shape as the integral tooth member and is secured to the integral tooth member. The separate tooth member of each core piece has a second engaging portion, which corresponds to the first engaging portion of the other core piece. The core pieces are assembled when the first engaging portion of the first core piece is engaged with the second engaging portion of the second core piece and the first engaging portion of the second core piece is engaged with the second engaging portion of the first core piece.

A method for manufacturing a core used in an armature of a rotation apparatus is provided. The method includes preparing separate first and second core pieces, wherein each core piece has a ring, which has a first engaging portion, and an integral tooth member, which radially extends from the ring, securing a separate tooth member, which has the same shape as the integral tooth member, to each integral tooth member, wherein each integral tooth member and the corresponding separate tooth member form a tooth, wherein the separate tooth member of each core piece has a second engaging portion, which corresponds to the first engaging portion of the other core piece, winding a coil about each tooth, and assembling the core pieces by engaging the first engaging portion of the first core piece with the second engaging portion of the second core piece and engaging the first engaging portion of the second core piece with the second engaging portion of the first core piece.

The present invention also provides a rotation apparatus including a stator, a rotor, a commutator, and a plurality of brushes. The stator has a plurality of magnetic poles. The rotor has a plurality of teeth. The teeth are arranged to face the magnetic poles. A coil is wound about each tooth. The commutator is secured to the rotor and is connected to the coils. The brushes slidably contact the commutator. The number of the magnetic poles and the number of the teeth are determined such that the rotor receives no radial force.

Further, the present invention provides a rotation apparatus including a stator, a rotor, a commutator and a plurality of coils. The stator has a plurality of magnetic poles. The rotor has a plurality of teeth. The teeth are arranged to face the magnetic poles, and a coil is wound about each tooth. The commutator is secured to the rotor. The commutator is connected to the coils. The brushes slidably contact the commutator. The number of the magnetic poles and the number of the teeth are determined such that the resultant of torque vectors that act on the teeth is zero.

The present invention may provide another rotation apparatus including a rotor, which has a plurality of magnetic poles, and a stator, which has a plurality of teeth. The teeth are arranged to face the magnetic poles. A coil is wound about each tooth. The number of the magnetic poles and the number of the teeth are determined such that the rotor receives no radial force.

The present invention may also be applied to a rotation apparatus including a rotor, which has a plurality of magnetic poles, and a stator, which has a plurality of teeth. The teeth are arranged to face the magnetic poles. A coil is wound about each tooth. The number of the magnetic poles and the number of the teeth are determined such that the resultant of the torque vectors that act on the teeth is zero.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is a chart showing the relationship between the specifications and the characteristics of a motor;

FIGS. 67(a) to 67(f) are schematic views showing states of the torque vector resultant in a prior art direct-current motor;

DETAILED DESCRIPTION OF THE PREFERRED EMBODIMENTS

A six-pole eight-slot direct-current motor 31 according to a first embodiment of the present invention will now described with reference to the drawings.

Figure 1:
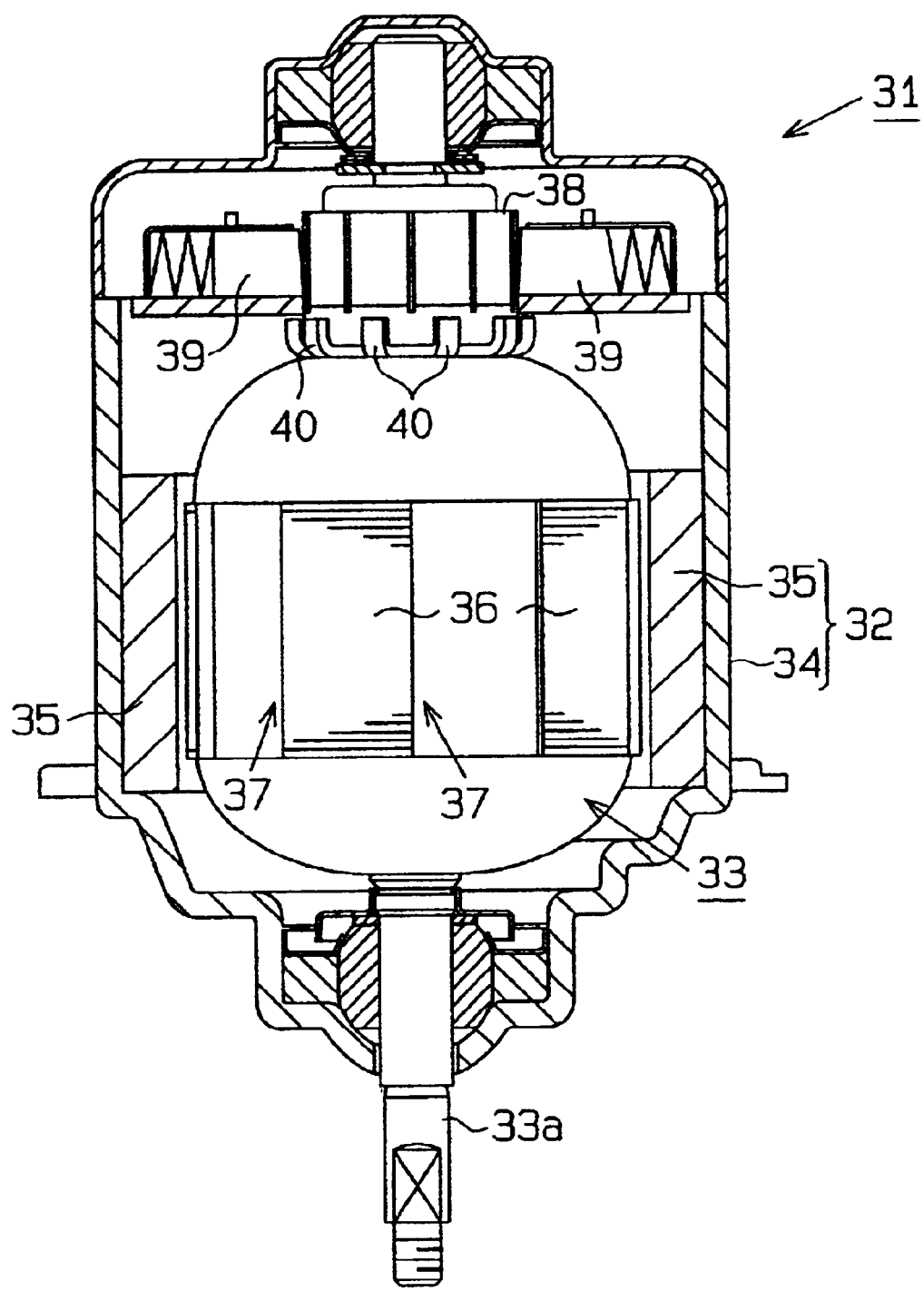
FIG. 1 is a cross-sectional view illustrating a direct-current motor according to a first embodiment of the present invention.

As shown in FIG. 1, the direct-current motor 31, which is a rotation apparatus, includes a stator 32 and a rotor, which is an armature 33 in this embodiment. The stator 32 includes a yoke 34 and six magnets 35, which are arranged at equal angular intervals on the inner surface of the yoke 34. Each magnet 35 functions as a magnetic pole.

Figure 2:
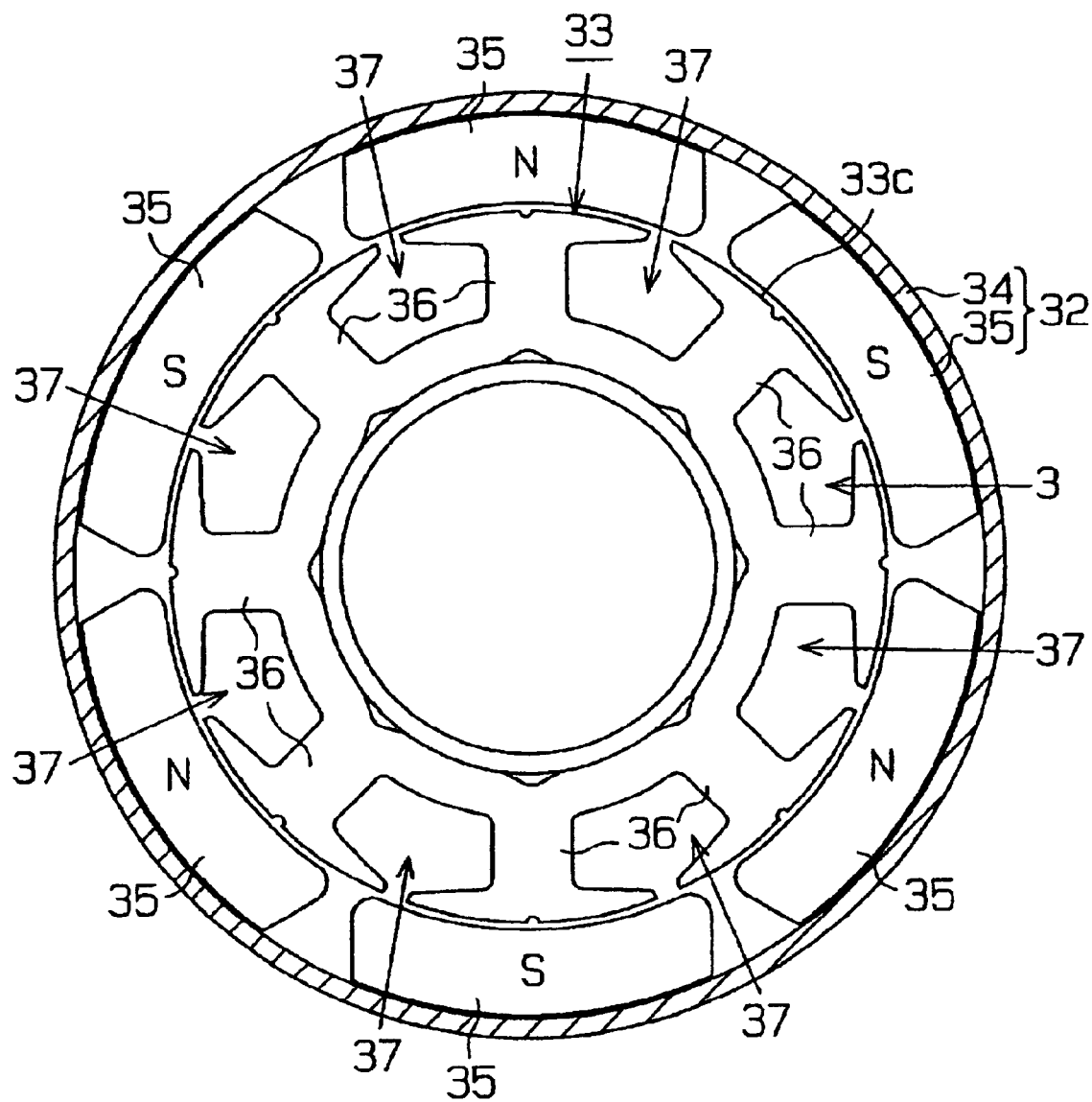
FIG. 2 is a plan view illustrating the motor shown in FIG. 1.
Figure 3:
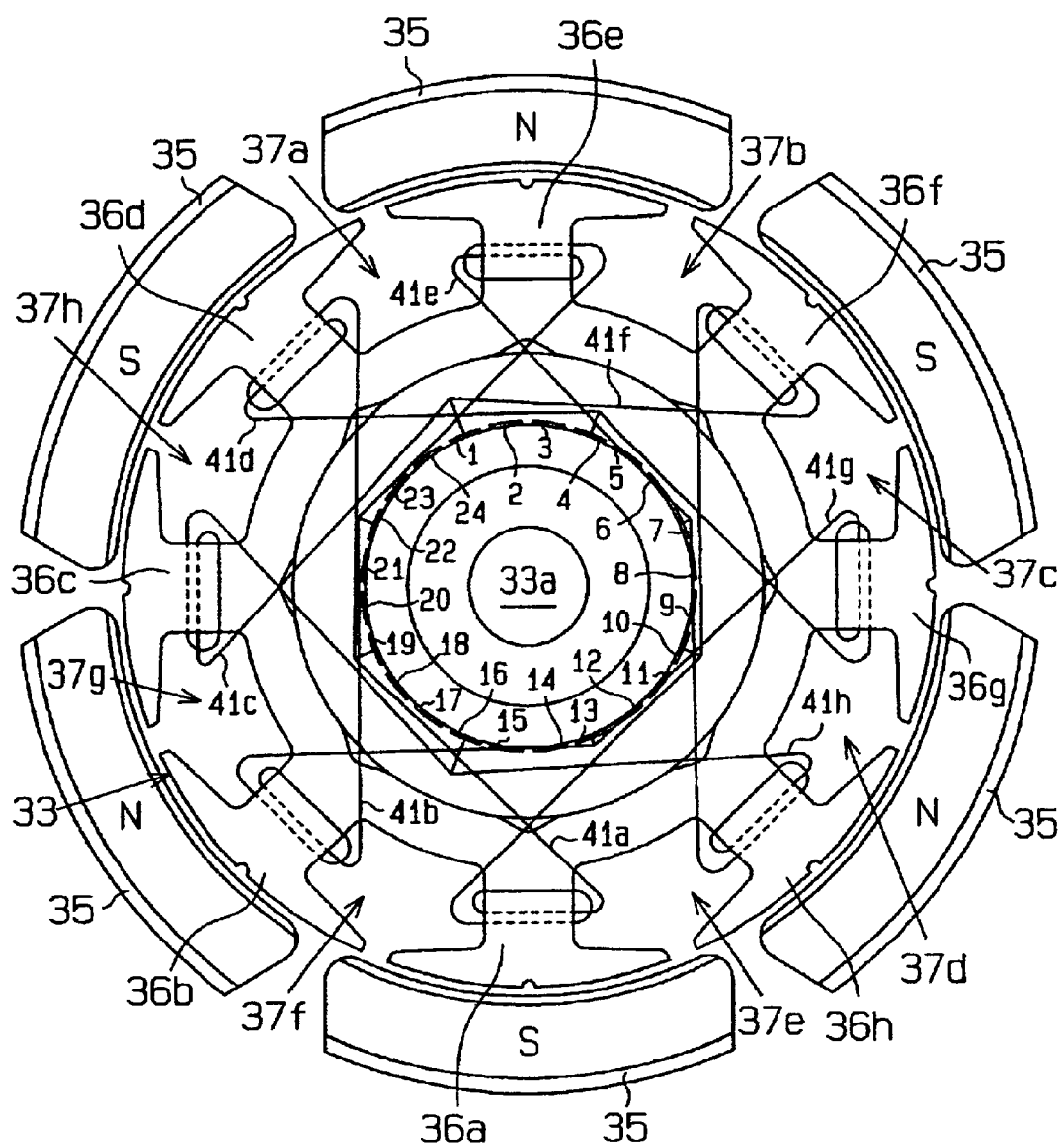
FIG. 3 is a plan view showing the coil structure of the motor shown in FIG. 1.

As shown in FIG. 2, the armature 33 includes a core 33c. The core 33c has eight teeth 36, which are arranged at equal angular intervals. A slot 37 is defined between each adjacent pair of the teeth 36. In FIG. 3, signs 36a, 36b, 36c, 36d, 36e, 36f, 36g, 36h are assigned to the teeth 36, and signs 37a, 37b, 37c, 37d, 37e, 37f, 37g, 37h are assigned to the slots 37.

Figure 4:
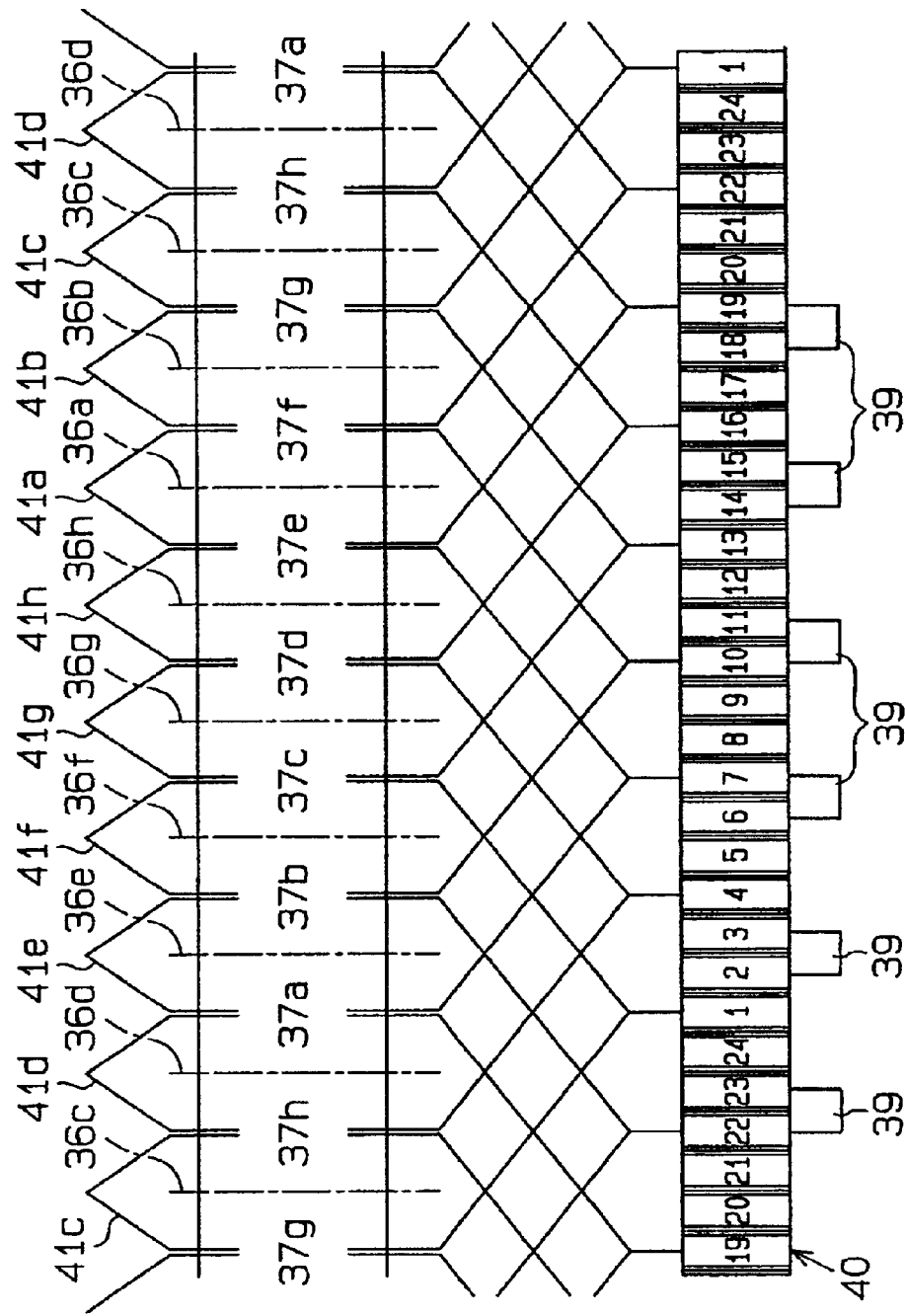
FIG. 4 is a developed diagram showing the coil structure of the motor shown in FIG. 1.

As shown in FIG. 1, a commutator 38 is located at one end of the armature 33 to contact six brushes 39. The commutator 38 includes twenty-four segments 40, which are arranged at equal angular intervals. In FIGS. 3 and 4, the first to twenty-fourth segments 40 are represented by numbers 1 to 40 for purposes of illustration.

The armature 33 is rotatably accommodated in the yoke 34 through a rotary shaft 33a and is surrounded by the magnets 35. The brushes 39 are arranged at equal angular intervals about the axis of the rotary shaft 33a.

The coil structure of the armature 33 will now be described with reference to FIGS. 3 and 4. Hereafter, the coils wound about the first to eighth teeth 36a to 36h will be referred to as first to eighth coils 41a to 41h. The coils 41a to 41h are formed by a single conductor wire.

As shown in FIGS. 3 and 4, one end of the conductor wire is connected to the first segment 1. The conductor wire is wound about the sixth tooth 36f for a predetermined number of turns to form the sixth coil 41f. The conductor wire is then connected to the tenth segment 10.

After being connected to the tenth segment 10, the conductor wire is wound about the first tooth 36a for a predetermined number of turns to form the first coil 41a, and is connected to the nineteenth segment 19. After being connected to the nineteenth segment 19, the conductor wire is wound about the fourth tooth 36d for a predetermined number of turns to form the fourth coil 41d, and is connected to the fourth segment 4.

After being connected to the fourth segment 4, the conductor wire is wound about the seventh tooth 36g for a predetermined number of turns to form the seventh coil 41g, and is connected to the thirteenth segment 13. After being connected to the thirteenth segment 13, the conductor wire is wound about the second tooth 36b for a predetermined number of turns to form the second coil 41b, and is connected to the twenty-second segment 22. After being connected to the twenty-second segment 22, the conductor wire is wound about the fifth tooth 36e for a predetermined number of turns to form the fifth coil 41e, and is connected to the seventh segment 7.

After being connected to the seventh segment 7, the conductor wire is wound about the eighth tooth 36h for a predetermined number of turns to form the eighth coil 41h, and is connected to the sixteenth segment 16. After being connected to the sixteenth segment 16, the conductor wire is wound about the third tooth 36c for a predetermined number of turns to form the third coil 41c, and is connected to the first segment 1.

Figure 5A:
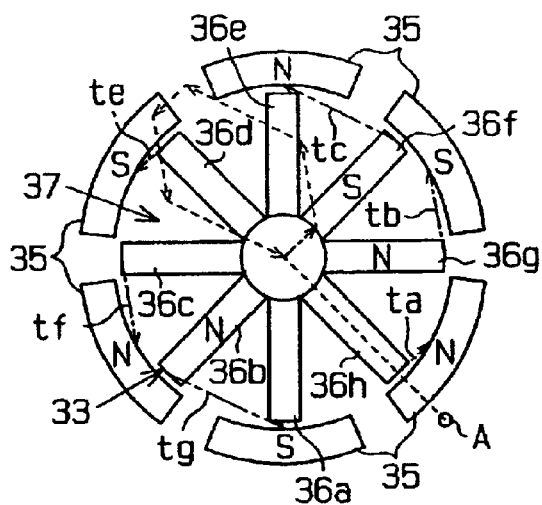
FIGS. 5(a) to 5(f) are schematic views showing states of the torque vector resultant in the motor shown in FIG. 1.
Figure 5D:
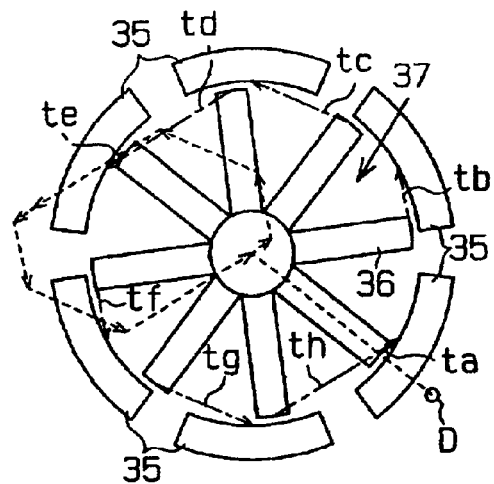
Figure 5B:
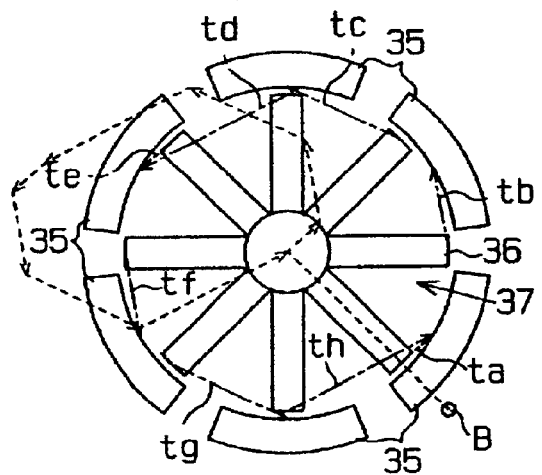
Figure 5E:
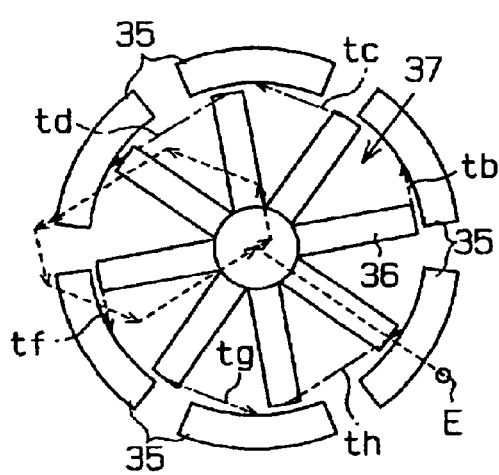
Figure 5C:
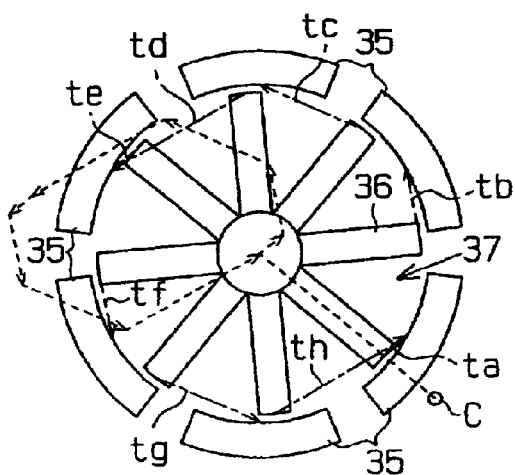
Figure 5F:
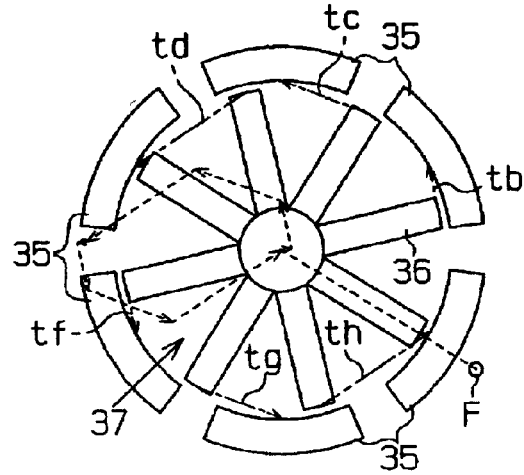

FIGS. 5(a) to 5(f) show states of the torque vector resultant acting on the teeth 36a to 36h of the motor 31. When the armature 33 rotates counterclockwise from a position A shown in FIG. 5(a) to a position F shown in FIG. 5(f), the direction and the magnitude of each magnetic force acting on the teeth 36a to 36h change such that torque vectors ta, tb, tc, td, te, tf, tg, th denoted by alternate long and short dashed line arrows change as shown in FIGS. 5(a) to 5(f). In the state of FIG. 5(a), the sixth tooth 36f is magnetized as a south pole, and the second tooth 36b, which is located symmetrical from the sixth tooth 36f with respect to the axis of the armature 33, is magnetized as a north pole. In this state, the torque vector tc at the sixth tooth 36f and the torque vector tg at the second tooth 36b have the same magnitude in the opposite directions. That is, the torque vectors generated at an opposing pair of the teeth 36a to 36h have the same magnitude in the opposite directions. Therefore, the resultant of the torque vectors ta to th in the teeth 36a, 36h becomes zero.

The advantages of the motor 31 will now be described.

(1) The stator 32 has the six magnets 35 and the armature 33 has the eight slots 37. Therefore, the resultant of the torque vectors of the teeth 36, or slots 37, is zero. That is, the armature 33 receives no radial force. As a result, compared to the prior art, the rotor is prevented from being vibrated by radial forces.

(2) The conductor wire forming the coils is connected to every third one of the segments 40. The six brushes 39 are arranged at the equal angular intervals and slidably contact the commutator 38. Since commutation is consecutively performed between two of the brushes 39 that have the same electric potential, the life of each brush 39 is extended compared to a case where only two brushes are used.

A direct-current motor according to a second embodiment will now be described. The motor of the second embodiment includes an arbitrary even number of magnetic poles (magnets) and an arbitrary number of teeth (slots). The motor of the second embodiment substantially has the same structure as the motor 31 of the first embodiment.

In the second embodiment, the number of magnetic poles is denoted by 2 m (m is an integer equal to or greater than one), and the number of the teeth of the armature is denoted by n (n is an integer equal to or greater than three). The magnets, the number of which is denoted by 2 m, is arranged at every 360/2 m degrees such that north poles and south poles are alternately arranged. The teeth, the number of which is denoted by n, are arranged at every 350/n degrees. To function as a direct-current motor, the number 2 m of the poles and the number n of the teeth need to satisfy the following formula (A).

$$0 < 2m < 2n (n \neq 2m) \quad (A)$$

In the second embodiment, the coil is wound about the armature in short pitches. In relation with the number 2 m of the poles and the number n of the teeth, the short-pitch factor K satisfies the following formula (B). The short-pitch factor K is determined by considering the space between each adjacent pair of the coils relative to the pitches between the magnetic poles and is proportionate to the output of the motor.

$$K = \sin((\pi/2) \times (2m/n)) \quad (B)$$

Generally, the level of the cogging torque in a direct-current motor is inversely proportional to the number H of pulsations of the cogging torque (the number of peaks). The number H of cogging torque pulsations in a single turn of the armature is the least common multiple of the number 2 m of the magnetic poles and the number n of the teeth. The number H of cogging torque pulsations is represented by the following formula (C).

$$H = \text{LCM}(2\ m, n) \quad (C)$$

Thus, as the least common multiple of the number 2 m and the number n increases, the number H of cogging torque pulsation increases and the level of the cogging torque is decreased.

The present applicant tested the relationship between the combination of the number 2 m of the magnetic poles and the number n of the teeth, and axial tangent forces and axial normal forces acting on the armature. Part of the test results is shown in FIGS. 9(a) to 32(b). FIGS. 9(a) to 16(b) are graphs showing data of axial tangent forces and axial normal forces acting on the armature of a six-pole seven-tooth motor (2 m=6, n=7) when the armature rotates from zero-degree position to seventy-degree position. FIGS. 17(a) to 24(b) are graphs showing data of axial tangent force and axial normal force acting on the armature of a six-pole eight-tooth motor (2 m=6, n=8) when the armature rotates from zero-degree position to seventy-degree position. FIGS. 25(a) to 32(b) are graphs showing data of axial tangent force and axial normal force acting on the armature of a six-pole nine-tooth motor (2 m=6, n=9) when the armature rotates from zero-degree position to seventy-degree position. The views (a) in FIGS. 9(a) to 32(b) show data of axial tangent force acting on the armature, and the views (b) show data of axial normal force acting on the armature. Broken arrows represent the magnitudes and the direction of the axial tangent force or the axial normal force. That is the broken arrows represent the torque vector related to the axial tangent force or the torque vector related to the axial normal force. Thin solid lines represent the procedures for combining the torque vectors. Thick solid lines represent the torque vector resultants. The unit of numbers in the drawings is newton (N).

As shown in FIGS. 9(a) to 16(b), the torque vector resultant acting on the armature never becomes zero in any rotation position of the armature between the zero-degree position and the seventy-degree position. Therefore, like the prior art motor shown in FIG. 67, the armature of a six-pole seven-tooth (slot) direct-current motor always receives radial force when rotating, which vibrates the motor.

As shown in FIGS. 17(a) to 24(b), the torque vector resultant acting on the armature is always zero in any rotation position of the armature between the zero-degree position and the seventy-degree position. Therefore, as discussed in the section of the first embodiment, the armature of a six-pole eight-tooth (slot) direct-current motor does not receive radial force when rotating, which permits the motor to operate without vibration.

As shown in FIGS. 25(a) to 32(b), the torque vector resultant acting on the armature is always zero in any rotation position of the armature between the zero-degree position and the seventy-degree position. Therefore, the armature of a six-pole nine-tooth (slot) direct-current motor does not receive radial force when rotating, which permits the motor to operate without vibration.

Figure 6:
FIG. 6 is a chart showing the relationship between the specifications and the characteristics of a motor according to second embodiment of the present invention.
Figure 6:
Figure 7:
FIG. 7 is a chart showing the relationship between the specifications and the characteristics of a motor.
Figure 9A:
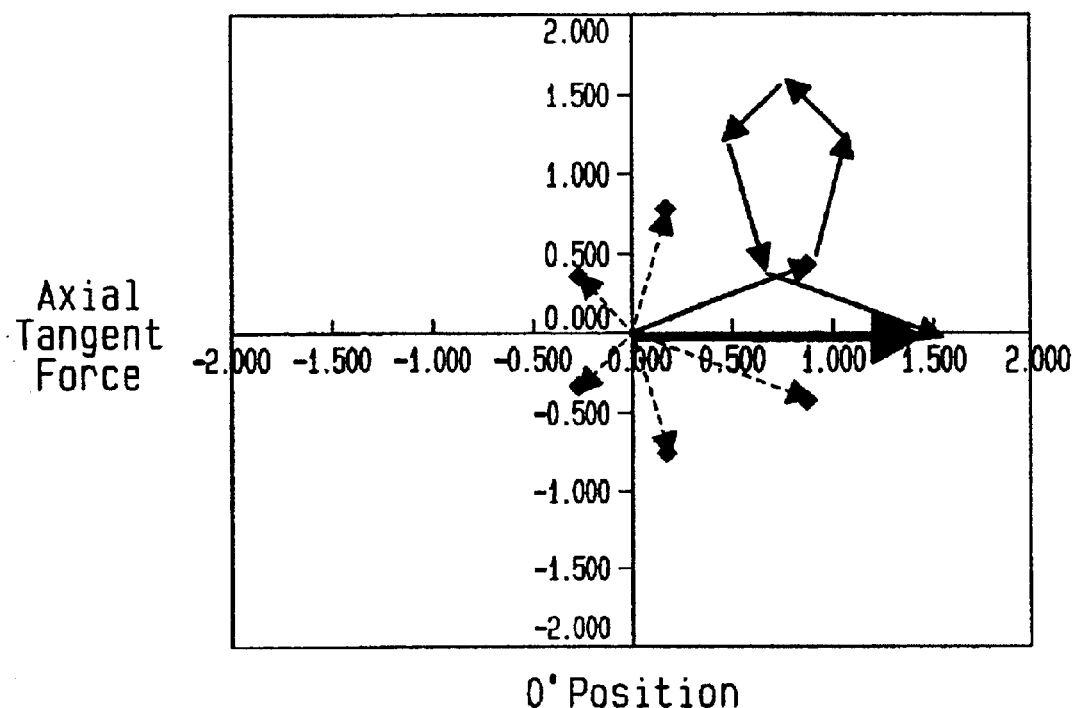
FIGS. 9(a) and 9(b) are graphs showing axial tangent force and axial normal force in a six-pole seven-tooth direct-current motor when the angle of the armature is zero degrees.
Figure 9B:
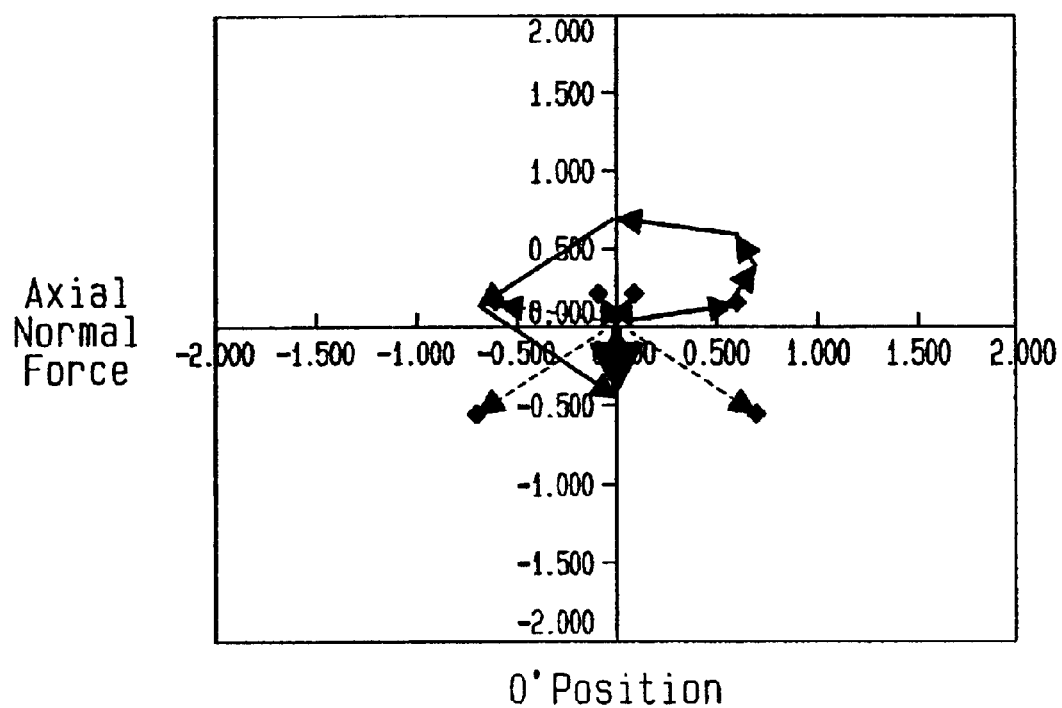
Figure 10A:
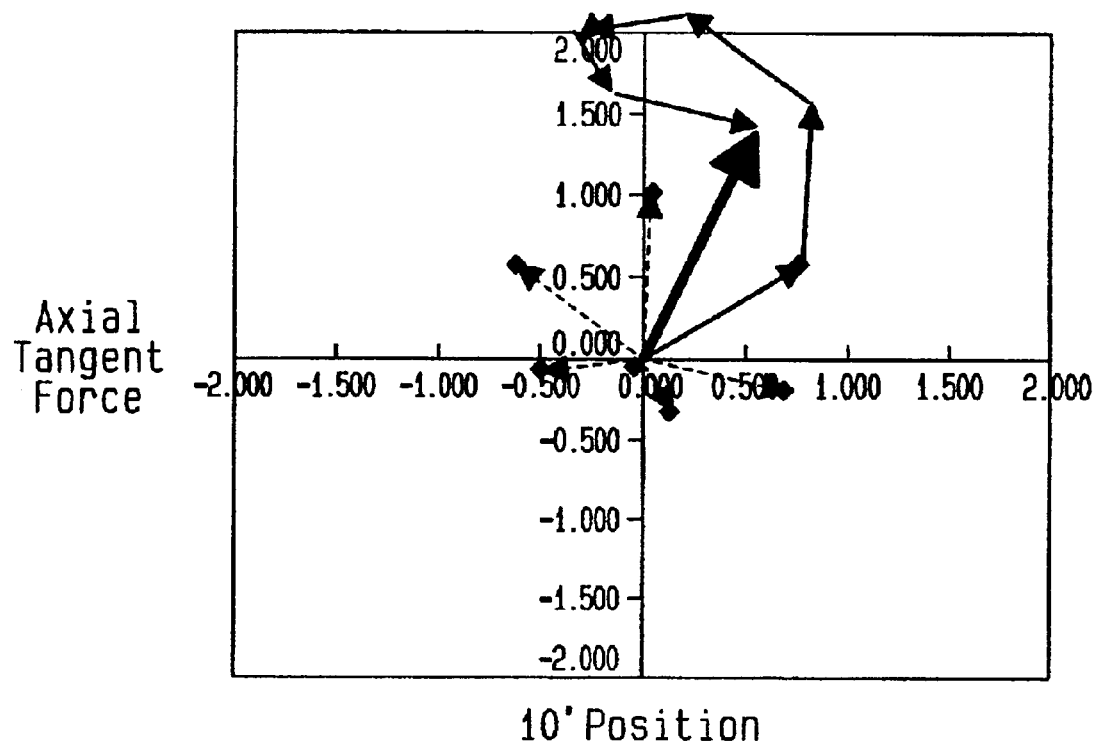
FIGS. 10(a) and 10(b) are graphs showing axial tangent force and axial normal force in the six-pole seven-tooth direct-current motor when the angle of the armature is ten degrees.
Figure 10B:
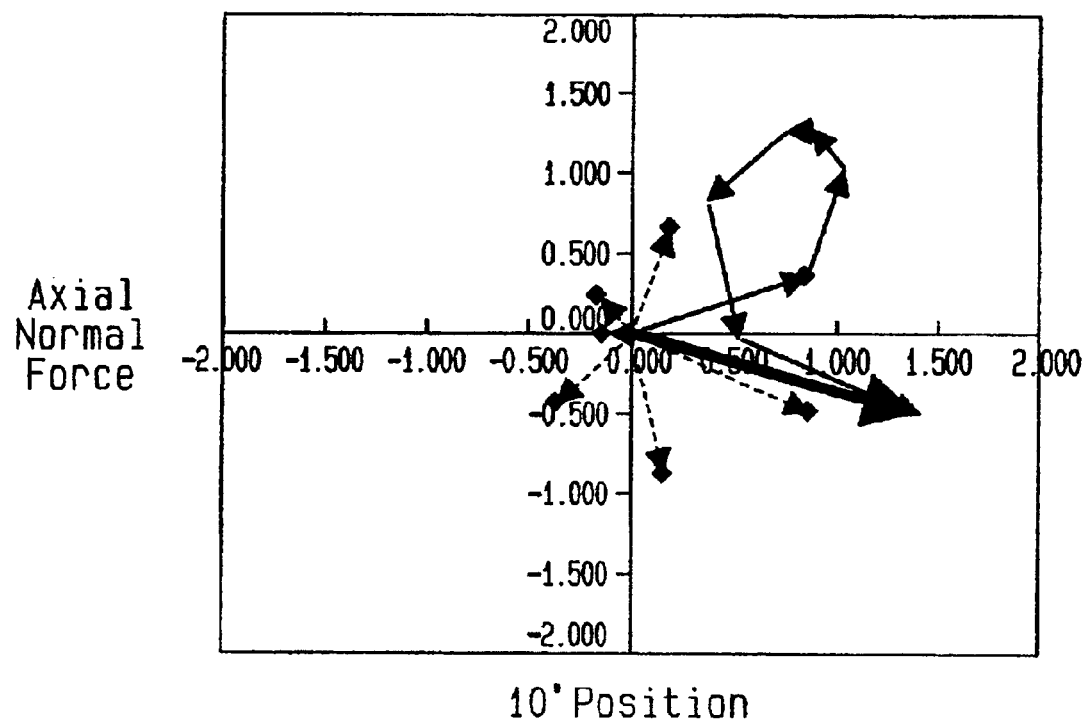
Figure 11:
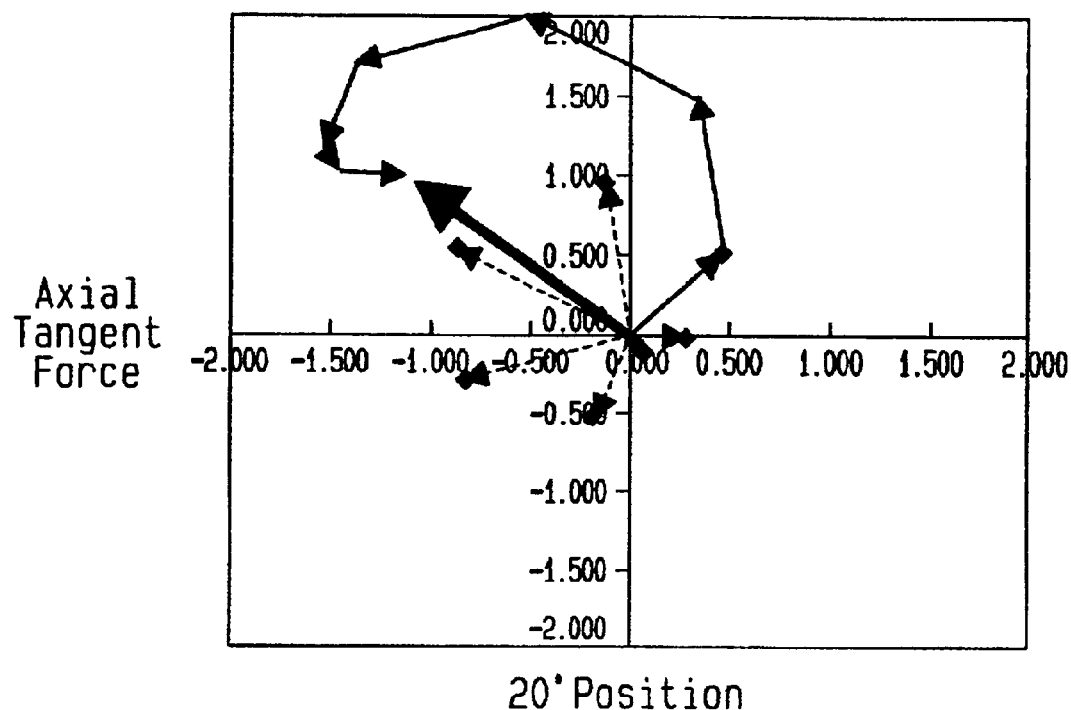
FIGS. 11(a) and 11(b) are graphs showing axial tangent force and axial normal force in the six-pole seven-tooth direct-current motor when the angle of the armature is twenty degrees.
Figure 11:
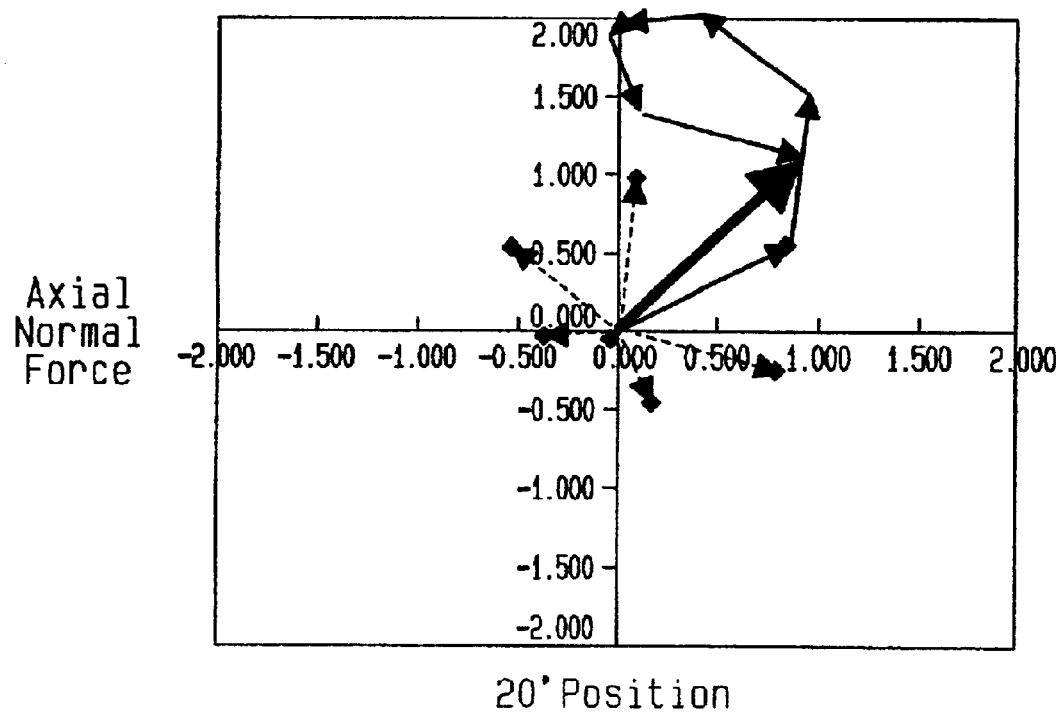
Figure 12A:
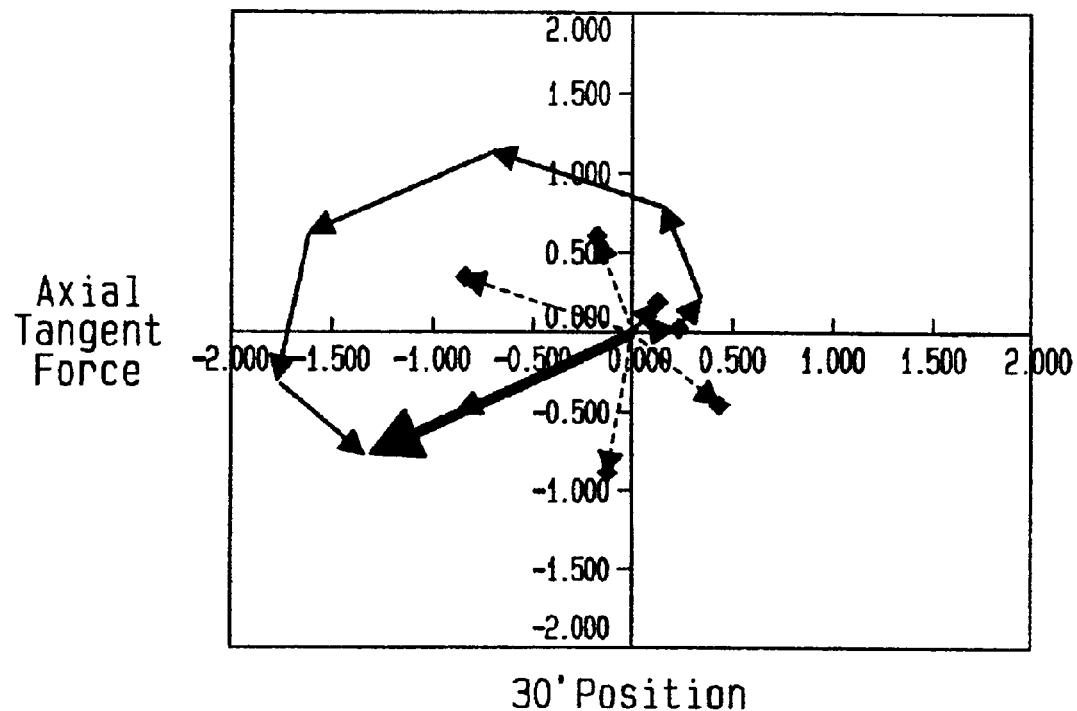
FIGS. 12(a) and 12(b) are graphs showing axial tangent force and axial normal force in the six-pole seven-tooth direct-current motor when the angle of the armature is thirty degrees.
Figure 12B:
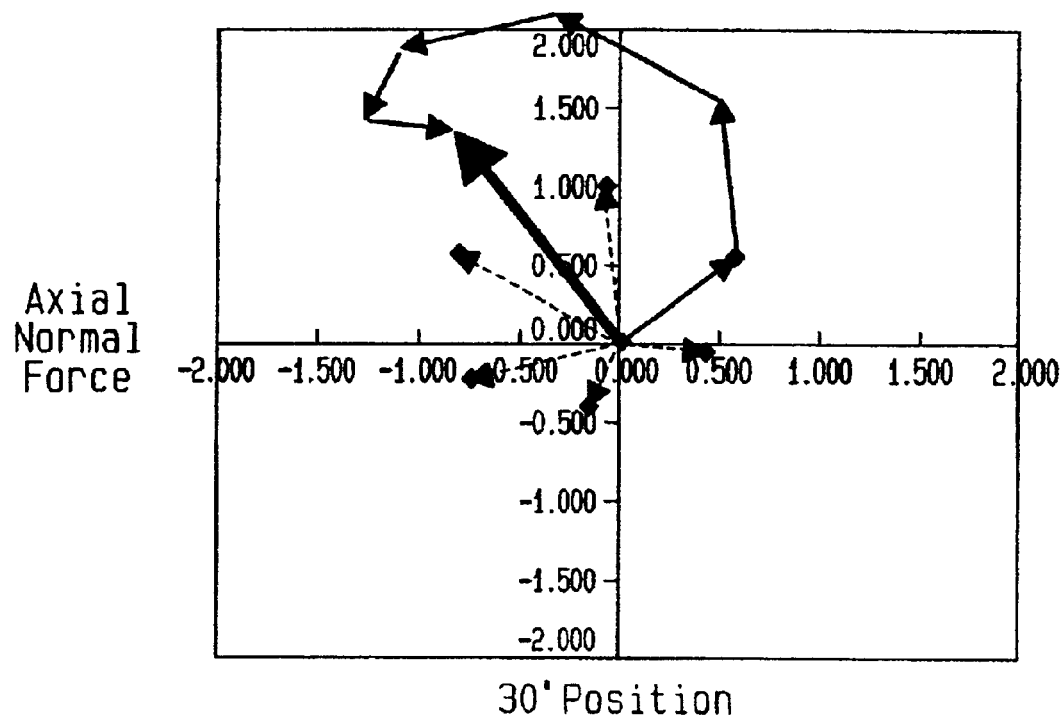
Figure 13A:
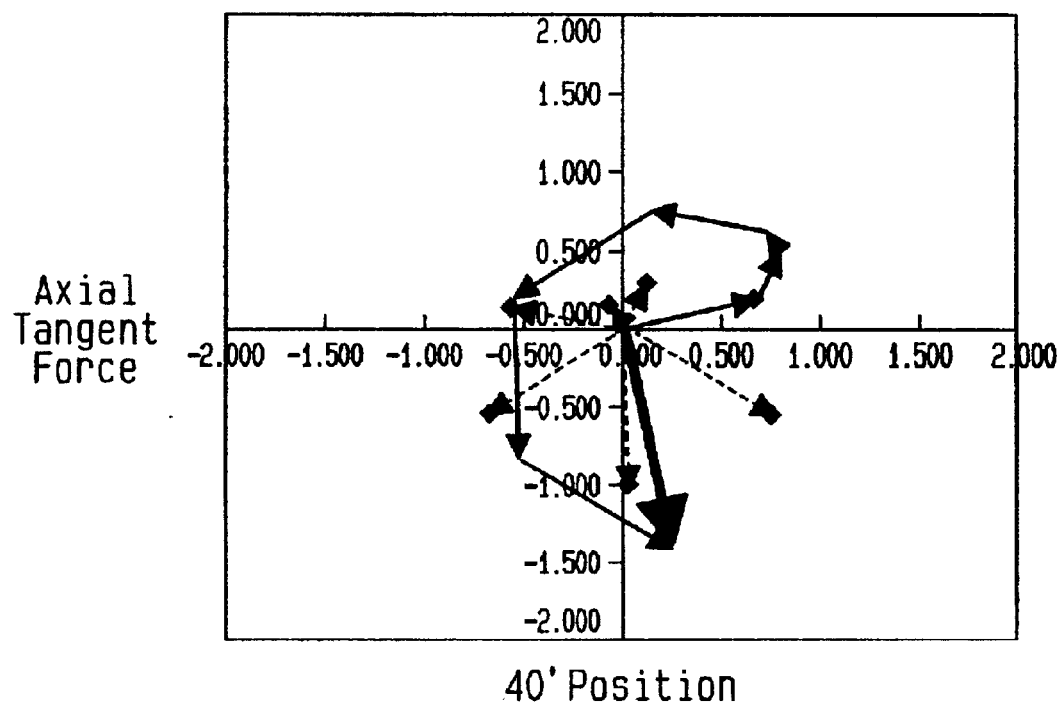
FIGS. 13(a) and 13(b) are graphs showing axial tangent force and axial normal force in the six-pole seven-tooth direct-current motor when the angle of the armature is forty degrees.
Figure 13B:
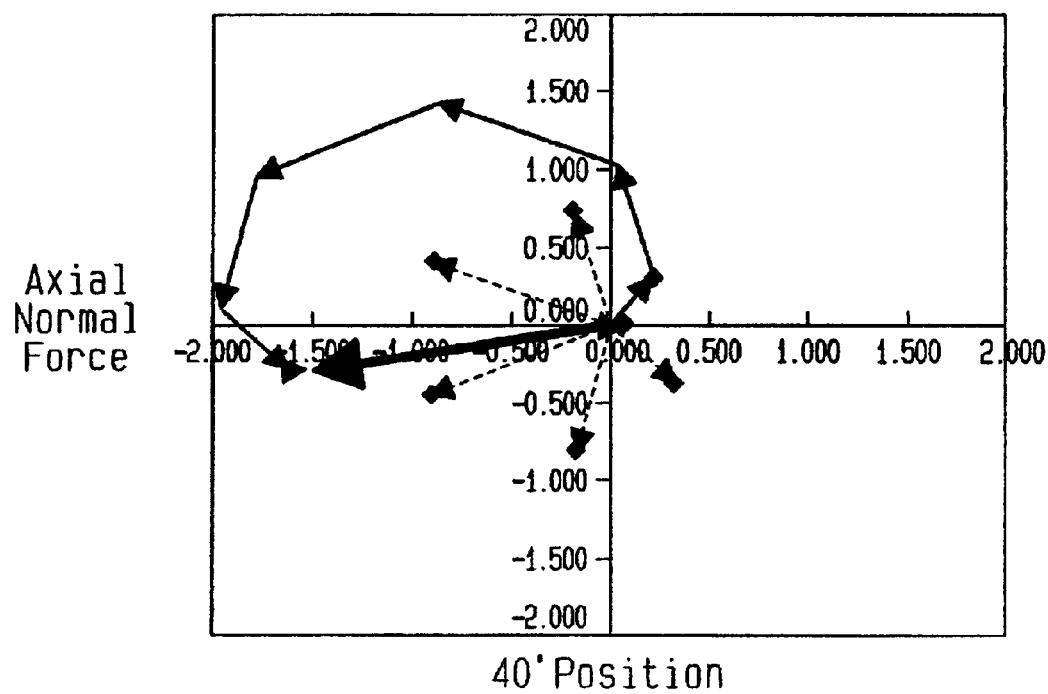
Figure 14A:
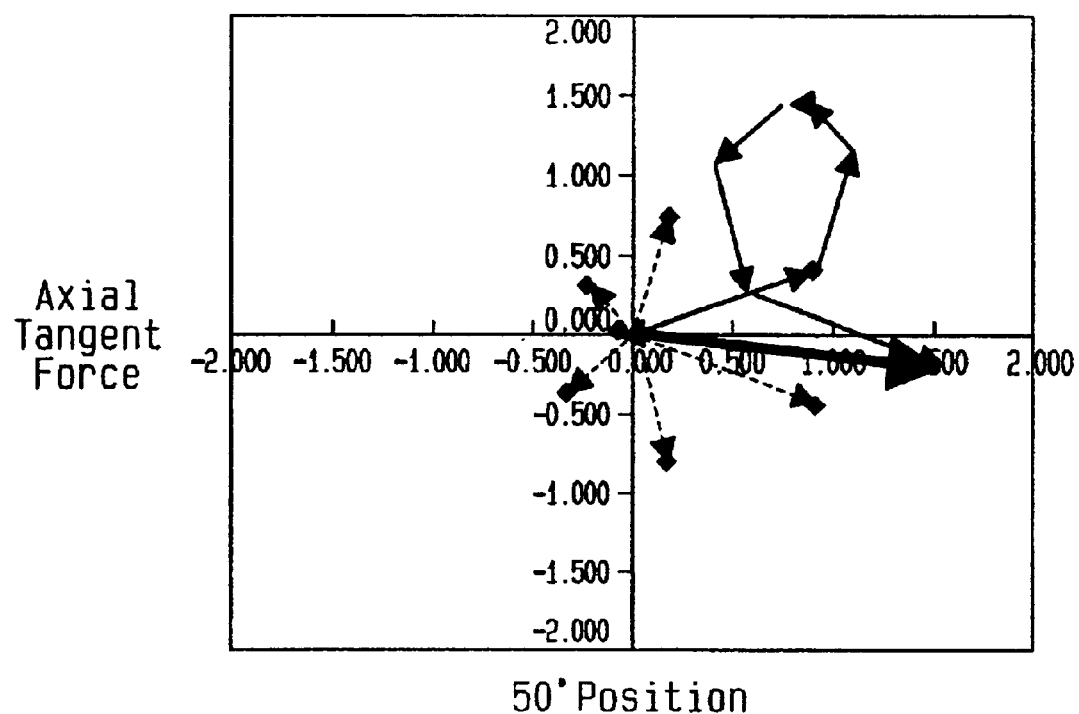
FIGS. 14(a) and 14(b) are graphs showing axial tangent force and axial normal force in the six-pole seven-tooth direct-current motor when the angle of the armature is fifty degrees.
Figure 14B:
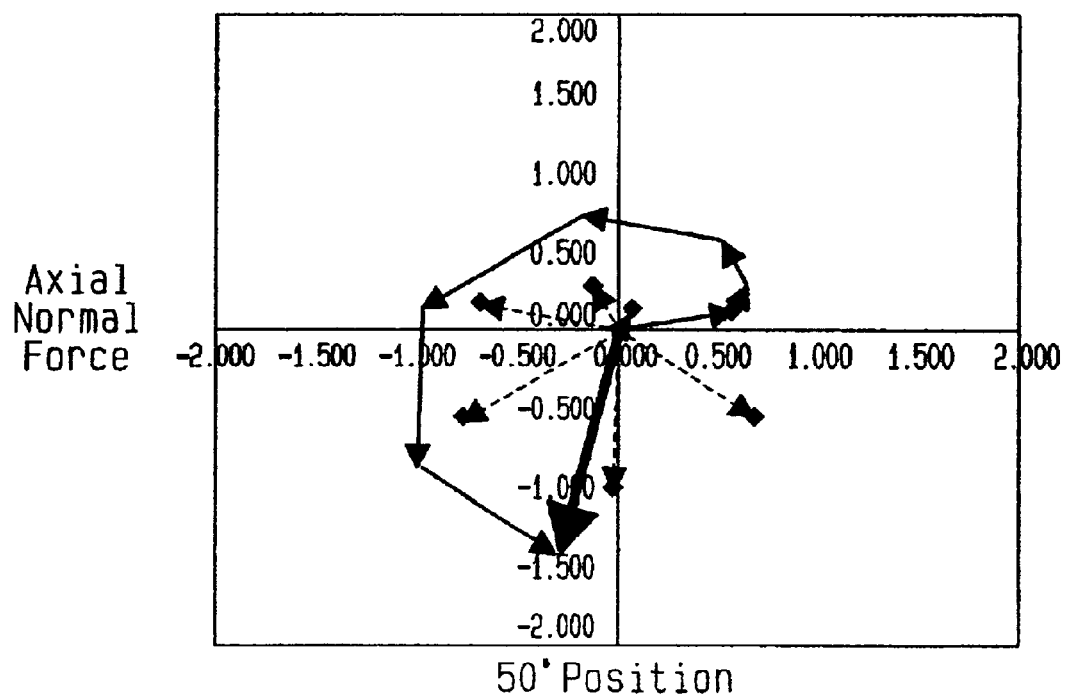
Figure 15A:
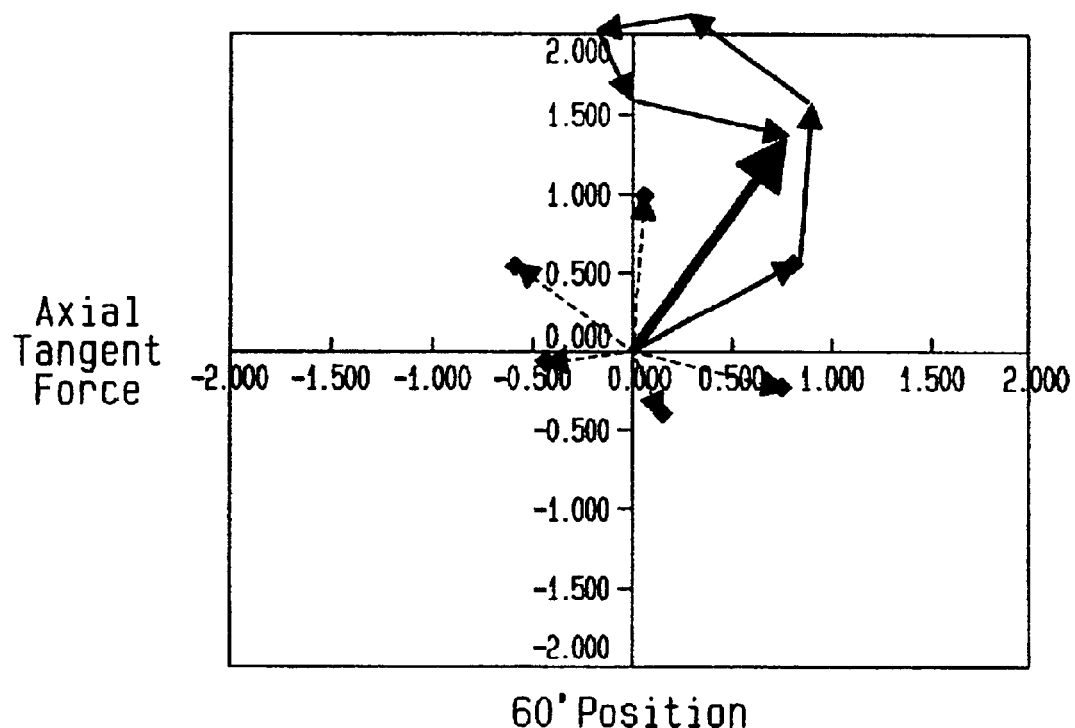
FIGS. 15(a) and 15(b) are graphs showing axial tangent force and axial normal force in the six-pole seven-tooth direct-current motor when the angle of the armature is sixty degrees.
Figure 15B:
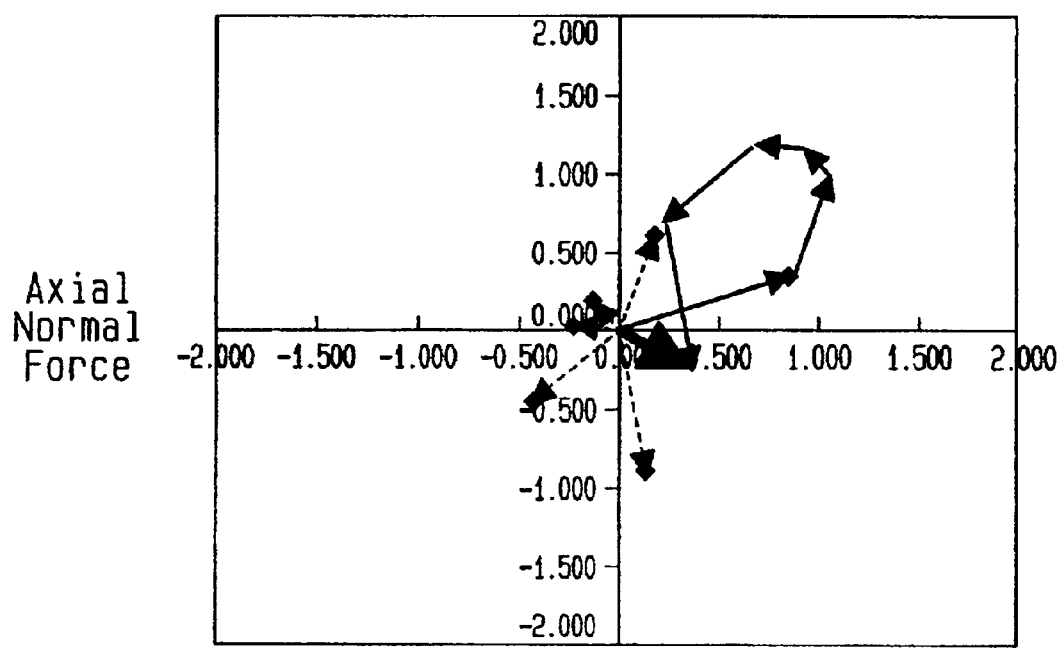
Figure 16A:
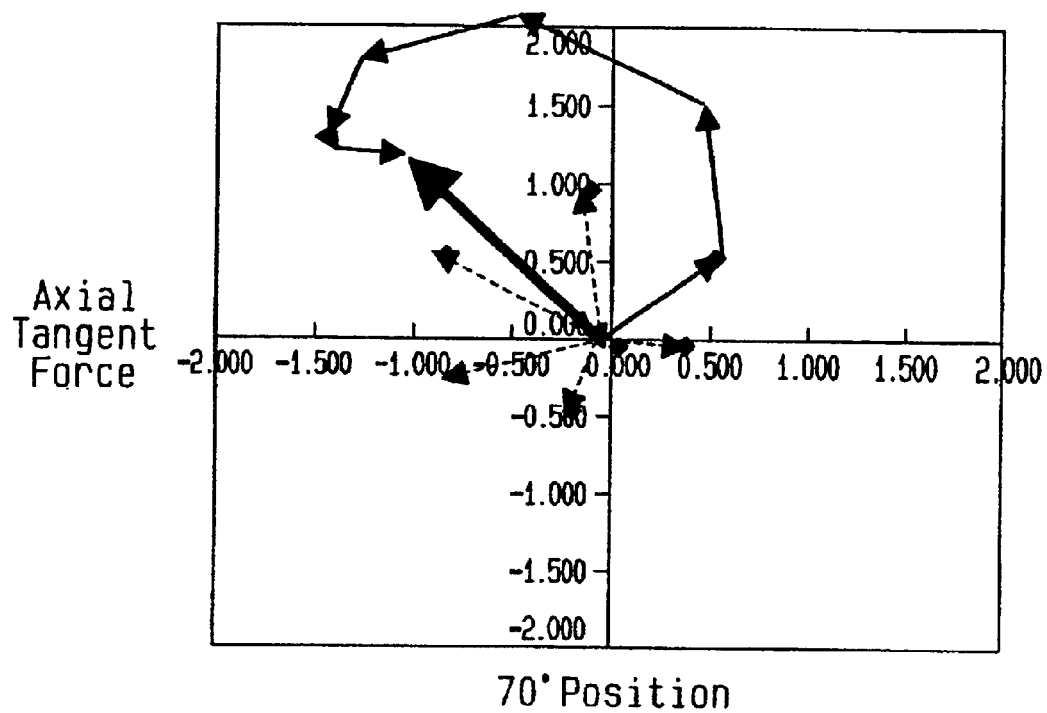
FIGS. 16(a) and 16(b) are graphs showing axial tangent force and axial normal force in the six-pole seven-tooth direct-current motor when the angle of the armature is seventy degrees.
Figure 16B:
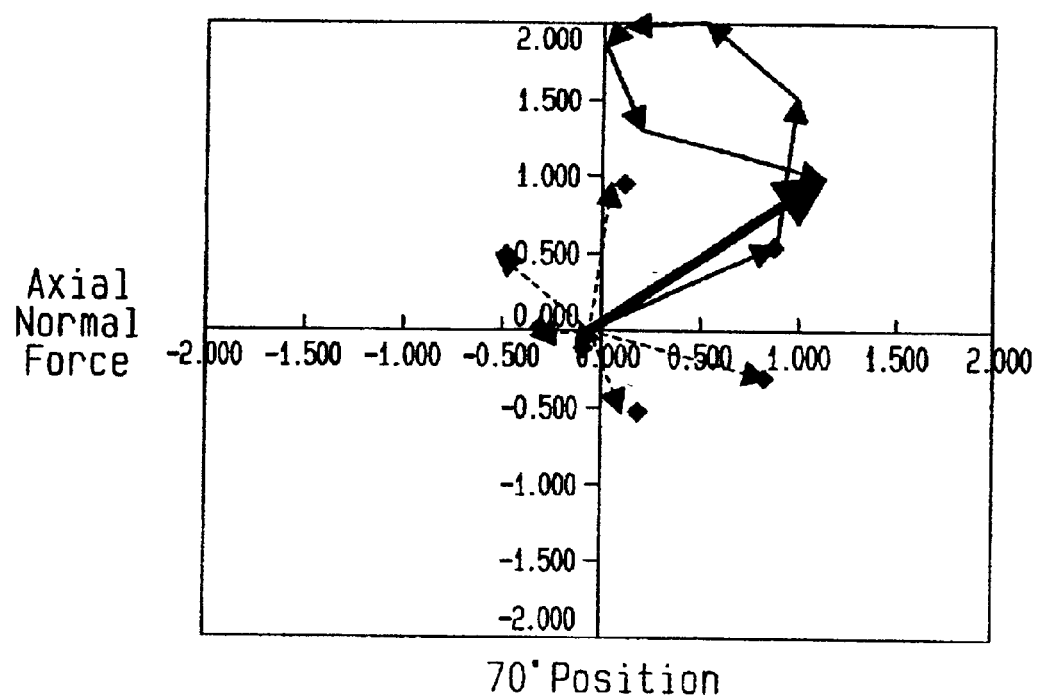
Figure 17A:
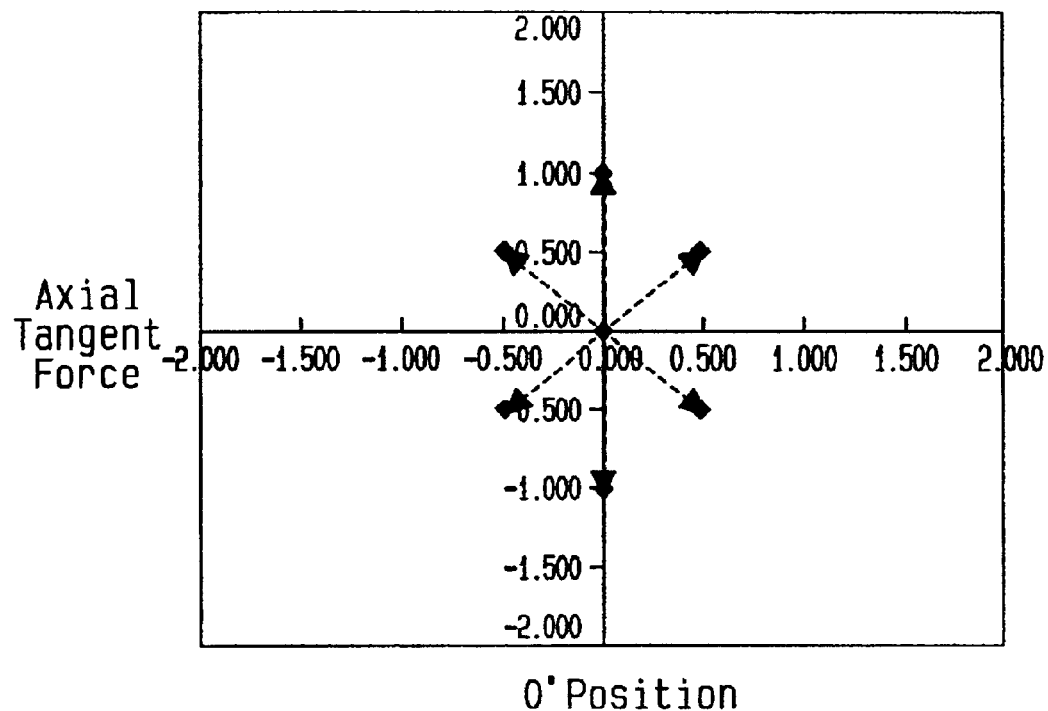
FIGS. 17(a) and 17(b) are graphs showing axial tangent force and axial normal force in a six-pole eight-tooth direct-current motor when the angle of the armature is zero degrees.
Figure 17B:
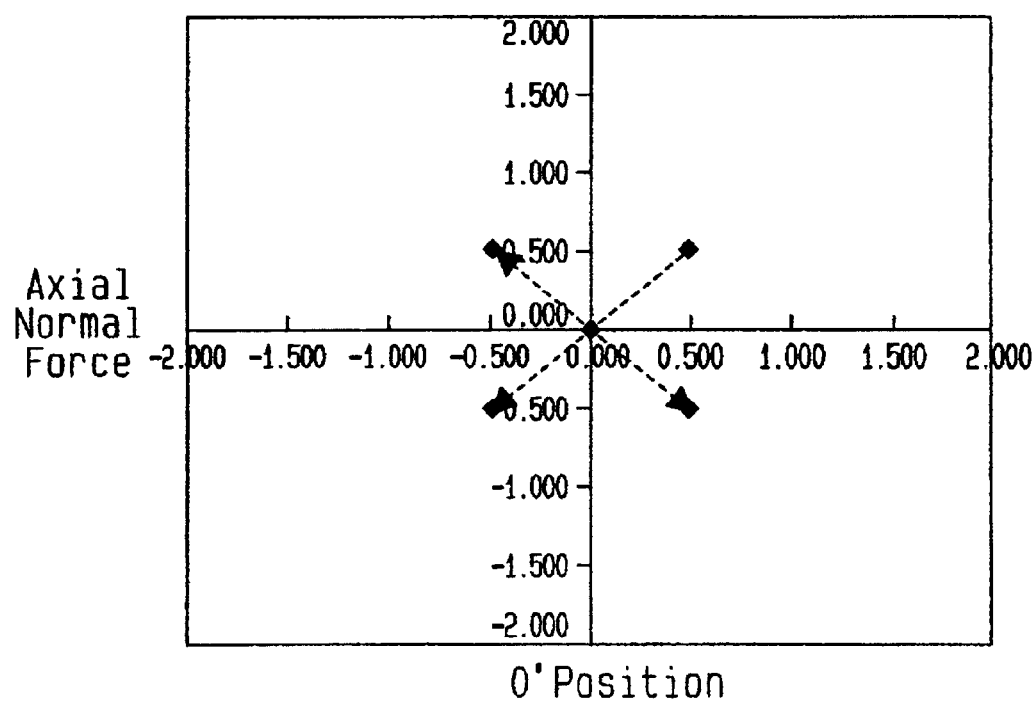
Figure 18A:
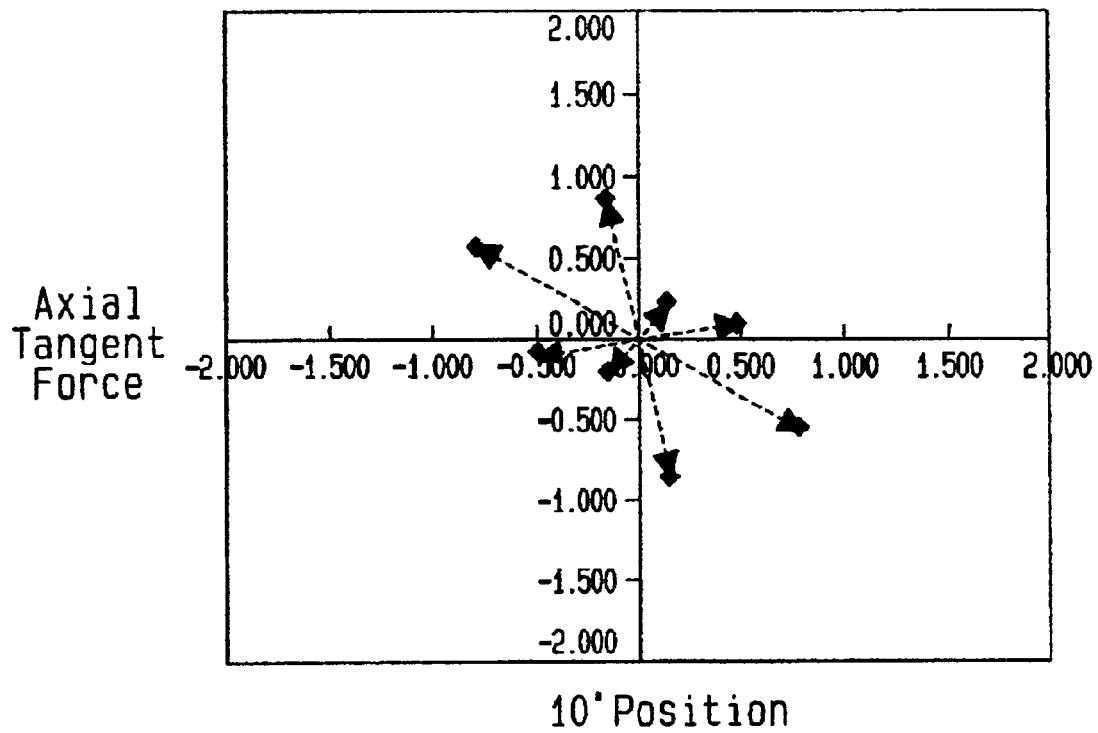
FIGS. 18(a) and 18(b) are graphs showing axial tangent force and axial normal force in a six-pole eight-tooth direct-current motor when the angle of the armature is ten degrees.
Figure 18B:
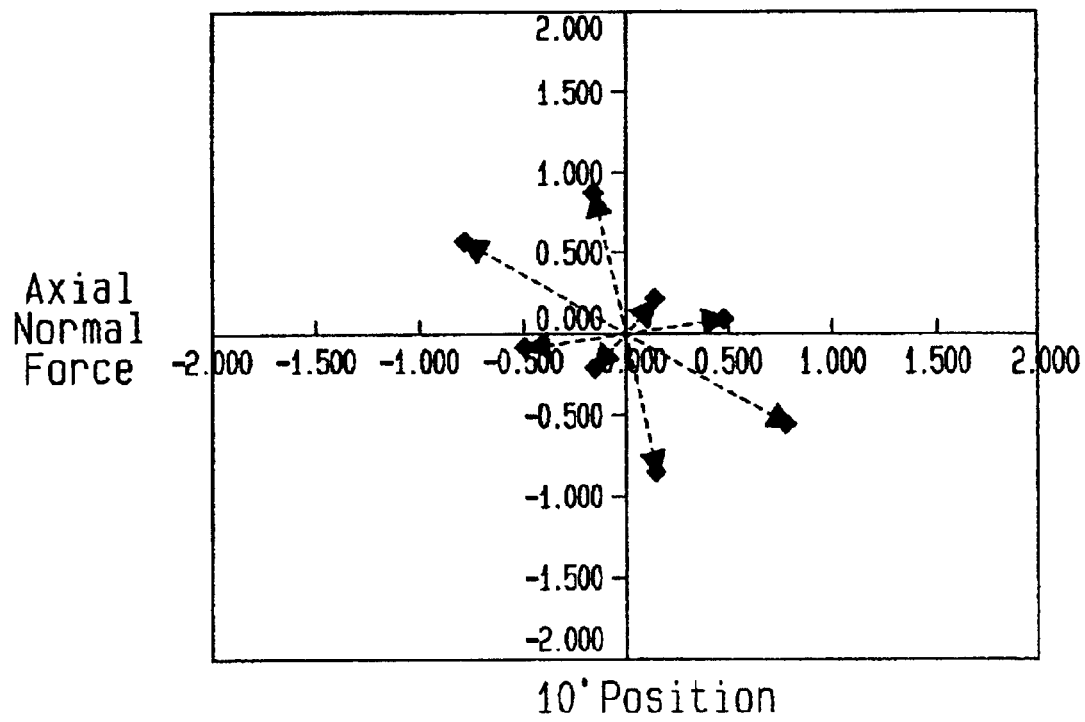
Figure 19A:
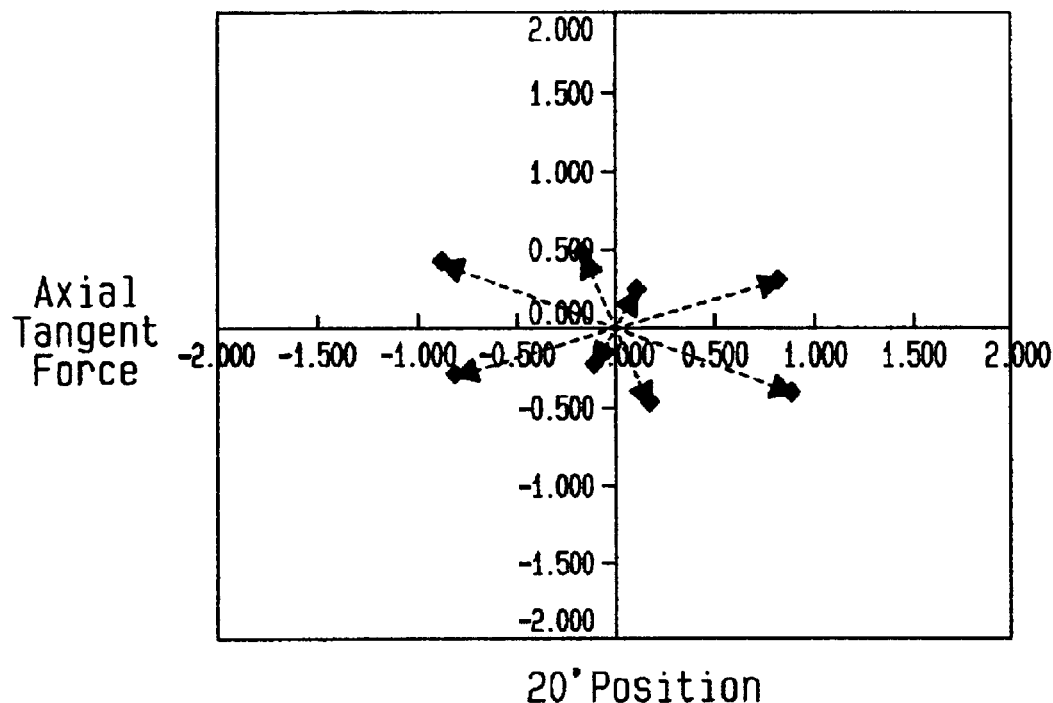
FIGS. 19(a) and 19(b) are graphs showing axial tangent force and axial normal force in a six-pole eight-tooth direct-current motor when the angle of the armature is twenty degrees.
Figure 19B:
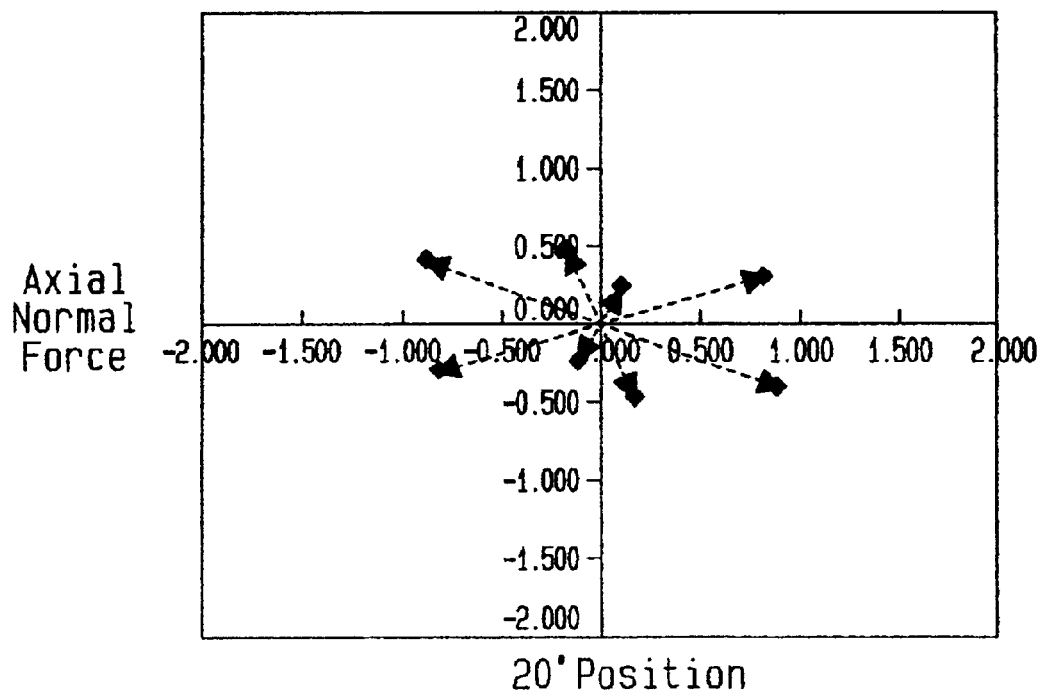
Figure 20A:
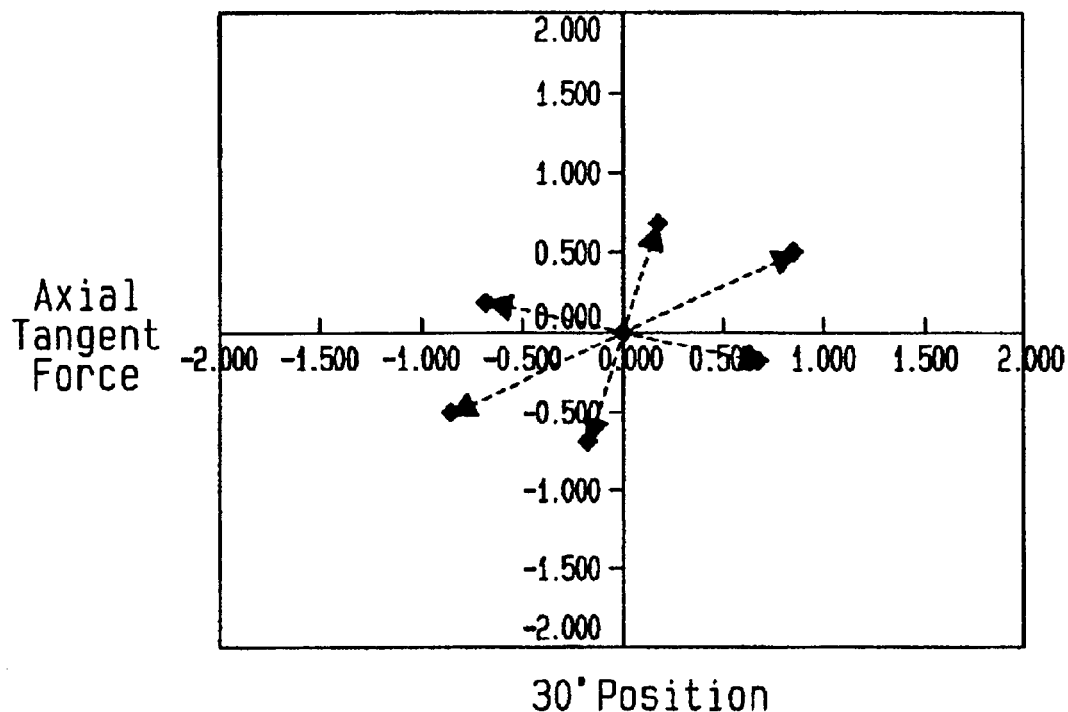
FIGS. 20(a) and 20(b) are graphs showing axial tangent force and axial normal force in a six-pole eight-tooth direct-current motor when the angle of the armature is thirty degrees.
Figure 20B:
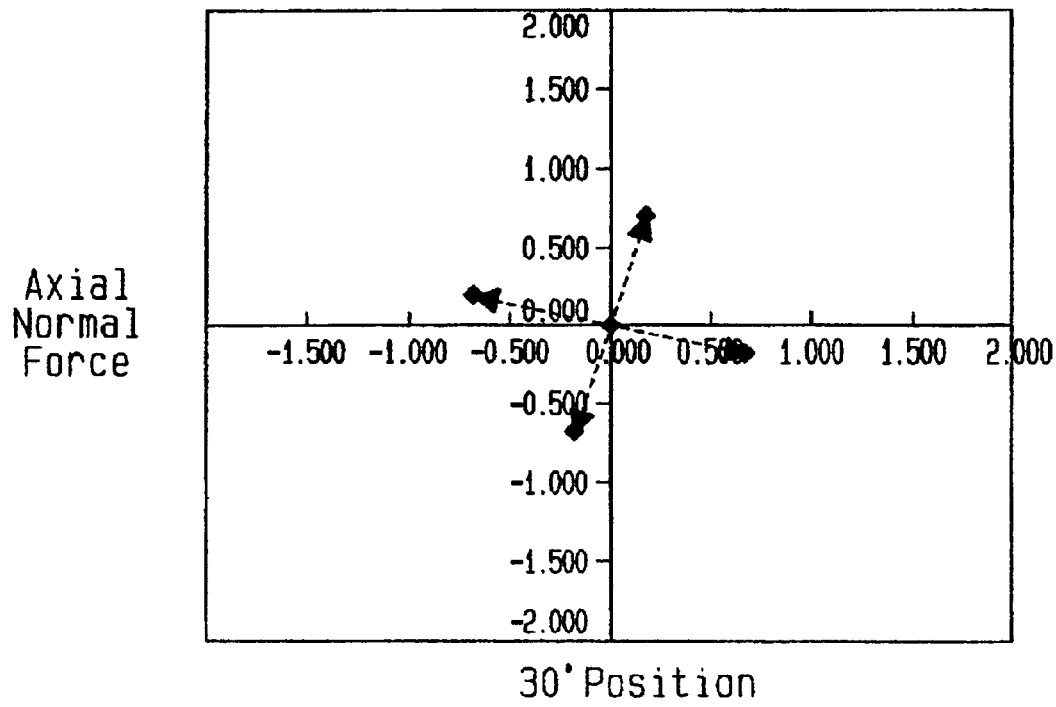
Figure 21:
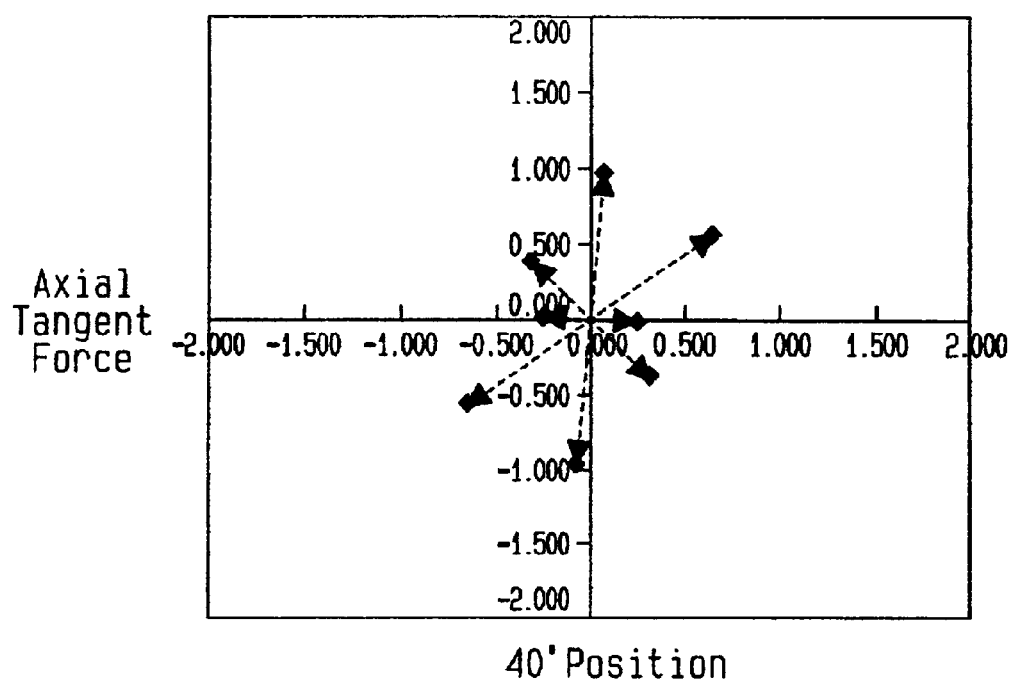
FIGS. 21(a) and 21(b) are graphs showing axial tangent force and axial normal force in a six-pole eight-tooth direct-current motor when the angle of the armature is forty degrees.
Figure 21:
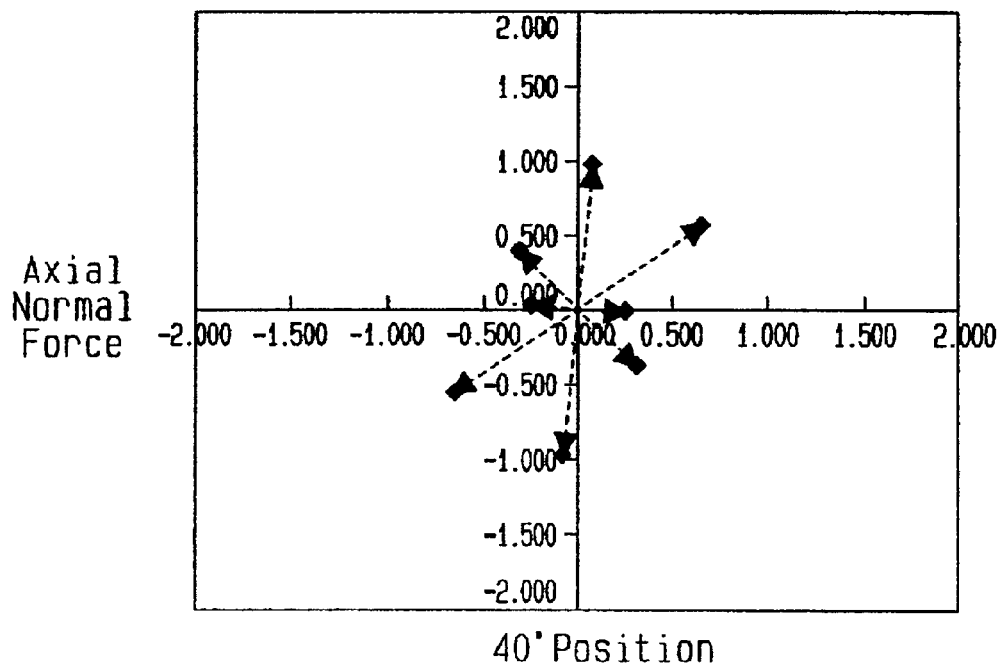
Figure 22A:
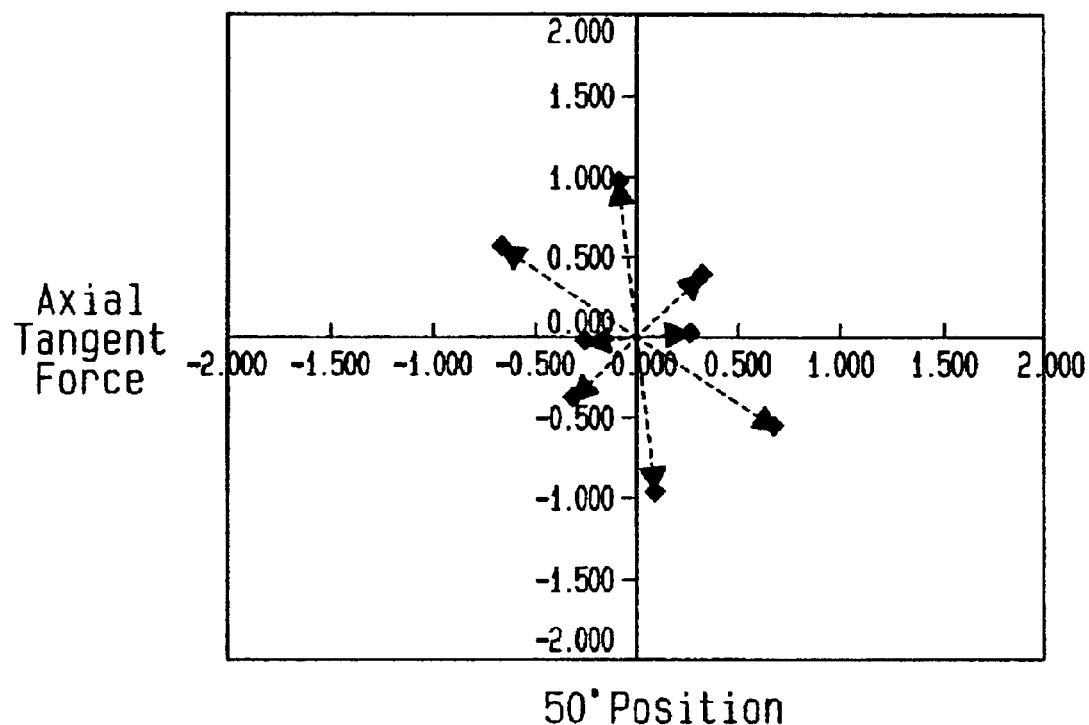
FIGS. 22(a) and 22(b) are graphs showing axial tangent force and axial normal force in a six-pole eight-tooth direct-current motor when the angle of the armature is fifty degrees.
Figure 22B:
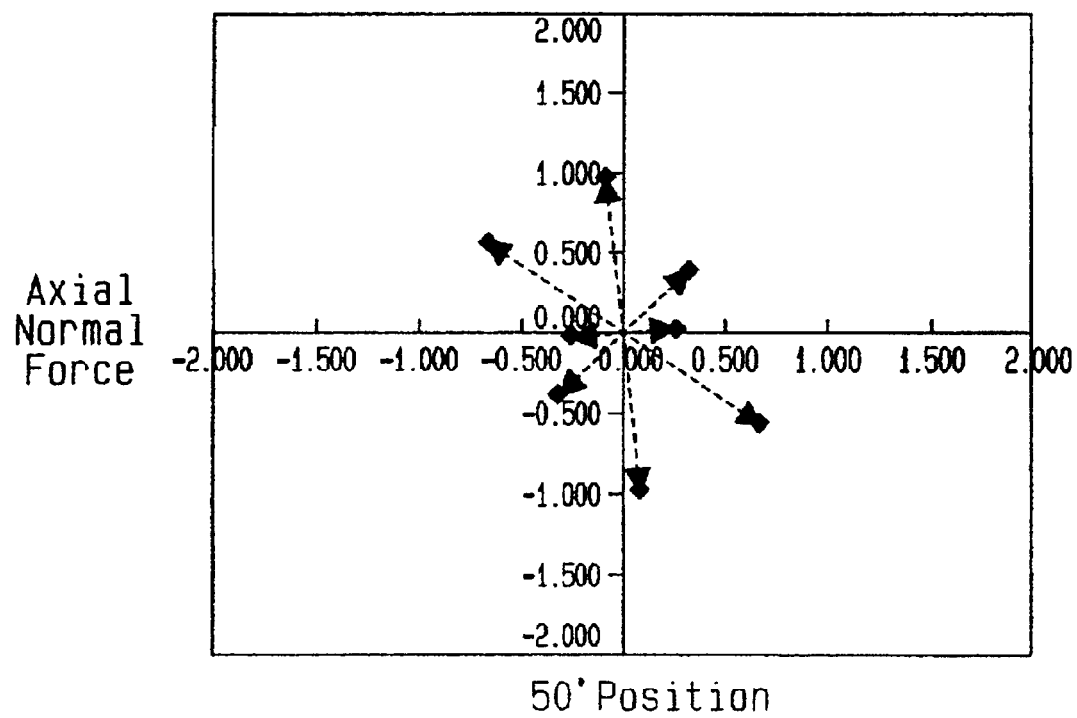
Figure 23A:
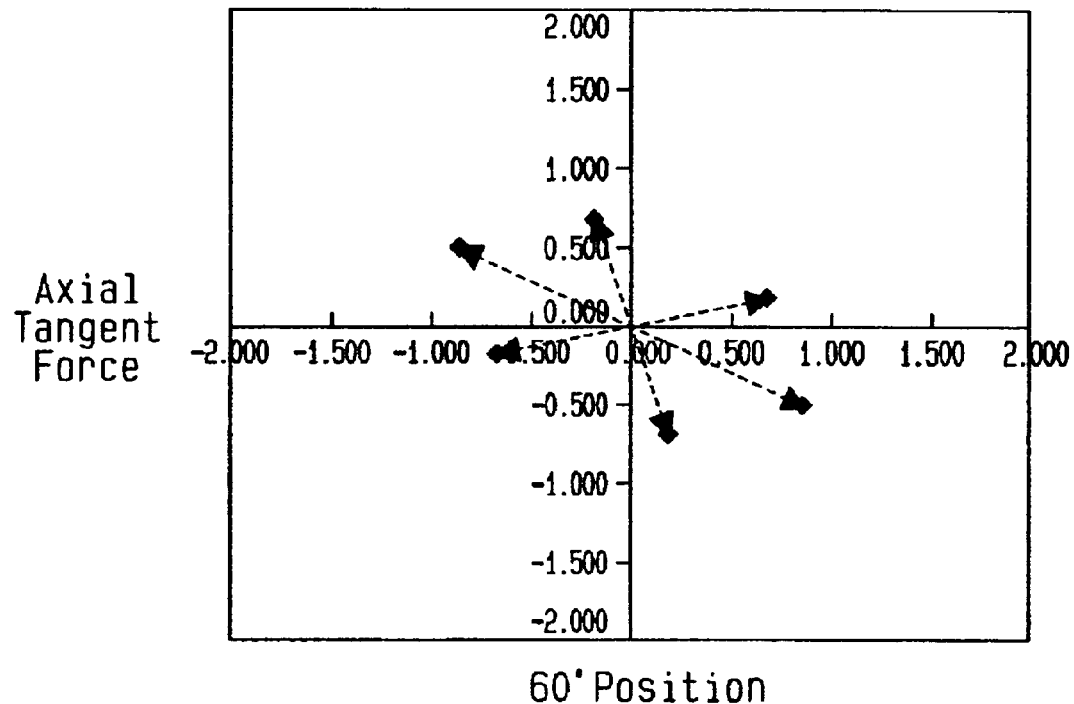
FIGS. 23(a) and 23(b) are graphs showing axial tangent force and axial normal force in a six-pole eight-tooth direct-current motor when the angle of the armature is sixty degrees.
Figure 23B:
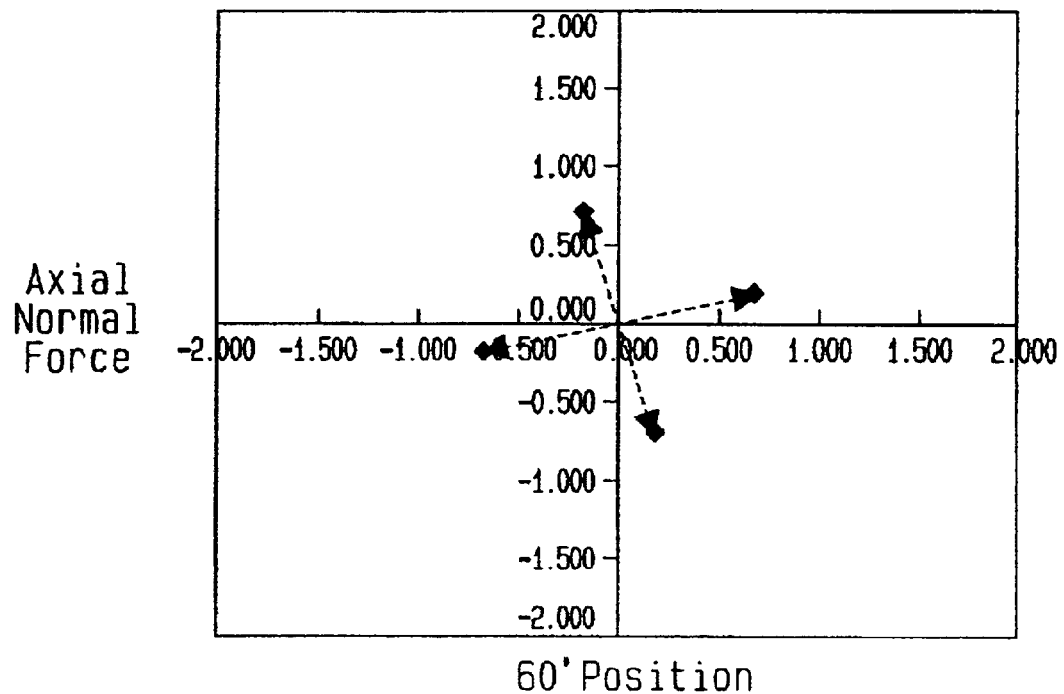
Figure 24A:
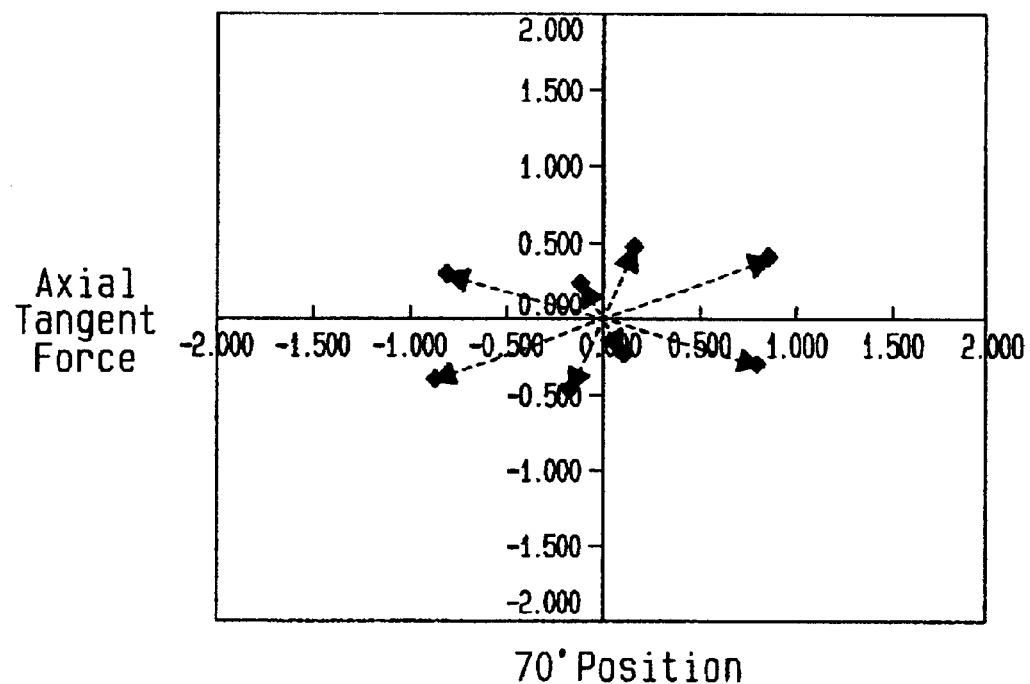
FIGS. 24(a) and 24(b) are graphs showing axial tangent force and axial normal force in a six-pole eight-tooth direct-current motor when the angle of the armature is seventy degrees.
Figure 24B:
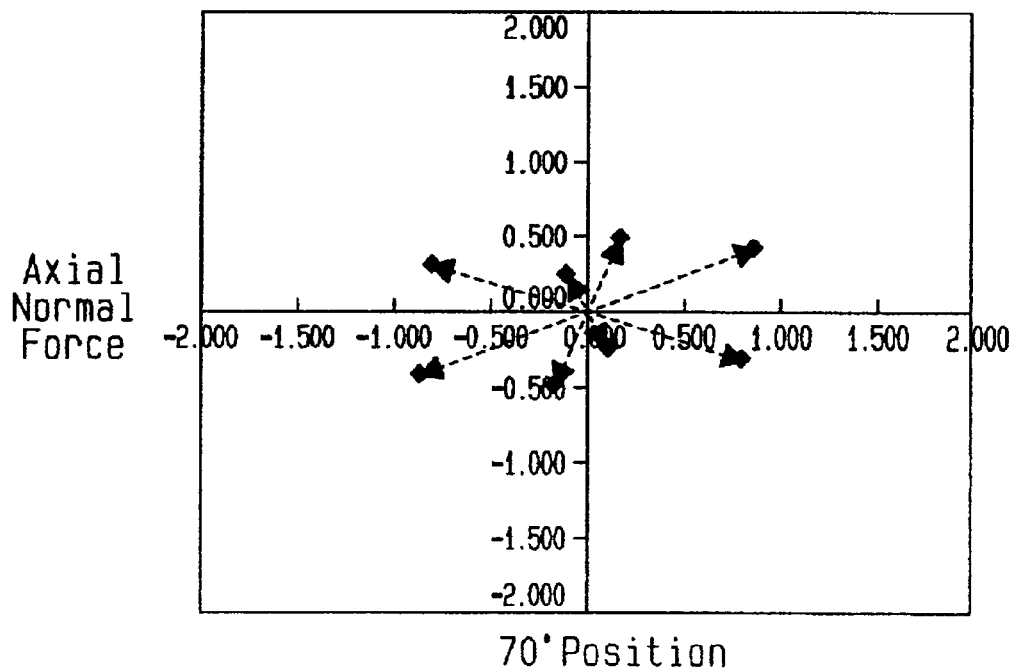
Figure 25A:
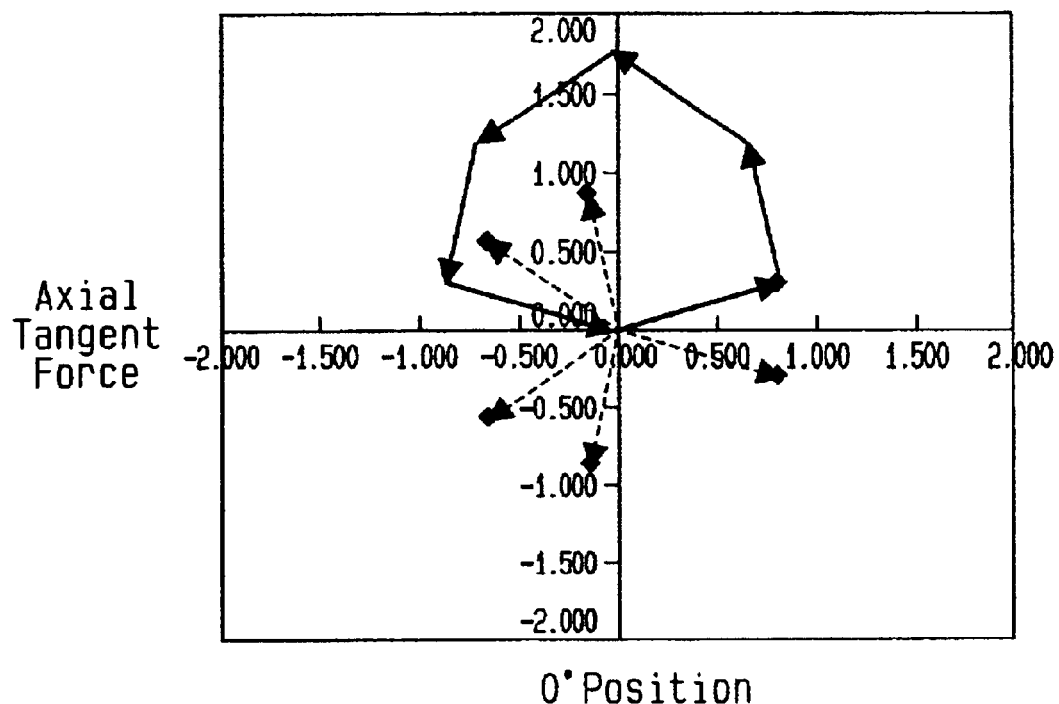
FIGS. 25(a) and 25(b) are graphs showing axial tangent force and axial normal force in a six-pole nine-tooth direct-current motor when the angle of the armature is zero degrees.
Figure 25B:
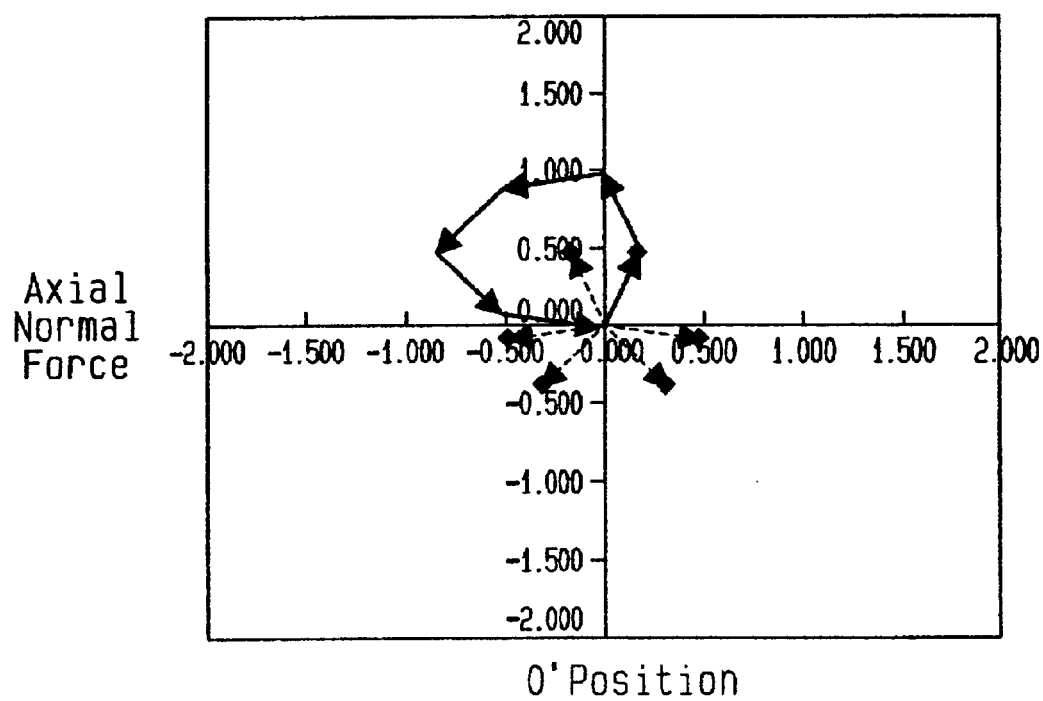
Figure 26A:
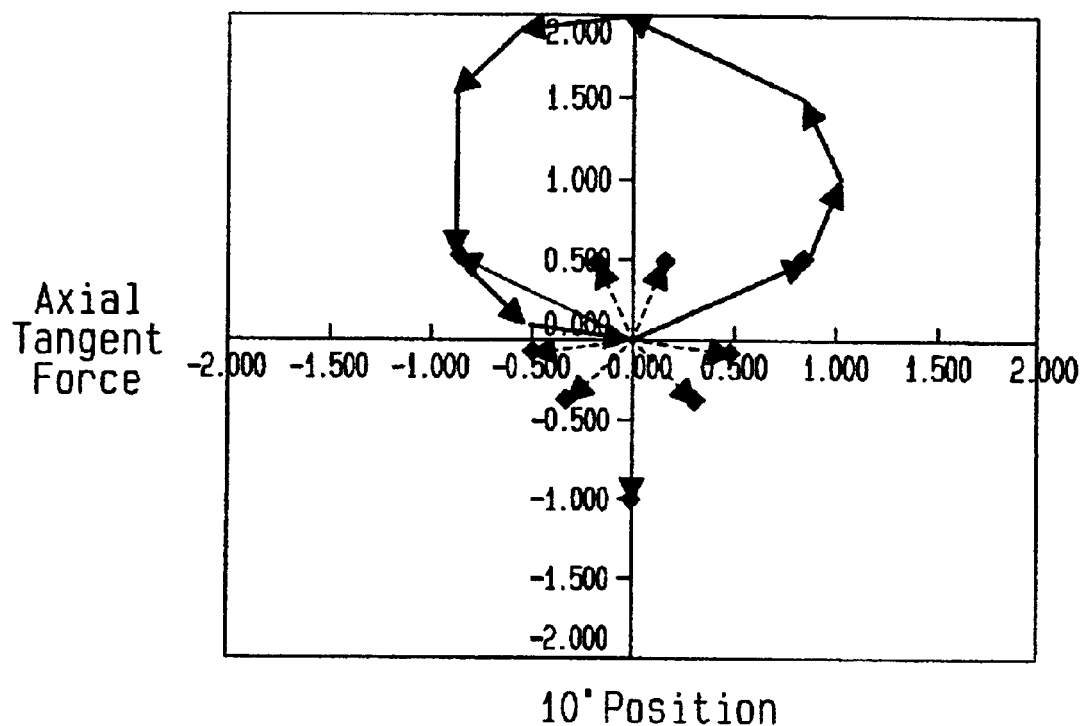
FIGS. 26(a) and 26(b) are graphs showing axial tangent force and axial normal force in a six-pole nine-tooth direct-current motor when the angle of the armature is ten degrees.
Figure 26B:
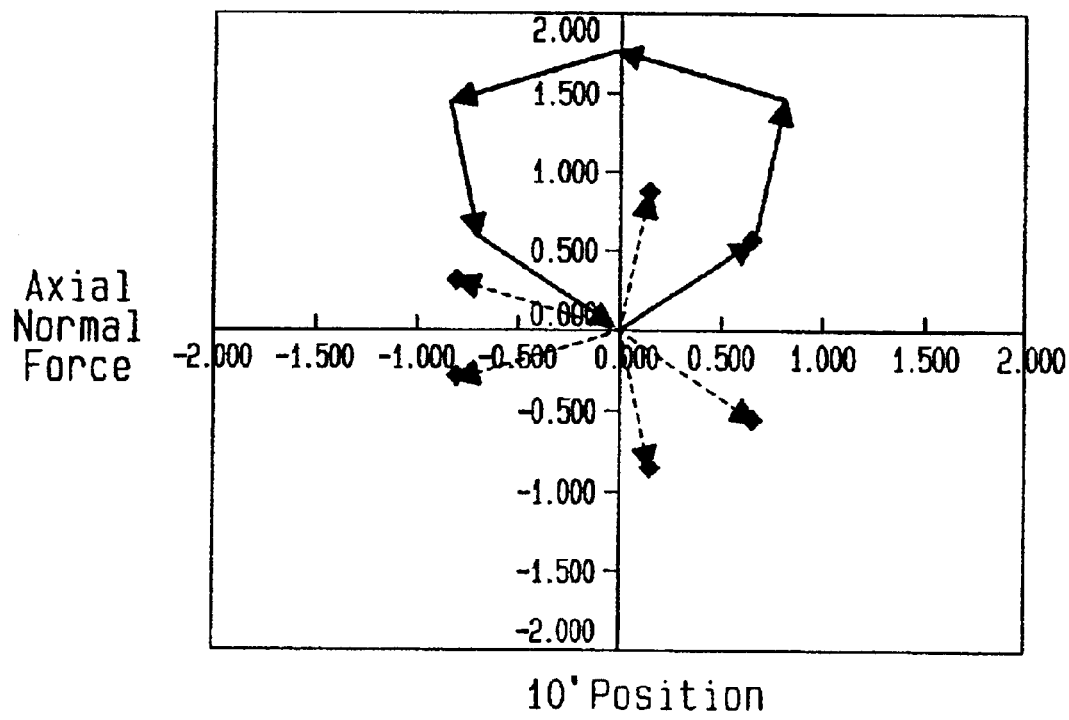
Figure 27A:
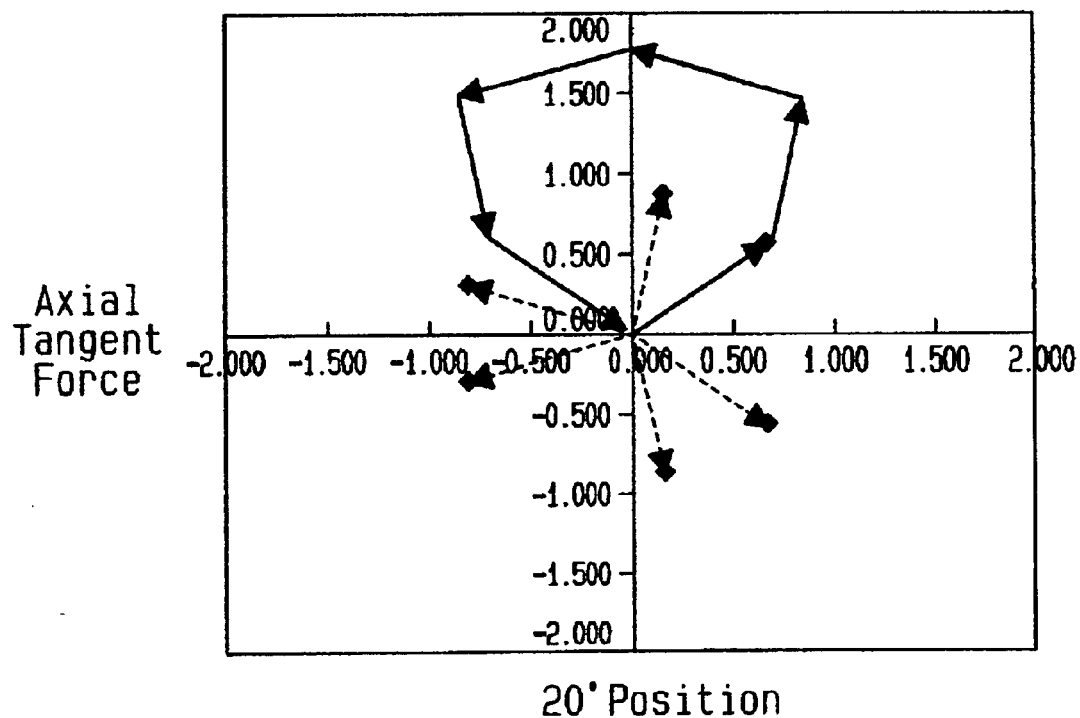
FIGS. 27(a) and 27(b) are graphs showing axial tangent force and axial normal force in a six-pole nine-tooth direct-current motor when the angle of the armature is twenty degrees.
Figure 27B:
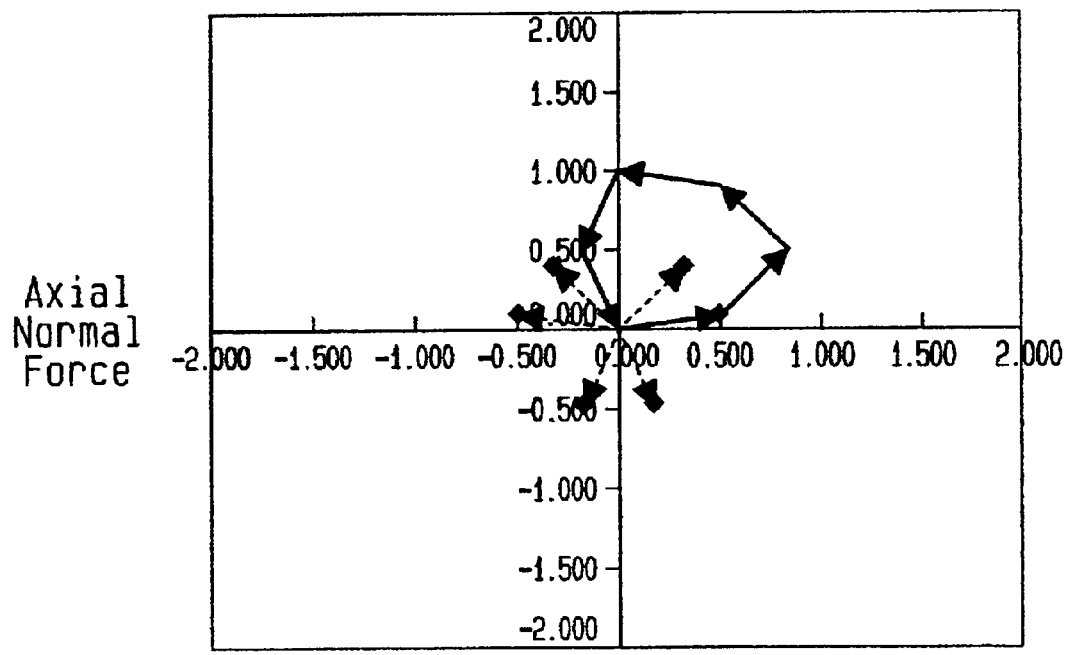
Figure 28A:
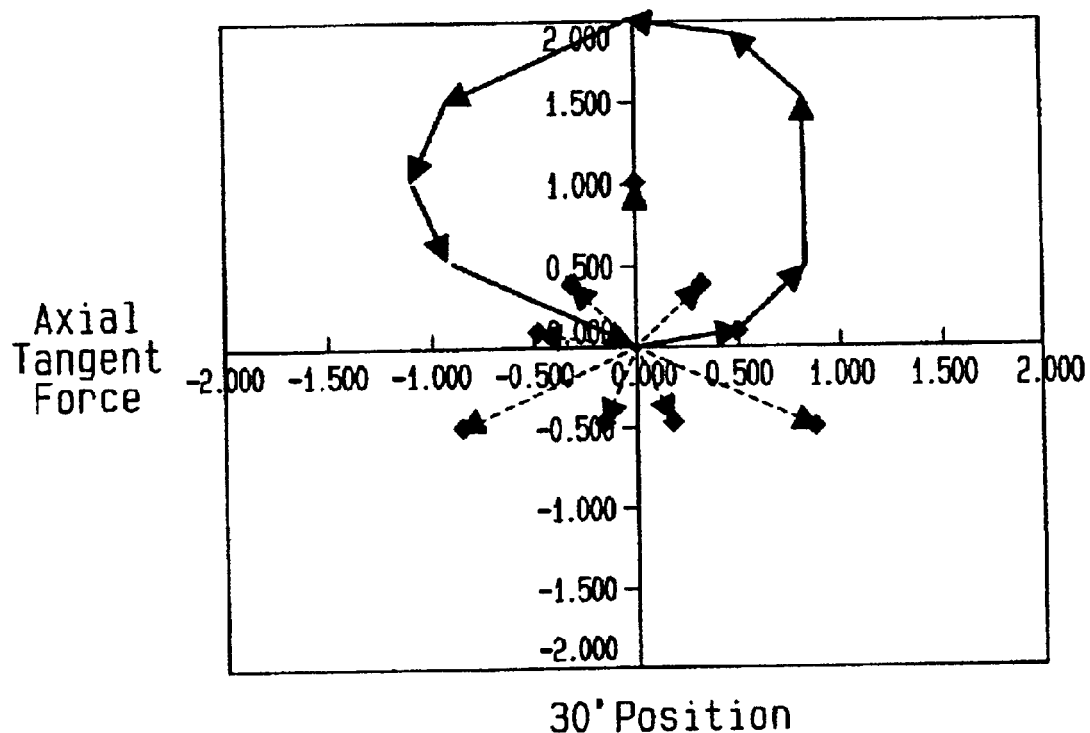
FIGS. 28(a) and 28(b) are graphs showing axial tangent force and axial normal force in a six-pole nine-tooth direct-current motor when the angle of the armature is thirty degrees.
Figure 28B:
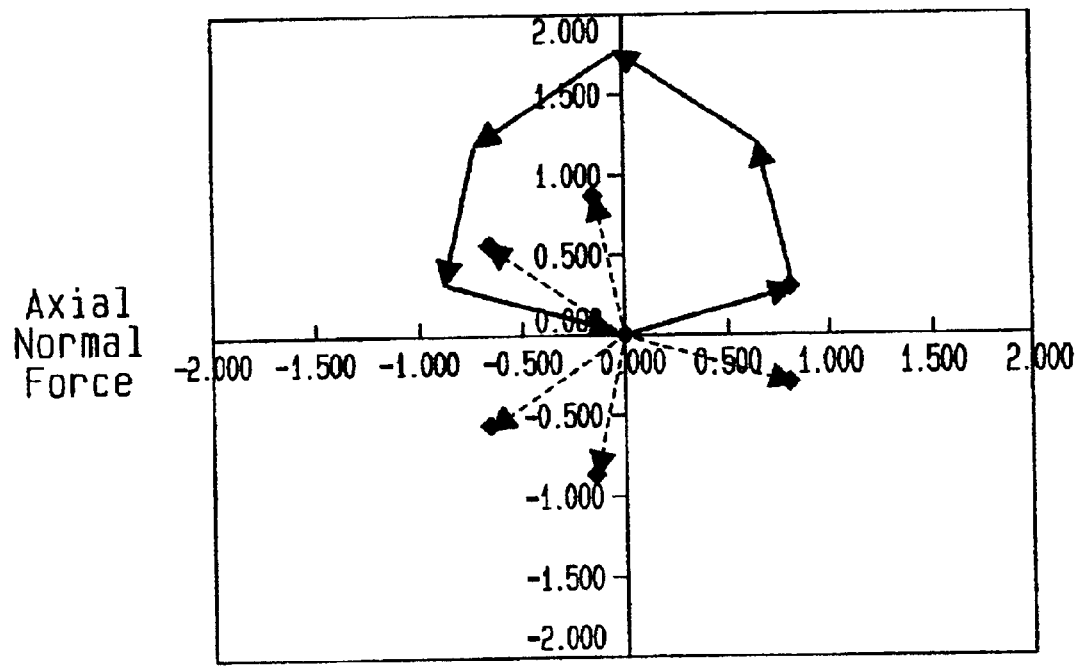
Figure 29A:
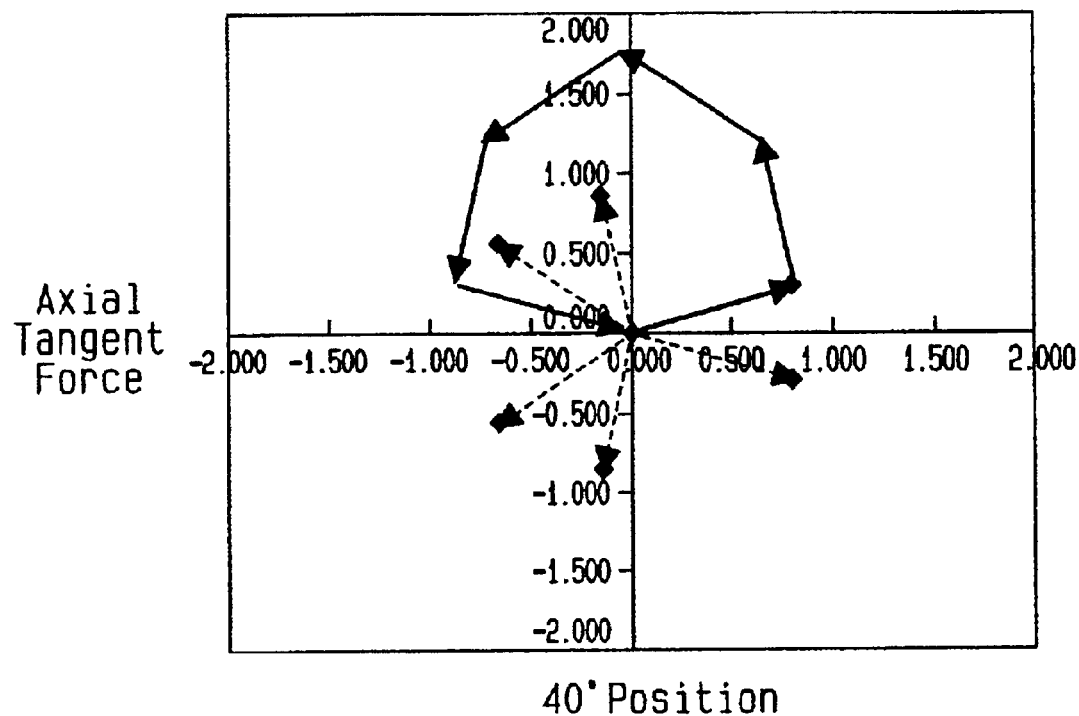
FIGS. 29(a) and 29(b) are graphs showing axial tangent force and axial normal force in a six-pole nine-tooth direct-current motor when the angle of the armature is forty degrees.
Figure 29B:
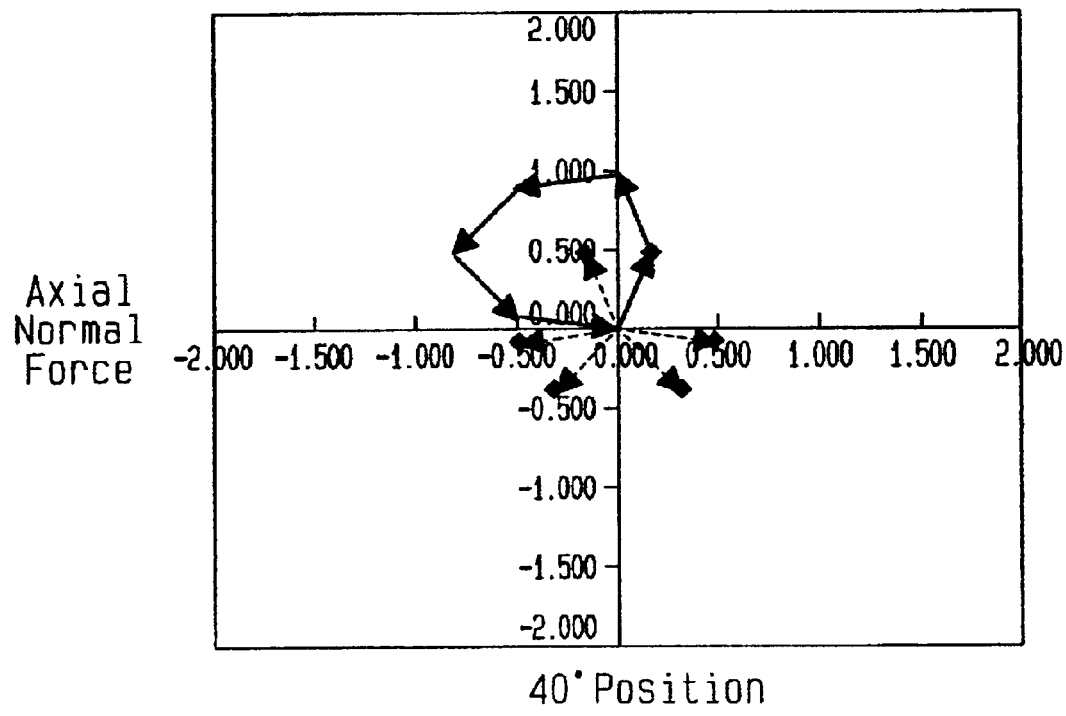
Figure 30A:
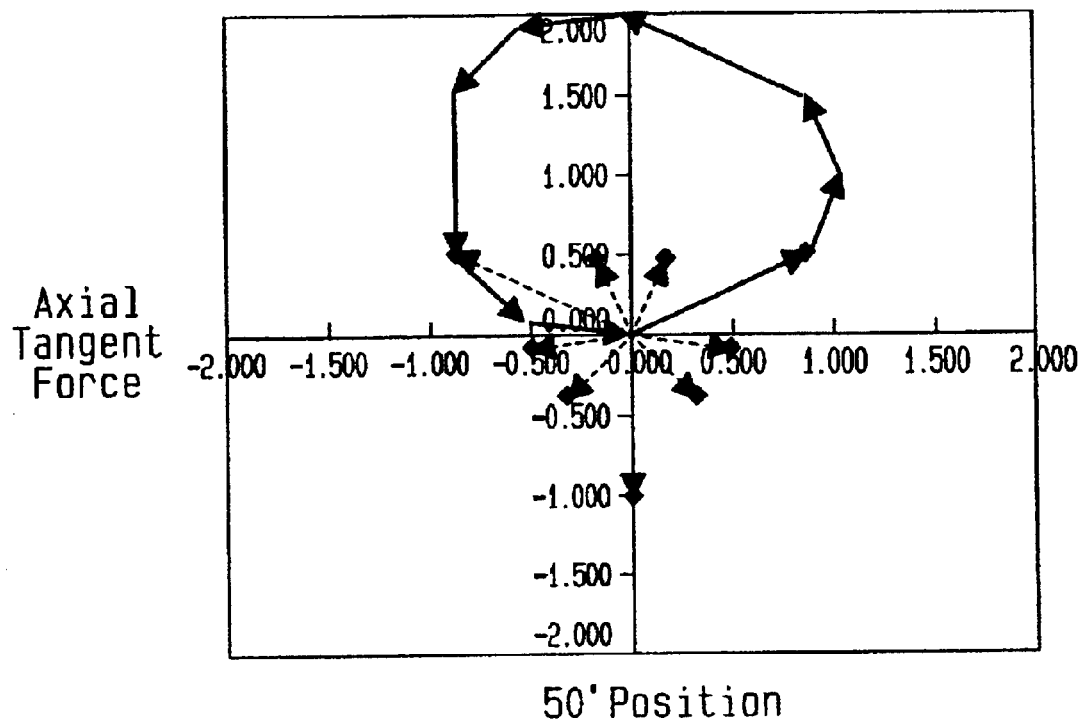
FIGS. 30(a) and 30(b) are graphs showing axial tangent force and axial normal force in a six-pole nine-tooth direct-current motor when the angle of the armature is fifty degrees.
Figure 30B:
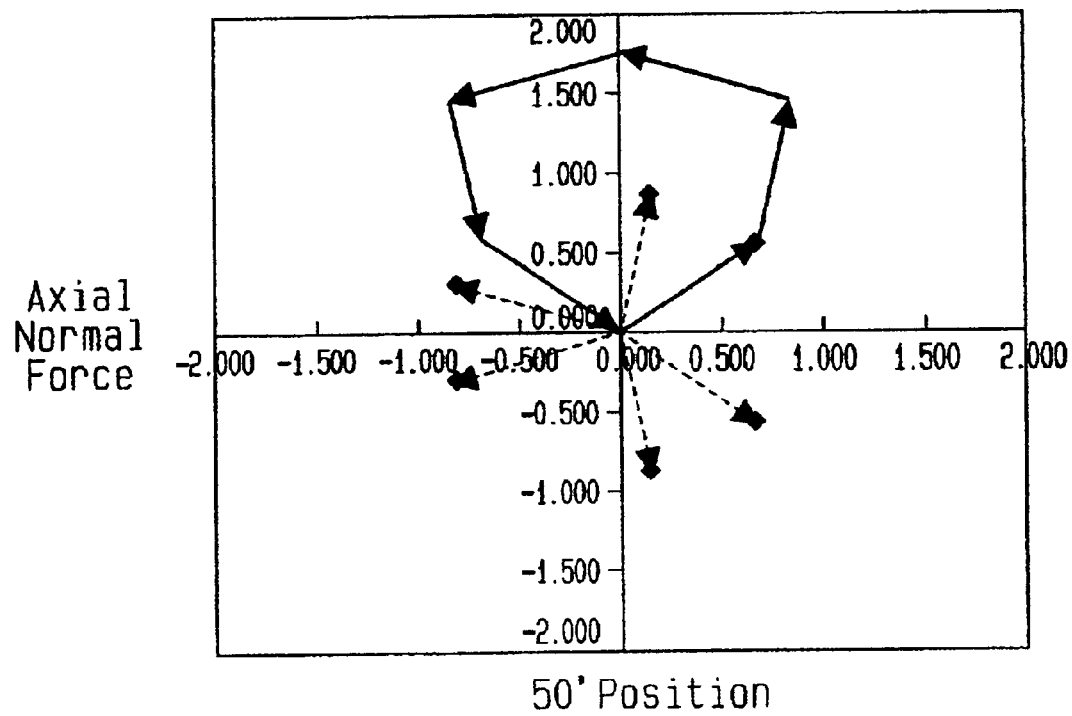
Figure 31:
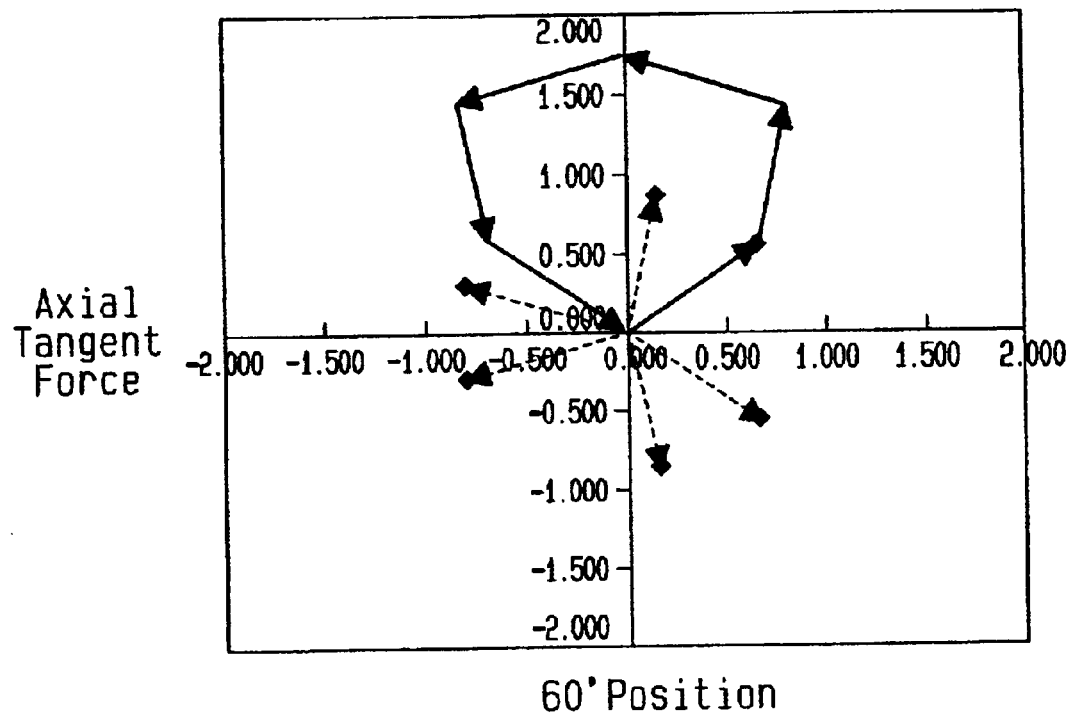
FIGS. 31(a) and 31(b) are graphs showing axial tangent force and axial normal force in a six-pole nine-tooth direct-current motor when the angle of the armature is sixty degrees.
Figure 31:
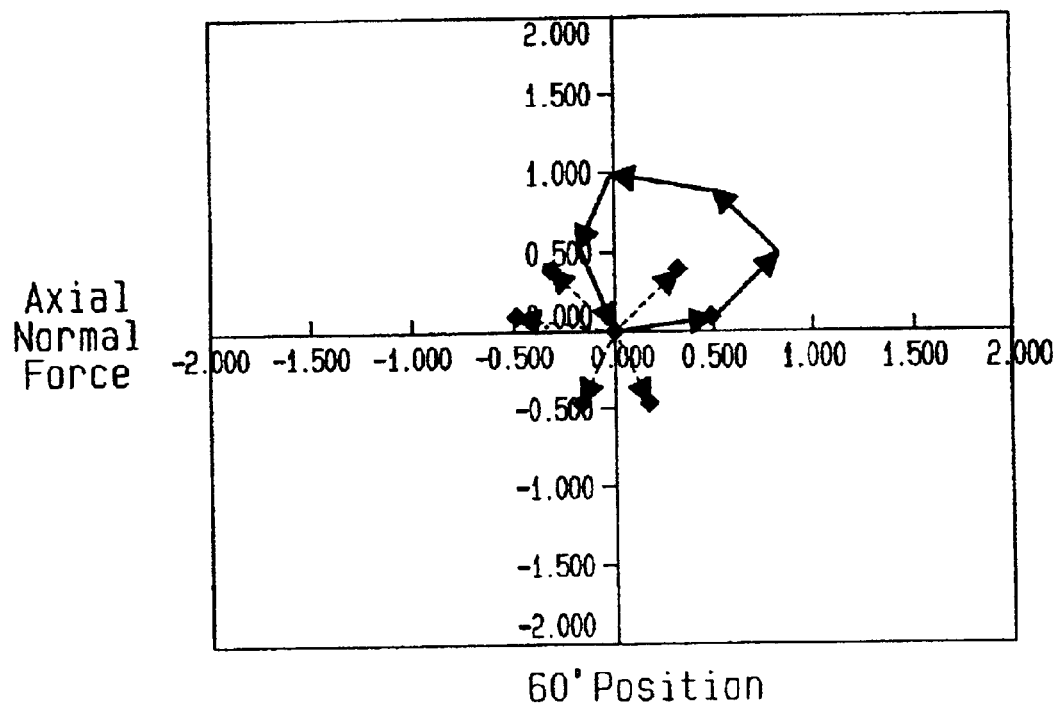
Figure 32A:
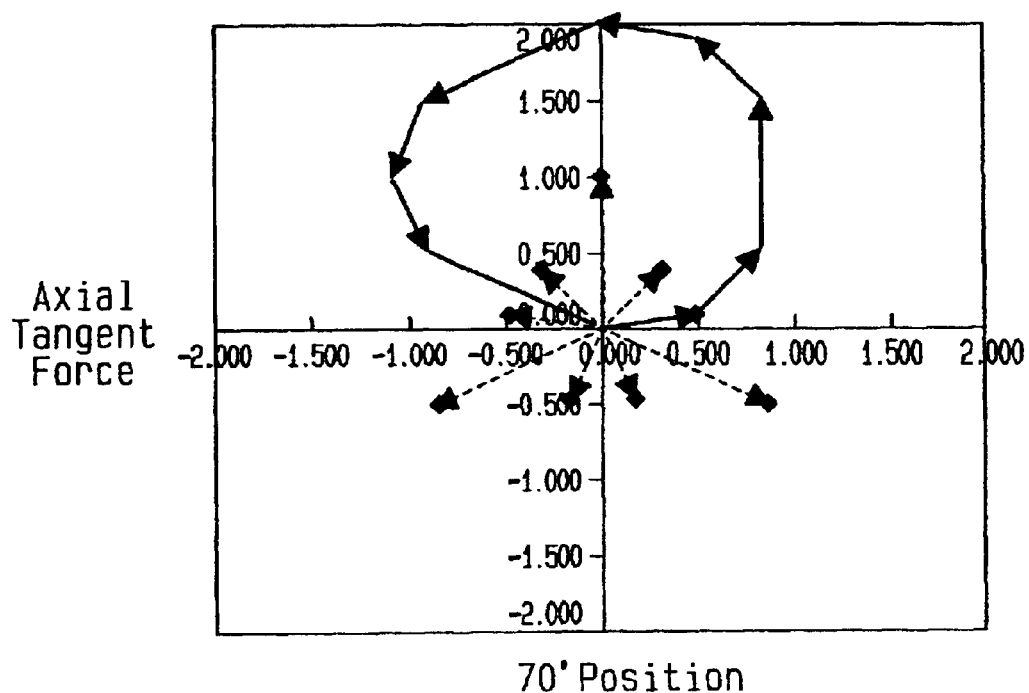
FIGS. 32(a) and 32(b) are graphs showing axial tangent force and axial normal force in a six-pole nine-tooth direct-current motor when the angle of the armature is seventy degrees.
Figure 32B:
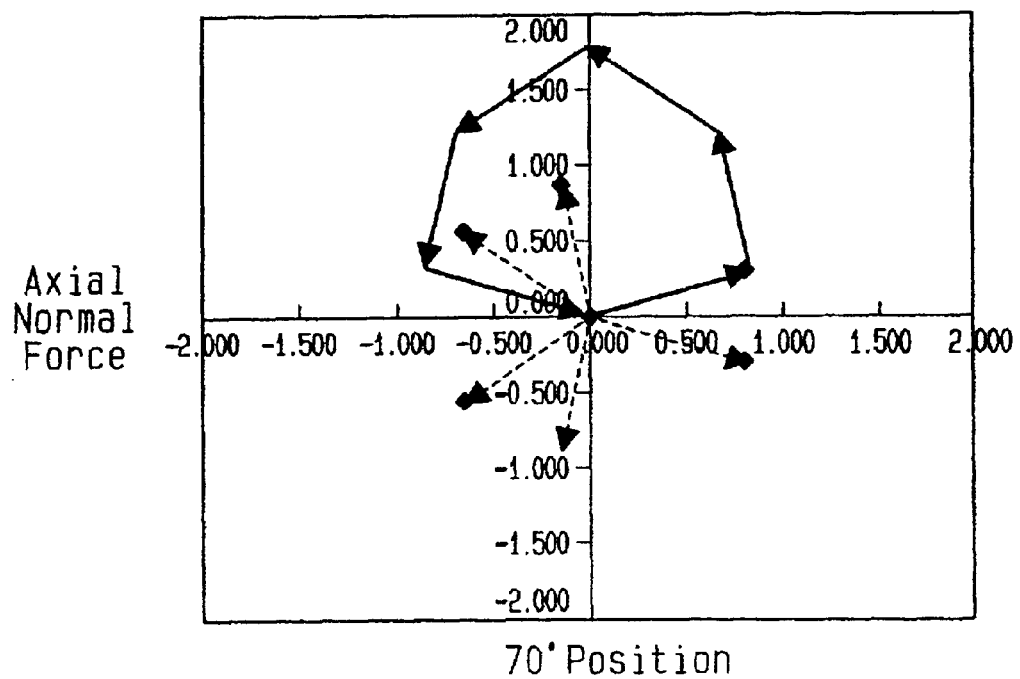

FIGS. 6 to 8 are charts showing the relationship among the number 2 m of the poles (2 m=2 to 24), the number n of the teeth (n=3 to 25), the short-pitch factor K, axial tangent forces TF and axial normal forces NF, and the number H of the peaks of cogging torque.

As shown in FIGS. 6 to 8, the axial tangent force TF and the axial normal force NF acting on the armature become zero when the number 2 m of the poles and the number n of the teeth satisfy the formula (A) and the number n of the teeth satisfies the formula (D).

$$\mathrm{mod}(n,2)=0 \quad (D)$$

The formula (D) shows that the remainder is zero when the number n of the teeth is divided by two. That is, the axial tangent force TF and the axial normal force NF are zero when the number n of the teeth is an even number.

Also, as shown in FIGS. 6 to 8, the axial tangent force TF and the axial normal force NF acting on the armature become zero when the number 2 m of the poles and the number n of the teeth satisfy the formula (A) and the number n of the teeth satisfies the formulas (E), (F).

$$\mathrm{mod}(n, 2)=1 \text{ and } \mathrm{mod}((\text{a factor of } n)\times k, 2)=0 \quad (E)$$

$$(\text{a factor of } n)\times k=2m \quad (F)$$

k represents a natural number. Also, one is not used as a factor of the number n in the formulas (E), (F).

The formula (E) indicates that the remainder is one when the number n of the teeth is divided by two, and that the remainder is zero when a factor (except for one) of the number n is multiplied by a natural number k and is then divided by two. According to the formulas (E), (F), if the number n of the teeth n is an odd number, an even number is obtained by multiplying a factor (except for one) of the number n of the teeth by a natural number k. Also, when the number obtained by multiplying a factor (except for one) of the number n of the teeth by a natural number k is equal to the number 2 m of the poles, the axial tangent force TF and the axial normal force NF are zero.

For example, in a case of a six-pole seven-tooth direct-current motor, which corresponds to FIGS. 9(a) to 16(b), the number n of the teeth is seven (odd number), and the number n has only one factor, which is seven (one is excluded). There is no even number that satisfies the formula (F), or twelve, which corresponds to the number 2 m of the poles, in the resultant of the formula (a factor of n)×k (7, 14, 21, 28...). Thus, the axial tangent force TF and the axial normal force NF acting on the armature do not become zero (see FIG. 6).

In a case of a six-pole nine-tooth direct-current motor, which corresponds to FIGS. 25(a) to 32(b), the number n of the teeth is nine (odd number), and the number n has two factors, which are three and nine (one is excluded). For example, in the resultants (3, 6, 9, 12...) obtained by multiplying three, which is a factor of the number n, by a natural number k, there is an even number that satisfies the formula (F), or six, which corresponds to the number 2 m of the poles. Thus, the axial tangent force TF and the axial normal force NF acting on the armature become zero (see FIG. 6).

Therefore, when the number n of the teeth is an odd number, selecting a combination of the numbers 2 m and n that satisfies the formula (A) will reduce the axial tangent force TF and the axial normal force NF acting on the armature to zero. Thus, a motor having a armature that resists vibration is obtained.

In FIGS. 6 to 8, the short-pitch factor K corresponds to the number 2 m of the poles (2 m=2 to 24) and the number n of the teeth (n=3 to 25). A direct-current motor having a great output can be obtained by selecting a combination of the numbers 2 m and n that has a great value of the short-pitch factor K (for example K>0.9) in which the axial tangent force TF and the axial normal force NF are zero.

In FIGS. 6 to 8, the number H of pulsations of cogging torque corresponds to the number 2 m of the poles (2 m=2 to 24) and the number n of the teeth (n=3 to 25). A direct-current motor having a small cogging torque can be obtained by selecting a combination of the numbers 2 m and n that has a great value of the number H of cogging torque pulsations in which the axial tangent force TF and the axial normal force NF are zero.

The second embodiment has the following advantages.

(1) A combination of the number 2 m of the poles and number n of the teeth at which the axial tangent force TF and the axial normal force NF acting on the armature is zero is easily selected based on formulas (A), (D), (E) and (F).

(2) The formula (B) defines the value of the short-pitch factor K, which corresponds to the number 2 m of the poles and the number n of the teeth. Therefore, based on the formula (B), a direct-current motor having a great output is obtained by selecting a combination of the numbers 2 m and n at which the short-pitch factor K is great.

(3) The formula (C) defines the number H of pulsations (peaks) of cogging torque, which correspond to the number 2 m of the poles and the number n of the teeth. Therefore, based on the formula (C), a direct-current motor having a small cogging torque is obtained by selecting a combination of the numbers 2 m and n at which the number H is great.

The first and second embodiments may be modified as follows.

Figure 33:
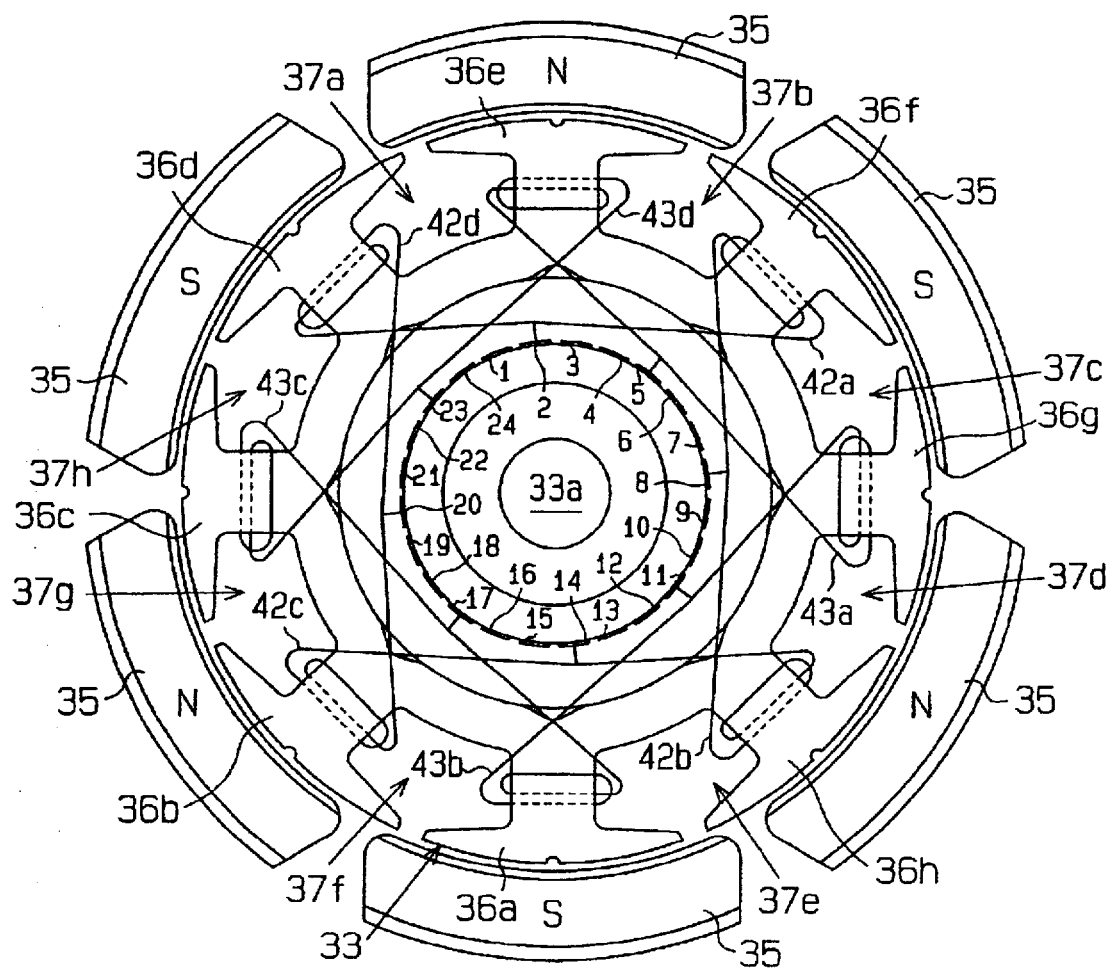
FIG. 33 is a plan view showing the coil structure of the armature of a direct-current motor according to a modification of the first embodiment.
Figure 34:
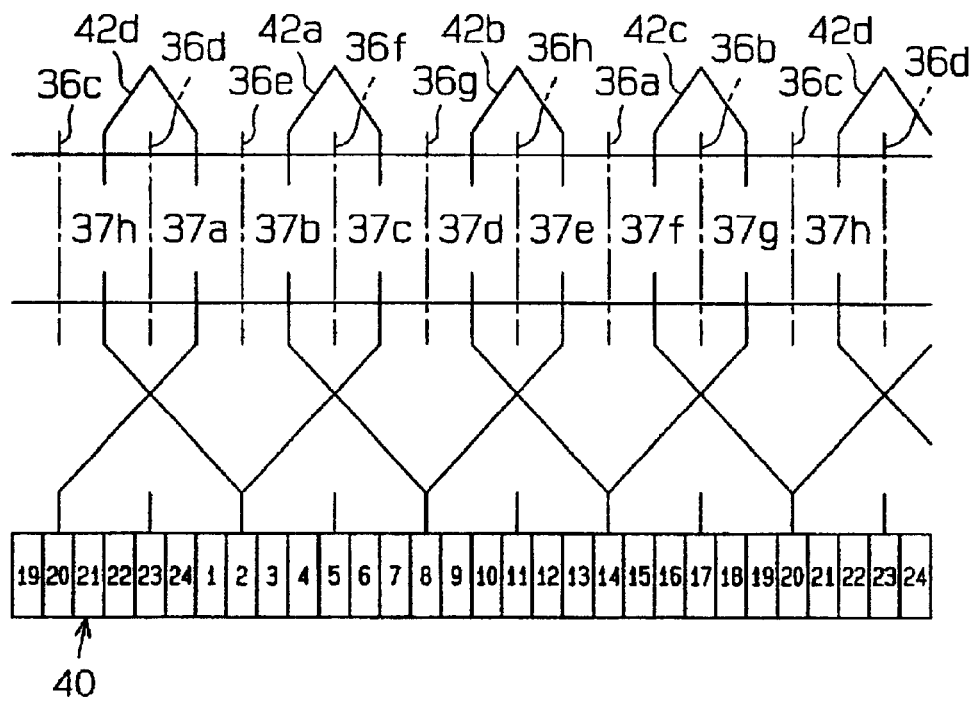
FIG. 34 is a developed diagram showing the coil structure of the armature shown in FIG. 33.

In the first embodiment, the procedure for providing the eight coils to the armature 33 may be divided into two procedures by using two conductor wires. Specifically, in the first coil winding procedure, one end of a conductor wire is connected to the second segment 2 as shown in FIGS. 33 and 34. The conductor wire is wound about the sixth tooth 36f for a predetermined number of turns to form a coil 42a, and is then connected to the eighth segment 8. After being connected to the eighth segment 8, the conductor wire is wound about the eighth tooth 36h for a predetermined number of turns to form a coil 42b, and is connected to the fourteenth segment 14. After being connected to the fourteenth segment 14, the conductor wire is wound about the second tooth 36b for a predetermined number of turns to form a coil 42c, and is connected to the twentieth segment 20. After being connected to the twentieth segment 20, the conductor wire is wound about the fourth tooth 36d for a predetermined number of turns to form a coil 42d, and is connected to the second segment 2.

Figure 35:
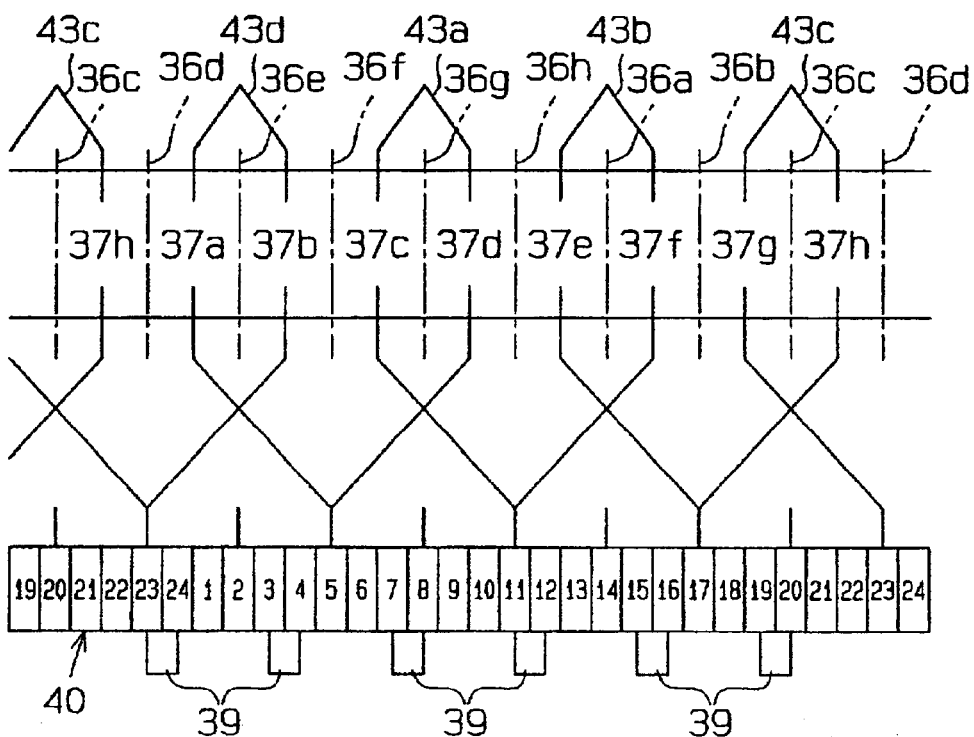
FIG. 35 is a developed diagram showing the coil structure of the armature shown in FIG. 33.

In the next coil winding procedure, one end of a conductor wire is connected to the fifth segment 5 as shown in FIGS. 33 and 35. The conductor wire is wound about the seventh tooth 36g for a predetermined number of turns to form a coil 43a, and is then connected to the eleventh segment 11. After being connected to the eleventh segment 11, the conductor wire is wound about the first tooth 36a for a predetermined number of turns to form a coil 43b, and is connected to the seventeenth segment 17. After being connected to the seventeenth segment 17, the conductor wire is wound about the third tooth 36c for a predetermined number of turns to form a coil 43c, and is connected to the twenty-third segment 23. After being connected to the twenty-third segment 23, the conductor wire is wound about the fifth tooth 36e for a predetermined number of turns to form a coil 43d, and is connected to the fifth segment 5.

In the structure shown in FIGS. 33 to 35, there are two parallel circuits to which electricity is supplied from the six brushes 39. Compared to a case in which there is only one parallel circuit, the current through each of the coils 42a to 42d, 43a to 43d is reduced to the half. Therefore, if the current density of each of the coils 42a to 42d, 43a to 43d is set equal to the case of a single parallel circuit, the cross-sectional area of each coil 42a to 42d, 43a to 43d can be reduced to the half and the diameter of each coil 42a to 43d, 43a to 43d can be reduced, accordingly. Therefore, the coils 42a to 42d, 43a to 43d are systematically wound about the teeth, which minimizes the space between the each adjacent pair of the coils. In this case, the circumferential dimension of each brush 39 needs to be wider than the circumferential dimension of each segment 40 of the commutator 38. That is, each brush 39 needs to simultaneously contact an adjacent pair of the segments 40.

Figure 36:
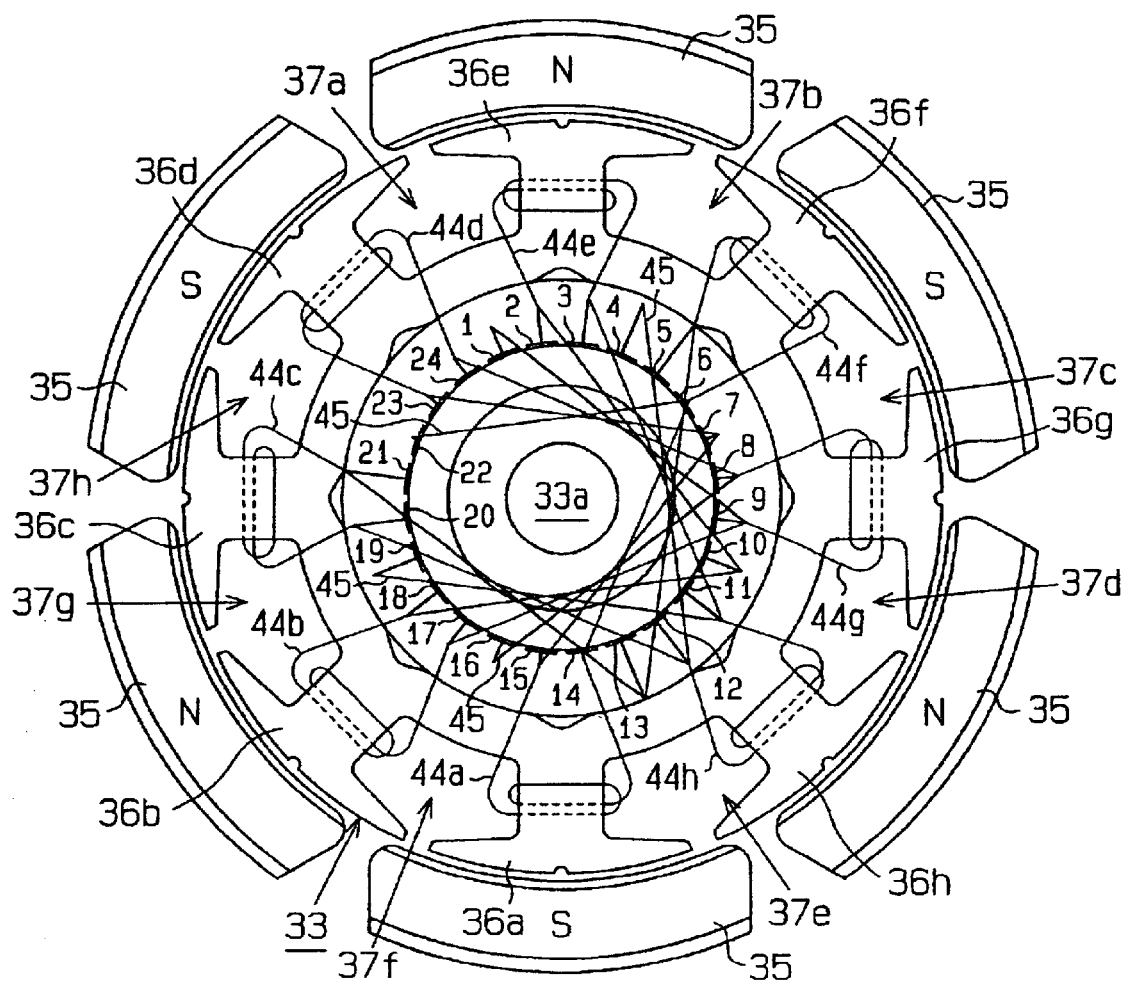
FIG. 36 is a plan view showing the coil structure of the armature of a direct-current motor according to a further modification of the first embodiment.
Figure 37:
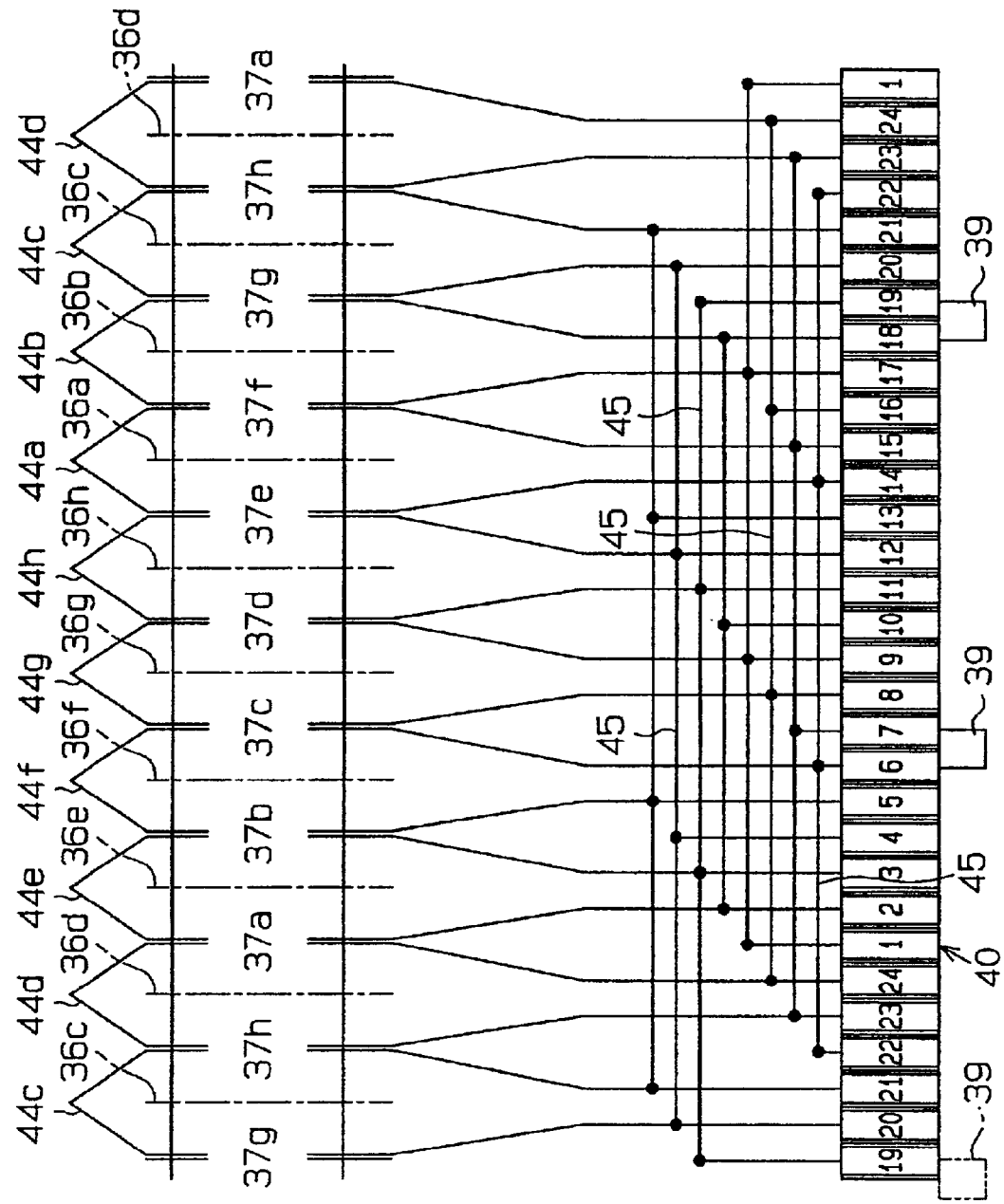
FIG. 37 is a developed diagram showing the coil structure of the armature shown in FIG. 36.

In the first embodiment, a short circuit may be established in each set of three segments 40 that are spaced by one-hundred-twenty-degree intervals. Specifically, as shown in FIGS. 36 and 37, a conductor wire is first connected to the first segment and is then connected to the ninth segment. Thereafter, the conductor wire is wound about the seventh tooth 36g for a predetermined number of turns to form a coil 44g, and is then connected to the eighth segment 8. After being connected to the eighth segment 8, the conductor wire is connected to the twenty-fourth segment 24. The conductor wire is then wound about the fourth tooth 36d for a predetermined number of turns to form a coil 44d, and is connected to the twenty-third segments 23. After being connected to the twenty-third segment 23, the conductor wire is connected to the seventh segment 7. The conductor wire is then connected to the fifteenth segment 15.

After being connected to the fifteenth segment 15, the conductor wire is wound about the first tooth 36a for a predetermined number of turns to form a coil 44a, and is connected to the fourteenth segment 14. After being connected to the fourteenth segment 14, the conductor wire is connected to the sixth segment 6. The conductor wire is then wound about the sixth tooth 36f for a predetermined number of turns to form a coil 44f, and is connected to the fifth segment 5. After being connected to the fifth segment 5, the conductor wire is connected to the thirteenth segment 13. The conductor wire is then connected to the twenty-first segment 21.

After being connected to the twenty-first segment 21, the conductor wire is wound about the third tooth 36c for a predetermined number of turns to form a coil 44c, and is connected to the twentieth segment 20. After being connected to the twentieth segment 20, the conductor wire is connected to the twelfth segment 12. The conductor wire is then wound about the eighth tooth 36h for a predetermined number of turns to form a coil 44h, and is connected to the eleventh segment 11. After being connected to the eleventh segment 11, the conductor wire is connected to the third segment 3. The conductor wire is then wound about the fifth tooth 36e for a predetermined number of turns to form a coil 44e, and is connected to the second segment 2. After being connected to the second segment 2, the conductor wire is connected to the tenth segment 10. The conductor wire is then connected to the eighteenth segment 18.

After connected to the eighteenth segment 18, the conductor wire is wound about the second tooth 36b for a predetermined number of turns to form a coil 44b, and is connected to the seventeenth segment 17. The, the conductor wire is connected to the ninth segment 9.

Then, the sixteenth segment 16 and the eighth segment 8 are connected to each other through a connecting wire 45, which is independent from the conductor wire forming the coils. The nineteenth segment 19 and the eleventh segment 11 are connected to each other through a connecting wire 45. Also, the twenty-second segment 22 and the sixth segment 6 are connected to each other through a connecting wire 45. The fourth segment 4 and the twelfth segment 12 are connected to each other through a connecting wire 45.

In this structure, a short circuit is established in each set of three of the segments 40 that are spaced by one-hundred-twenty-degree intervals, or in three of the segments 40 that are in the same phase in relation with the magnets 35. Therefore, the number of the brushes 39 can be reduced to two as shown in FIG. 37. As a result, the number of the parts and the costs are reduced.

In the above embodiments, the poles (the magnets 35) function as a stator, and the armature 33 functions as a rotor. However, the poles (the magnets 35) may function as a rotor, and the armature 33 may function as a stator.

A third embodiment will now be described.

Figure 38:
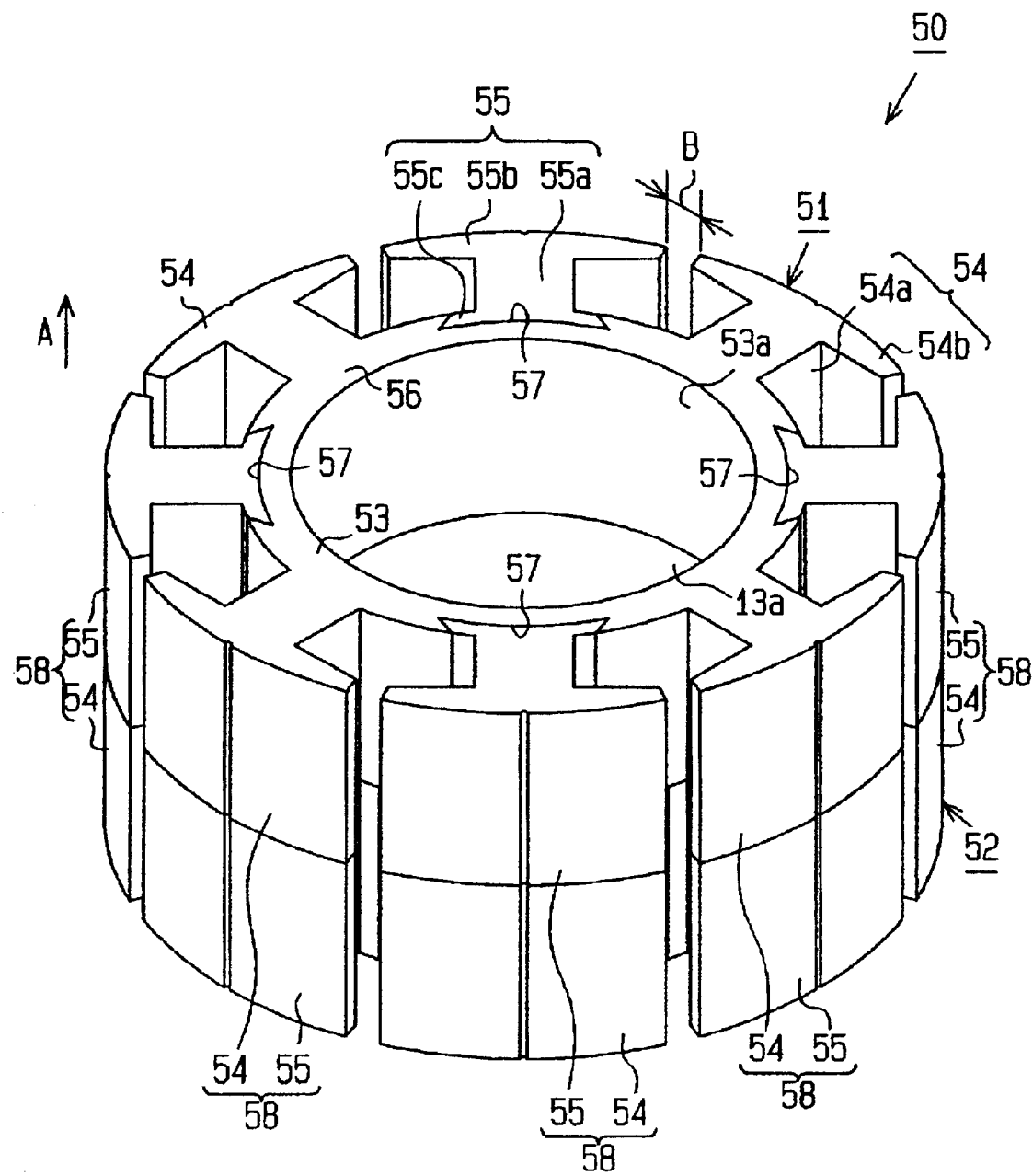
FIG. 38 is a perspective view illustrating a core according to a third embodiment of the present invention.
Figure 39:
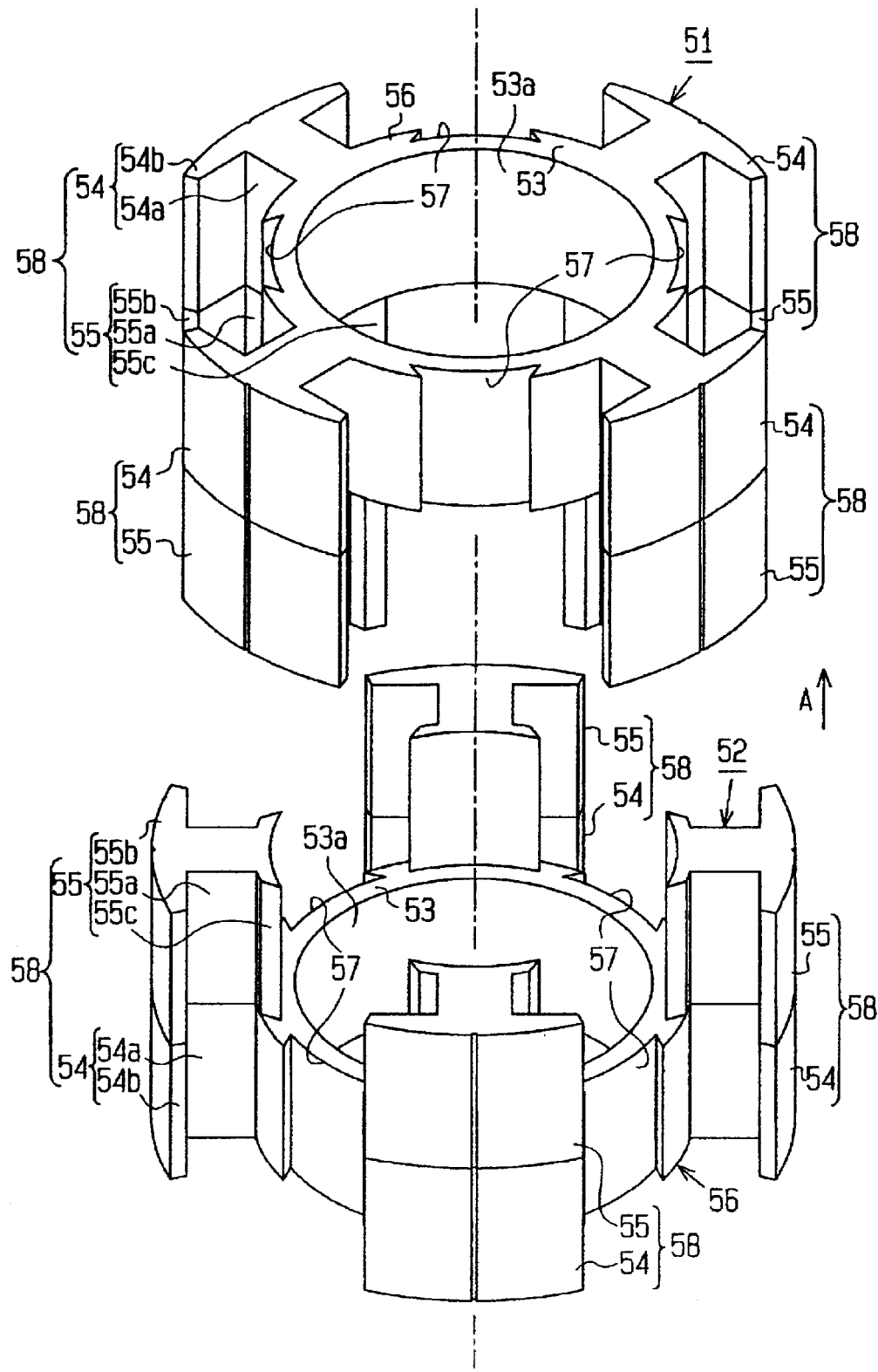
FIG. 39 is an exploded perspective view showing the core shown in FIG. 38.

As shown in FIGS. 38 and 39, the core 50 functions as a rotor and includes a first core piece 51 and a second core piece 52, which are engaged with each other. The first core pieces 51, 52 have the same structure. Specifically, each of the core pieces 51, 52 includes a ring 53 having a center hole 53a and integral tooth members 54, the number of which is four in this embodiment. The tooth members 54 are integrally formed with the ring 53 and arranged at equal angular intervals (ninety degrees). The tooth members 54 extend radially outward from the ring 53. Also, each of the core pieces 51, 52 includes separate tooth members 55, the number of which is four in this embodiment. Each separate tooth member 55 is located on one of the integral tooth members 54. Each integral tooth member 54 has a coil winding section 54a and a distal section 54b, which is formed at the distal end of the coil winding section 54a. The ring 53 and the integral tooth members 54 form a core work 56 shown in FIG. 42.

Figure 40:
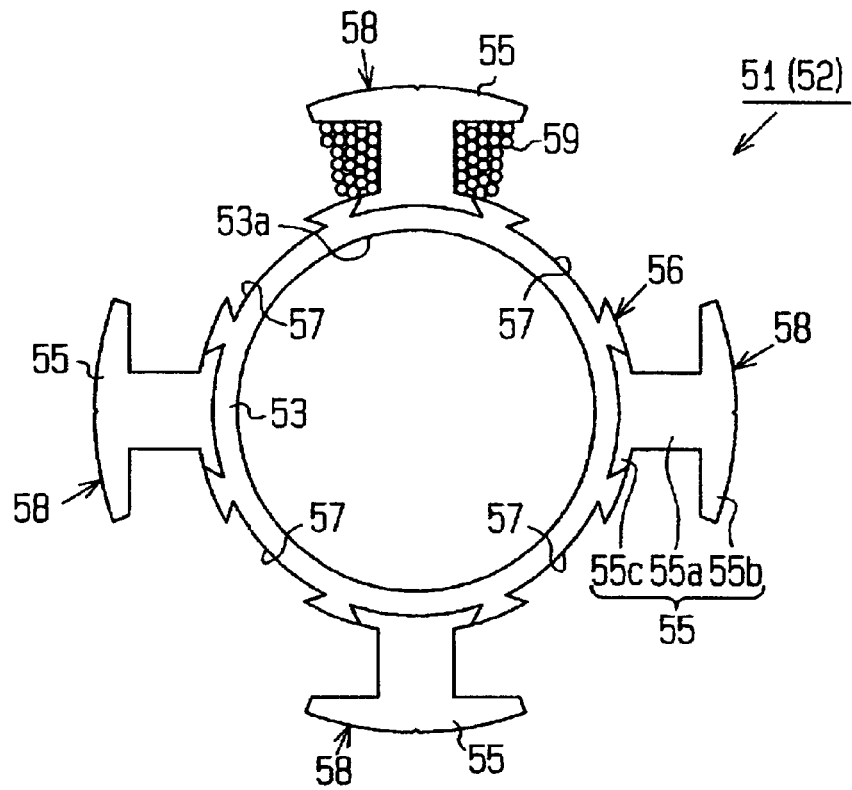
FIG. 40 is a plan view illustrating the first or second core piece of the core shown in FIG. 38.
Figure 42:
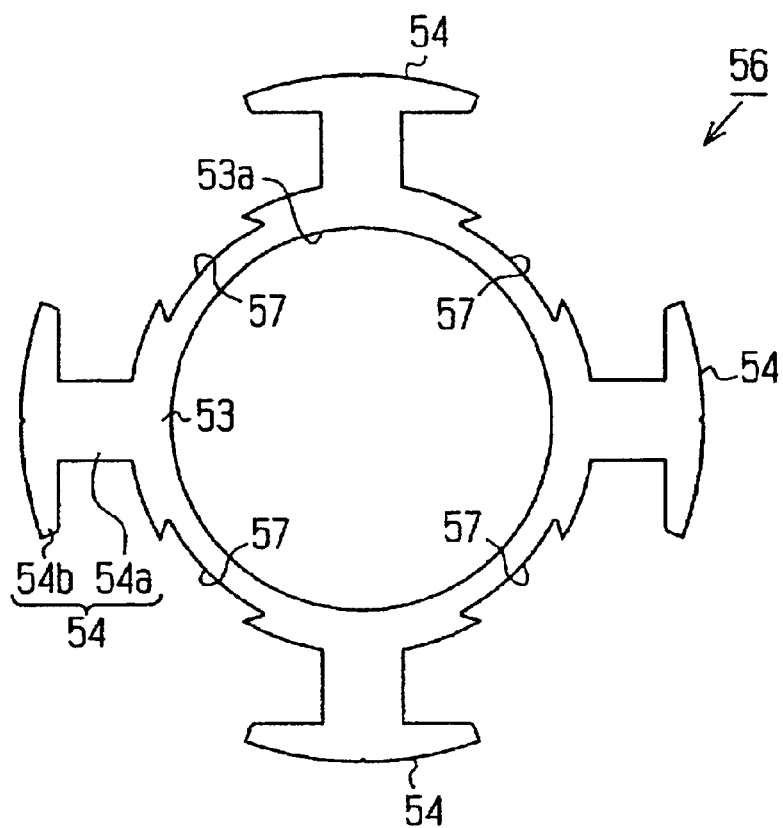
FIG. 42 is a plan view showing a core work for forming the core shown in FIG. 40.

As shown in FIGS. 40 and 42, each of the first and second core pieces 51, 52 has four first engaging portions, which are engaging recesses 57 in this embodiment. Each recess 57 is formed between an adjacent pair of the integral tooth members 54. Each recess 57 has a trapezoidal cross section to form a mortise of a dovetail joint.

Figure 43:
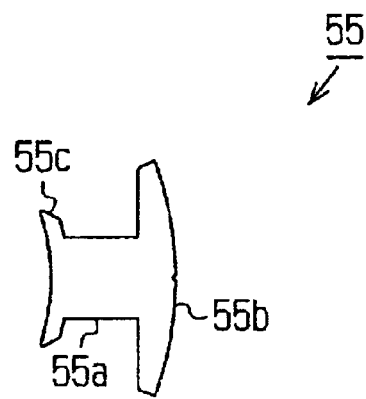
FIG. 43 is a plan view showing one of the separate teeth attached to the core work shown in FIG. 42.

As shown in FIG. 43, each separate tooth member 55 has a coil winding section 55a and a distal section 55b, which is formed at the distal end of the coil winding section 55a, and a second engaging portion, which is a base section 55c in this embodiment. The coil winding section 55a and the distal section 55b of each separate tooth member 55 have the same shapes as the coil winding section 54a and the distal section 54b of each integral tooth member 54. Each base section 55c has a trapezoidal cross section to correspond to each recess 57. In other words, each base section 55c is formed like a tenon of a dovetail joint. Each separate tooth member 55 has the same axial dimension as each integral tooth member 54. That is, the axial dimension of each separate tooth member 55 is the same as that of the ring 53.

Figure 41:
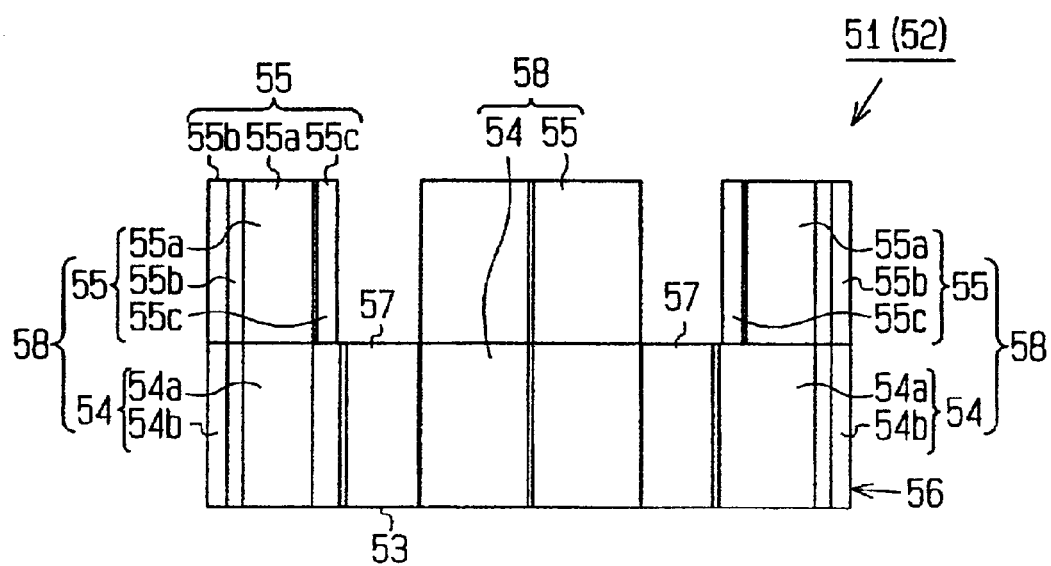
FIG. 41 is a front view showing the core shown in FIG. 40.

As shown in FIGS. 40 and 41, the separate tooth members 55 are attached to the core work 56 such that the coil winding section 55a and the distal section 55b of each separate tooth member 55 are aligned with the coil winding section 54a and the distal section 54b of one of the integral tooth members 54. In this state, the base section 55c of each separate tooth member 55 is axially overlaps with part of the ring 53. In this manner, the first and second core pieces 51, 52 are formed. Subsequently, teeth 58, each of which is formed with one of the integral tooth members 54 and the corresponding separate tooth member 55, are insulated with resin. In this embodiment, the separated tooth members 55 are crimpled to the core work 56.

The process for winding coils about the first and second core pieces 51, 52 and the process for assembling the core 50 will be described.

As shown in FIG. 40, a coil 59 is wound about each tooth 58 of the first and second core pieces 51, 52. In FIG. 40, only the winding state of one of the teeth 58 is shown. The ends of each coil 59 are drawn along the axial direction of the first and second core pieces 51, 52. Specifically, the end at the first core piece 51 is drawn from the corresponding integral tooth member 54 (upward as viewed in FIG. 39), and the end at the second core piece 52 is drawn from the corresponding separate tooth member 55 (upward as viewed in FIG. 39).

As shown in FIG. 39, the first core piece 51 and the second core piece 52 are arranged to face each other such that each separate tooth member 55 and each recess 57 of the first core piece 51 face one of the recesses 57 and the one of the separate tooth members 55 of the second core piece 52, respectively. That is, the first core piece 51 and the second core piece 52 are rotated relative to each other by forty-five degrees. Then, the separate tooth members 55 of the first and second core pieces 51, 52 are fitted in the recesses 57 of the second and first core pieces 52, 51, respectively. Consequently, the core 50 having eight slots as shown in FIG. 38 is assembled. Each end of the coils 59 is drawn in the same direction, or the direction denoted by arrow A in FIGS. 38 and 39.

The rotary shaft (not shown) of an electric motor is inserted in the aligned center holes 53a of the integrated core 50.

The core 50 shown in FIGS. 38 to 43 has the following advantages.

(1) In this embodiment, each of the first and second core pieces 51, 52 has the recesses 57 and the teeth 58, each of which includes an integral tooth member 54 and a separate tooth member 55. Each separate tooth member 55 has a base section 55c. The recesses 57 are formed in the outer circumference of the ring 53 of each core piece 51, 52. The base sections 55c of one of the core pieces 51, 52 are engaged with the recesses 57 of the other core pieces 51, 52 to form the core 50. That is, the core 50 is formed by only two separate parts, or the first and second core pieces 51, 52, which reduces the number of the parts and simplifies the assembly.

(2) Each tooth 58 of the first and second core pieces 51, 52 is formed by an integrated tooth member 54 and a separate tooth member 54, which is attached to the integrated tooth member 54. Therefore, even if the core 50 is used as an inner rotor, the separate tooth members 55 are not loosened by centrifugal force, which improves the performance of the motor.

(3) The separate tooth members 55 have the same axial dimension as the ring 53, and the first and second core pieces 51, 52 are identical. Therefore, all the teeth 58 are identical and have the same magnetic resistance. As a result, compared to the motor disclosed in Japanese Laid-Open Patent Publication No. 10-4640 discussed in the background section, in which the magnetic resistance differs from one tooth to another, the motor having the core 50 has an improved performance.

(4) In this embodiment, the first and second core pieces 51, 52 are engaged with each other after the coils 59 are wound about the teeth 58. Therefore, the coil 59 are wound about the teeth 58 when there is sufficient space between each adjacent pair of the teeth 58. Compared to a case where the coils 59 are wound about the teeth 58 after engaging the first and second core pieces 51, 52 with each other, the coils 59 are easily wound. Even if the distance B between the distal ends of each adjacent pair of the teeth 58 is relatively narrow in the assembled core 50 as shown in FIG. 38, the coils 59 are smoothly wound about the teeth 58. This permits each distance B to be minimized, which reduces the cogging torque and vibration of the motor. Since the space between the each adjacent pair of the coils 59 is minimized, the space factor of each coil 59 is maximized, which increases the performance of the motor. In other words, the size of the motor can be reduced while maintaining the performance of the motor.

(5) The ends of the coils 59 wound about teeth 58 of the first core piece 51 are drawn in the opposite direction from the direction in which the ends of the coils 59 wound about the teeth 58 of the second core piece 52. Therefore, when the first and second core pieces 51, 52 are engaged, the ends of the coils 59 are drawn in the same direction. As a result, the coils 59 can be processed easily.

A core 70 of a rotation apparatus according to a fourth embodiment of the present invention will now be described.

Figure 44:
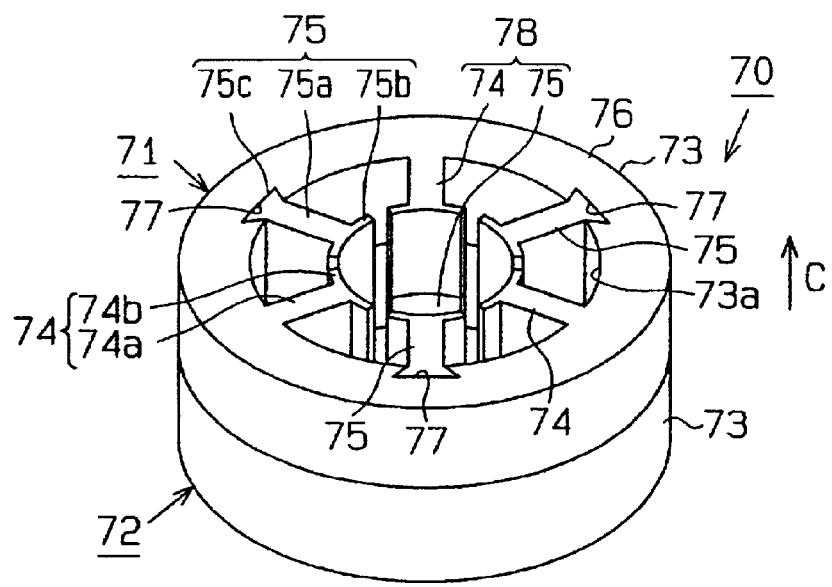
FIG. 44 is a perspective view illustrating a core according to a fourth embodiment of the present invention.
Figure 45:
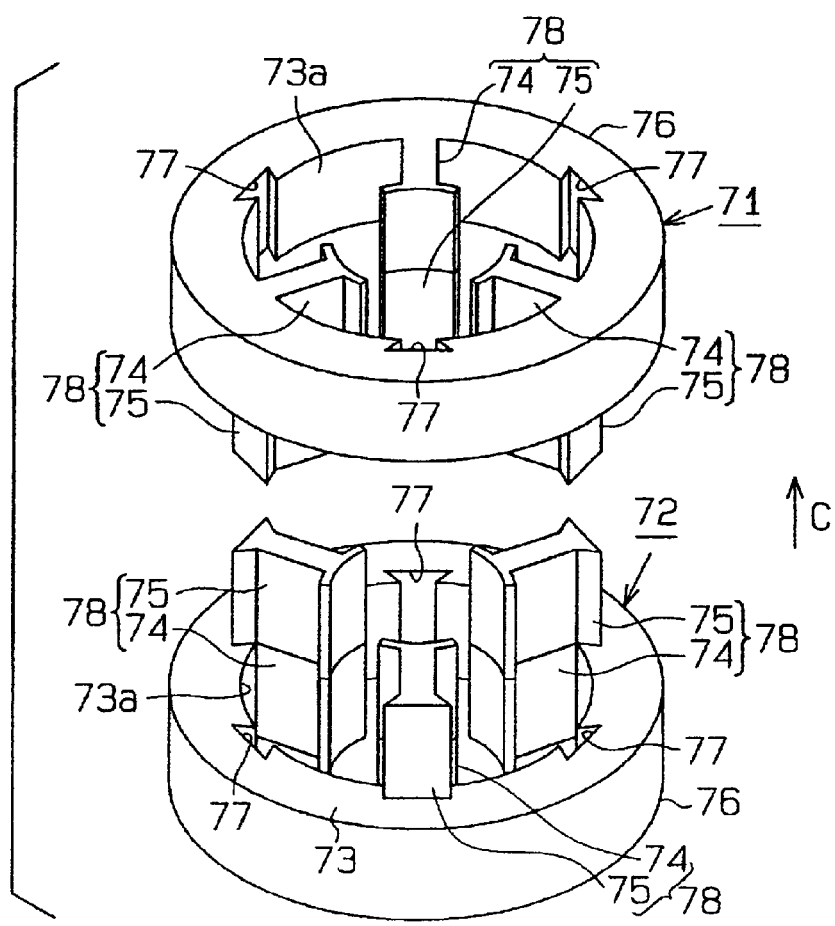
FIG. 45 is an exploded perspective view showing the core shown in FIG. 44.

In this embodiment the rotation apparatus is an electric motor. FIG. 44 is a perspective view showing the core of the fourth embodiment, and FIG. 45 is an exploded perspective view showing the core.

The core 70 functions as stator and includes a first core piece 71 is formed by assembling a second core piece 72 and second core piece 72. The first and second core pieces 71, 72 have the same structure. Specifically, as shown in FIG. 45, each of the first and second core pieces 71, 72 has a ring 73, integral tooth members 74 extending radially inward from the ring 73, and separate tooth members 75 attached to the integral tooth members 74. The number of the integral tooth members 74 and the number of the separate tooth members 75 are both three. The integral tooth members 74 are arranged at equal angular intervals, which is one hundred twenty degrees in this embodiment. The ring 73 of each core piece 71, 72 and the corresponding integral tooth members 74 form a core work 76. Each integral tooth member 74 has a coil winding section 74a and a distal section 74b, which is formed at the distal end of the coil winding section 74a.

Figure 46:
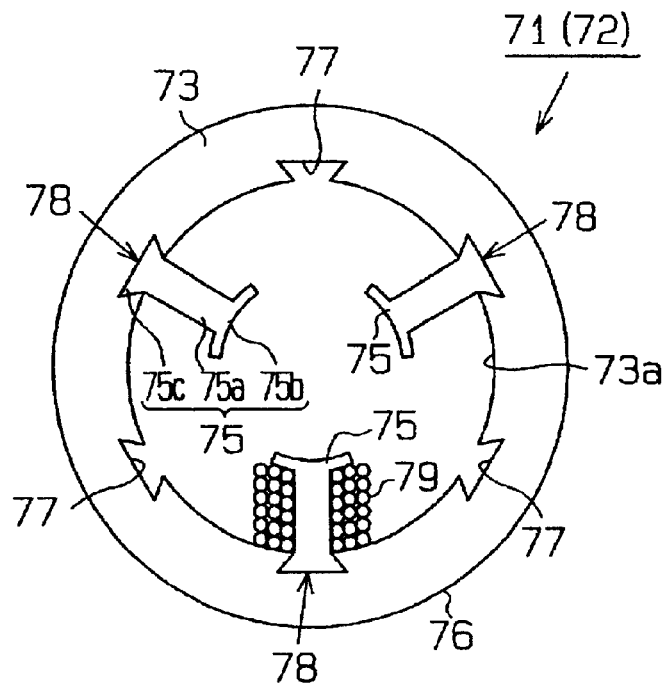
FIG. 46 is a plan view illustrating the first or second core piece of the core shown in FIG. 44.
Figure 47:
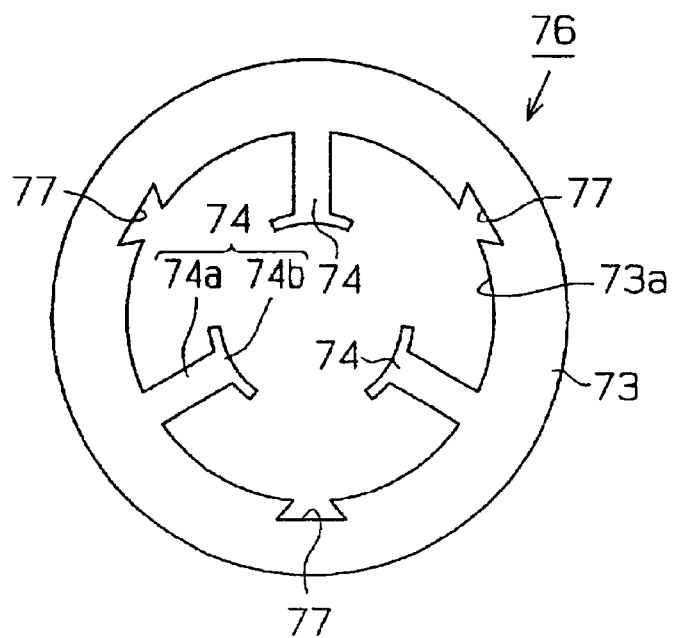
FIG. 47 is a plan view showing a core work for forming the core shown in FIG. 46.

As shown in FIGS. 46, 47, each core piece 71, 72 has three first engaging portions, which are engaging recesses in this embodiment. Each engaging recess 77 is formed on the inner circumference 73a of the ring 73 of each core piece 71, 72 between an adjacent pair of the integral tooth members 74. Each recess 77 has a trapezoidal cross section to form a mortise of a dovetail joint.

Figure 48:
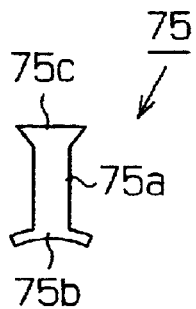
FIG. 48 is a plan view showing one of the separate teeth attached to the core work shown in FIG. 47.

As shown in FIG. 48, each separate tooth member 75 includes a coil winding section 75a, a distal section 75b, and a second engaging portion, which is a base section 75c in this embodiment. The coil winding section 75a and the distal section 75b of each separate tooth member 75 have the same shapes as the coil winding section 74a and the distal section 74b of each integral tooth member 74. Each base section 75c has a trapezoidal cross section to correspond to each recess 77. In other words, each base section 75c is formed like a tenon of a dovetail joint. Each separate tooth member 75 has the same axial dimension as each integral tooth member 74. That is, the axial dimension of each separate tooth member 75 is the same as that of the ring 73.

As shown in FIG. 46, the separate tooth members 75 are attached to the core work 76 such that the coil winding section 75a and the distal section 75b of each separate tooth member 75 are aligned with the coil winding section 74a and the distal section 74b of one of the integral tooth member 74. In this state, the base section 75c of each separate tooth member 75 is axially overlaps with part of the ring 73. In this manner, the first and second core pieces 71, 72 are formed. Subsequently, teeth 78, each of which is formed with one of the integral tooth members 74 and the corresponding separate tooth member 75, are insulated with resin. In this embodiment, the separated tooth members 75 are crimped to the core work 76.

The process for winding coils about the first core and second core pieces 71, 72 and the process for assembling the core 70 will be described.

As shown in FIG. 46, a coil 79 is wound about each tooth 78 of the first and second core pieces 71, 72. In FIG. 46, only the winding state of one of the teeth 78 is shown. The ends of each coil 79 are drawn along the axial direction of the first and second core pieces 71, 72. Specifically, the ends of the coils 79 of the first core piece 71 are drawn from the corresponding integral tooth member 74 (upward as viewed in FIG. 45), and the ends of the coils 79 of the second core piece 72 are drawn from the corresponding separate tooth member 75 (upward as viewed in FIG. 45).

As shown in FIG. 45, the first core piece 71 and the second core piece 72 are arranged to face each other such that each separate tooth member 75 and each recess 77 of the first core piece 71 face one of the recesses 77 and the one of the separate tooth members 75 of the second core piece 72, respectively. That is, the first core piece 71 and the second core piece 72 are rotated relative to each other by sixty degrees. Then, the separate tooth members 75 of the first and second core pieces 71, 72 are fitted in the recesses 77 of the second and first core pieces 72, 71, respectively. Consequently, the core 70 having six slots as shown in FIG. 44 is assembled. The ends of the coils 79 are drawn in the same direction, or the direction denoted by arrow C in FIGS. 44 and 45.

The core 70 of the fourth embodiment has the same advantages as those of the third embodiment.

A core of a rotation apparatus according to a fifth embodiment will now be described. The fifth embodiment is a modification of the third embodiment and is different from the third embodiment in that each coil 59 is wound about an insulator attached to each tooth 58. Also, the engaging recesses 57 and the base sections 55c are different from those in the third embodiment. The differences from the third embodiment will mainly be discussed below, and like or the same reference numerals are given to those components that are like or the same as the corresponding components of the third embodiment.

Figure 50:
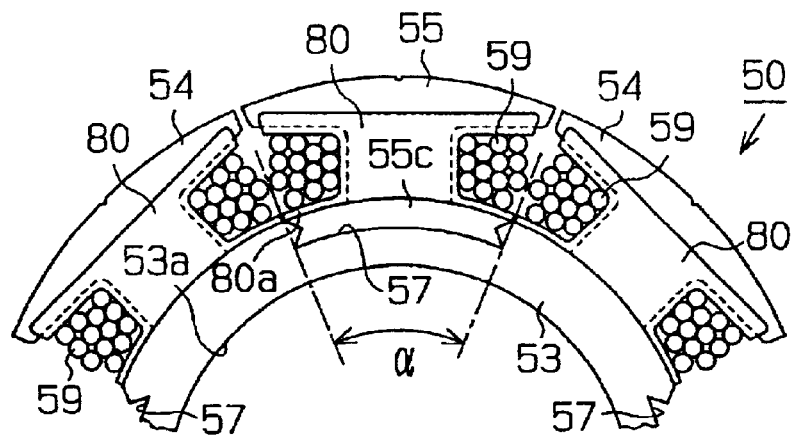
FIG. 50 is a is a partial plan view illustrating a core according to a fifth embodiment of the present invention.
Figure 51:
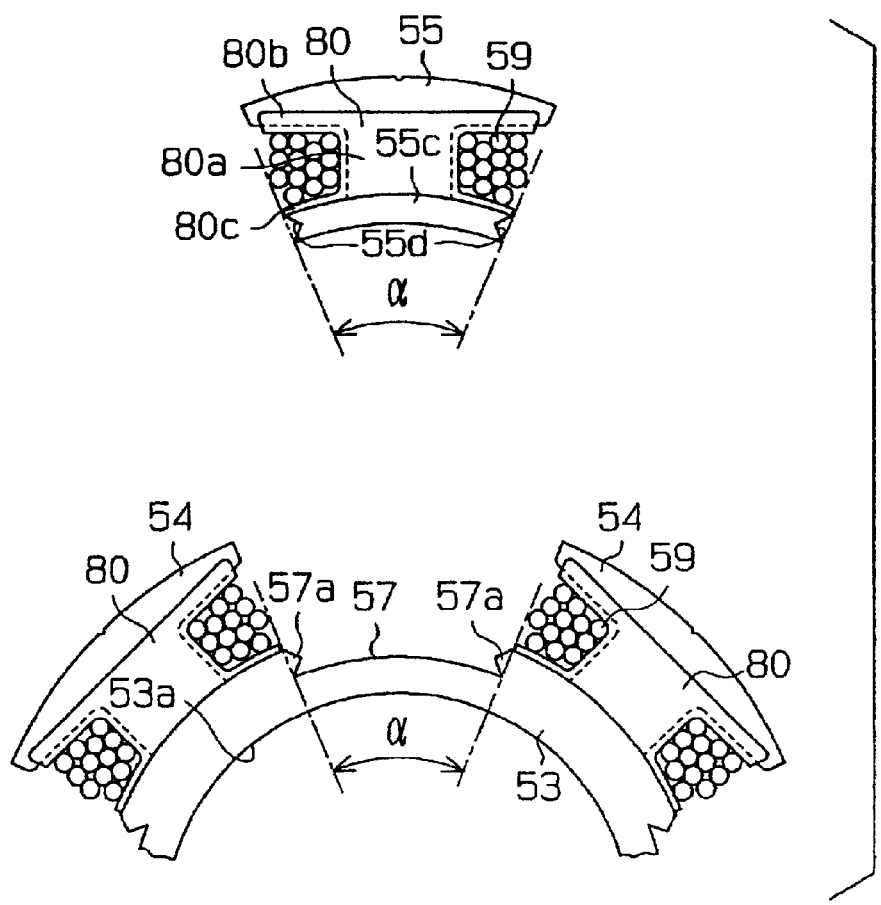
FIG. 51 is an exploded partial plan view showing the core shown in FIG. 50.

As shown in FIGS. 50 and 51, each tooth 58 includes an insulator 80. Each insulator 80 includes a coil winding section 80a, a distal section 80b, and a base section 80c. A coil 59 is wound about the coil winding section 80a. The base section 80c of the insulator 80 has a predetermined circumferential dimension, which corresponds to a predetermined angle a shown in FIGS. 50 and 51.

Each base section 55c has substantially the same circumferential dimension as each base section 80c and thus corresponds to the angle a. Also, each recess 57 has substantially the same circumferential dimension as the base section 55c and thus corresponds to the angle α. Each base section 55c has a groove 55d at each circumferential end. Each recess 57 has a projection 57a at each circumferential end to engage the corresponding groove 55d. In this embodiment, the angle α is obtained by dividing three hundred sixty degrees by the number of teeth or the number of the slots. Specifically, the angle α is represented by an equation α=360°/8=45°.

Each insulator 80 is attached to the one of the teeth 58 such that the base section 80c contacts the outer circumference of the corresponding base section 55c. Each coil 59 is wound about one of the coil winding sections 80a. The base section 55c of each separate tooth member 55 is fitted to one of the recesses 57 so that the first core piece 51 is engaged with the second core piece 52.

Figure 49:
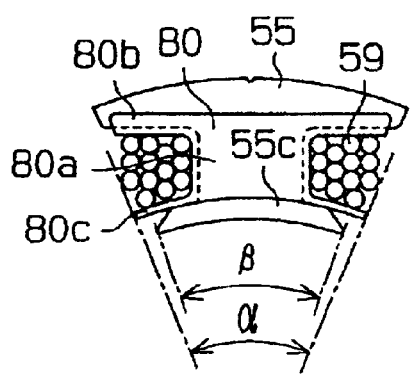
FIG. 49 is an exploded partial plan view illustrating the core shown in FIG. 38, in which an insulator is provided for each tooth.
Figure 49:
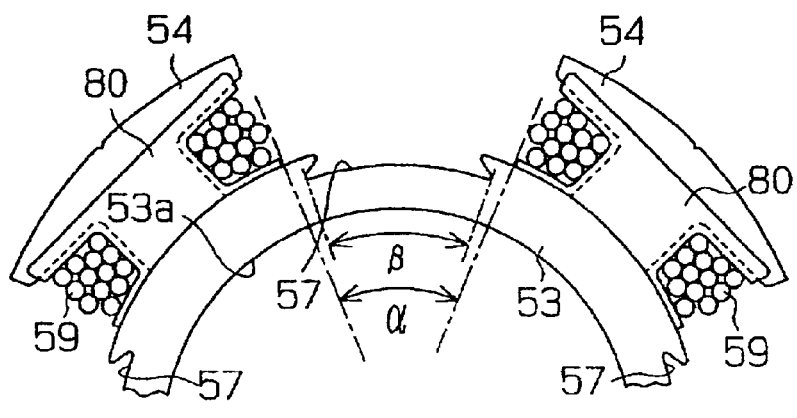

FIG. 49 illustrates a comparison example in an insulator 80 is attached to each tooth 58 of the core 50 shown in FIG. 38 In this comparison example, each base section 55c has a shorter circumferential dimension. Specifically, each base section 55c corresponds to an angle β, which is less than the angle α. Compared to the example of FIG. 49, each base section 80c of the fifth embodiment is flexed by a smaller degree by the force produced when the coils 59 are wound. The insulators 80 may be made of rigid insulating material (resin), which resists deformation, or flexible insulating material (resin). If flexible material (resin) is used for forming the insulators 80 in the example of FIG. 49, part of the insulator base sections 80c projecting from the base section 55c is deformed by the winding force. The deformation hinders the separate tooth members 55 from being fitted into the recesses 57. However, in the fifth embodiment, the circumferential dimension of each base section 55c is substantially equal to that of each insulator base section 80c, which permits the fist and second core pieces 51, 52 to be easily engaged with each other.

The first to fifth embodiments may be modified as follows.

In the third embodiment, each of the first and second core pieces 51, 52 has the four teeth 58, and the core 50 has eight slots. However, the number of the teeth 58 is not limited to four but may be three, five or more. If the number of the teeth 58 is changed, the number of slots formed in the core 50 is also changed, accordingly (for example, six, ten or more).

In the fourth embodiment, each of the first and second core pieces 71, 72 has the three teeth 78, and the core 70 has six slots. However, the number of the teeth 78 is not limited to three but may be, for example, four or more. If the number of the teeth 78 is changed, the number of slots formed in the core 70 is also changed, accordingly (for example, eight or more).

In the third and fourth embodiments, the first engaging portions are the recesses 57, 77 and the second engaging portions are the base sections 55c, 75c. However, the first engaging portions may be projections and the second engaging portions may be recesses. Joint other than a dovetail joint may be used for the first and second engaging portions. In this case, a joint that prohibits radial movement is preferable.

In the third and fourth embodiments, the separate tooth members 55, 75 are attached to the integral tooth members 54, 74 and crimped to the core work 56, 76. However, the separate tooth members 55, 75 may be welded or adhered to the core work 56, 76.

In the third embodiment, the rotary shaft of a motor is inserted in the center holes 53a formed in the rings 53 after the first and second core pieces 51, 52 are integrated. However, the rotary shaft may be inserted in center hole 53a of one of the core pieces 51, 52 before the core pieces 51, 52 are assembled.

Figure 52:
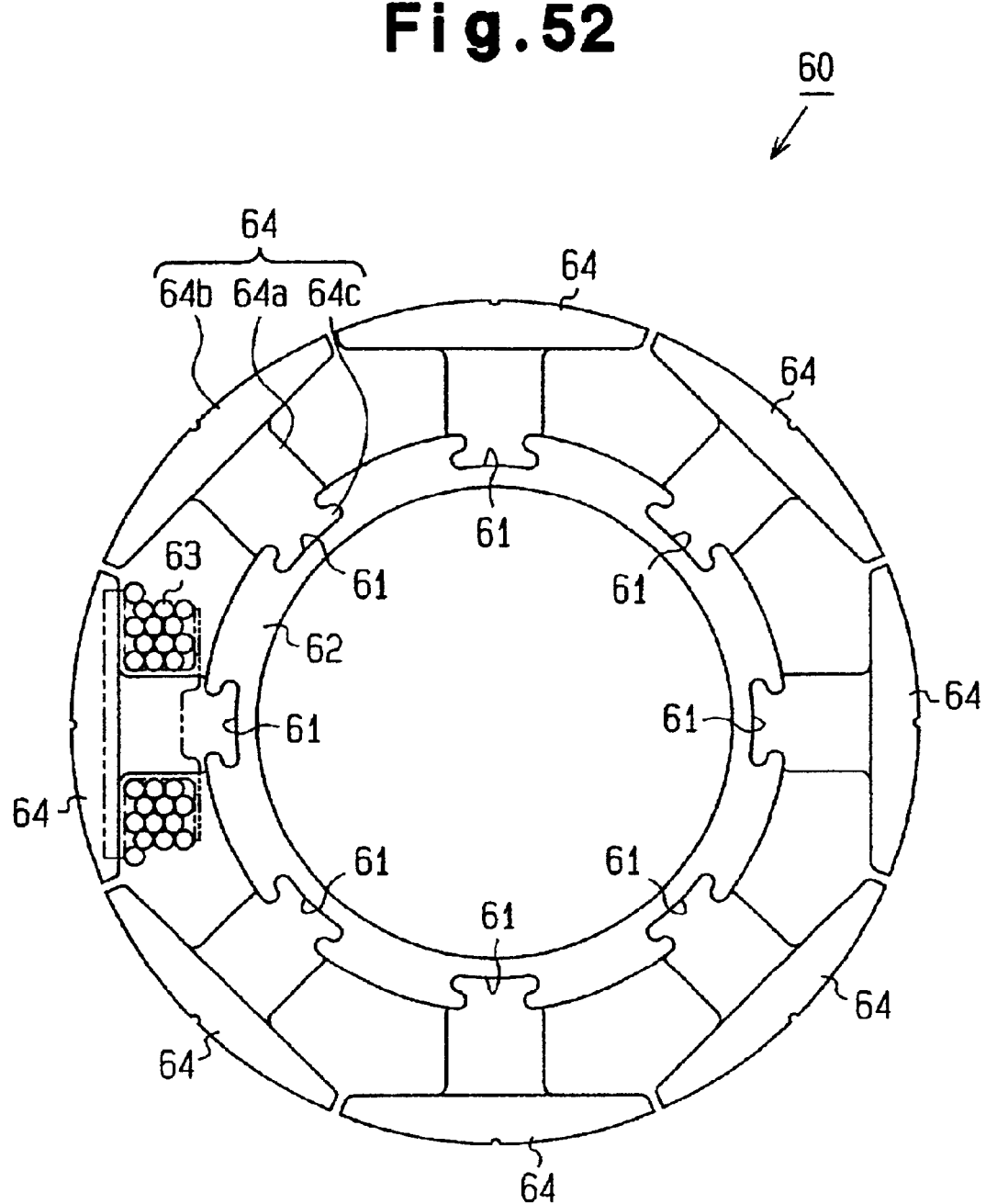
FIG. 52 is a plan view illustrating a core according to a modification of the third embodiment.
Figure 53:
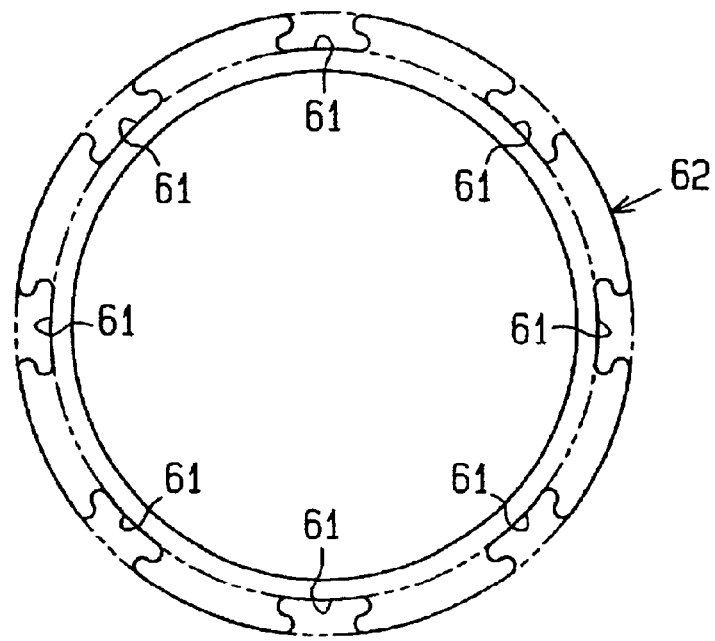
FIG. 53 is a plan view illustrating a ring in the core shown in FIG. 52.
Figure 54:
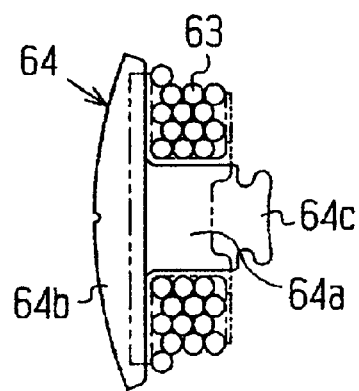
FIG. 54 is a plan view illustrating one of the teeth in the core shown in FIG. 52.

In the third embodiment, the core 50 may be replaced with a core 60 shown in FIGS. 52 to 54 so that the teeth have the same magnetic resistance. As shown in FIG. 52, the core 60 has a ring 62 having eight recesses 61 and insulated teeth 64, each of which is fitted to one of the recesses 61. A coil 63 is wound about each tooth 64.

The recesses 61 are formed in the outer circumference of the ring 62 and are arranged at equal angular intervals. As shown in FIG. 54, each tooth 64 has a coil winding section 64a a distal section 64b formed at one end of the coil winding section 64a, and a base section 64c formed at the other end of the coil winding section 64a. A coil 63 is wound about the coil winding section 64a of each tooth 64. Then, the base section 64c of each tooth 64 is fitted to one of the recesses 61 to form the core 60.

This structure equalizes the magnetic resistances of the teeth 64. Thus, compared to the rotation apparatus disclosed in Japanese Laid-Open Patent Publication No. 10-4640, in which the magnetic resistance differs from one tooth to another, the motor having the core 60 has an improved performance.

In the third and fourth embodiments, the teeth 58, 78 are insulated with resin layers. However, the teeth 58, 78 may be insulated with insulators 80 shown in FIG. 80.

Figure 55:
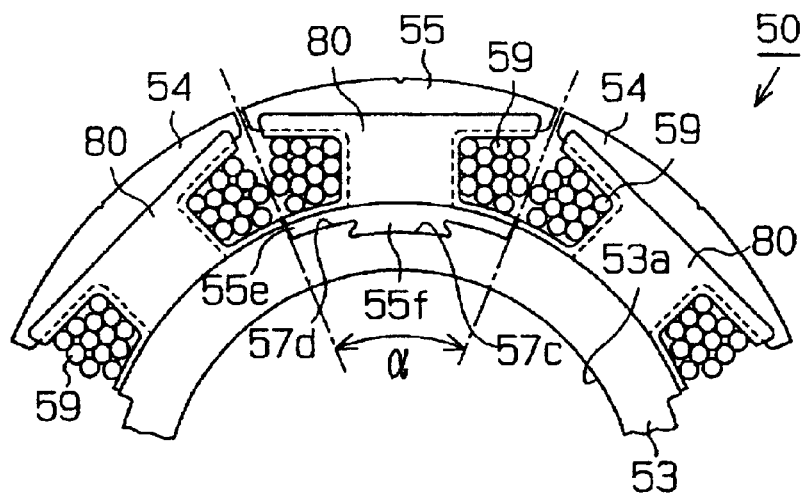
FIG. 55 is a partial plan view illustrating a core according to a modification of the fifth embodiment.
Figure 56:
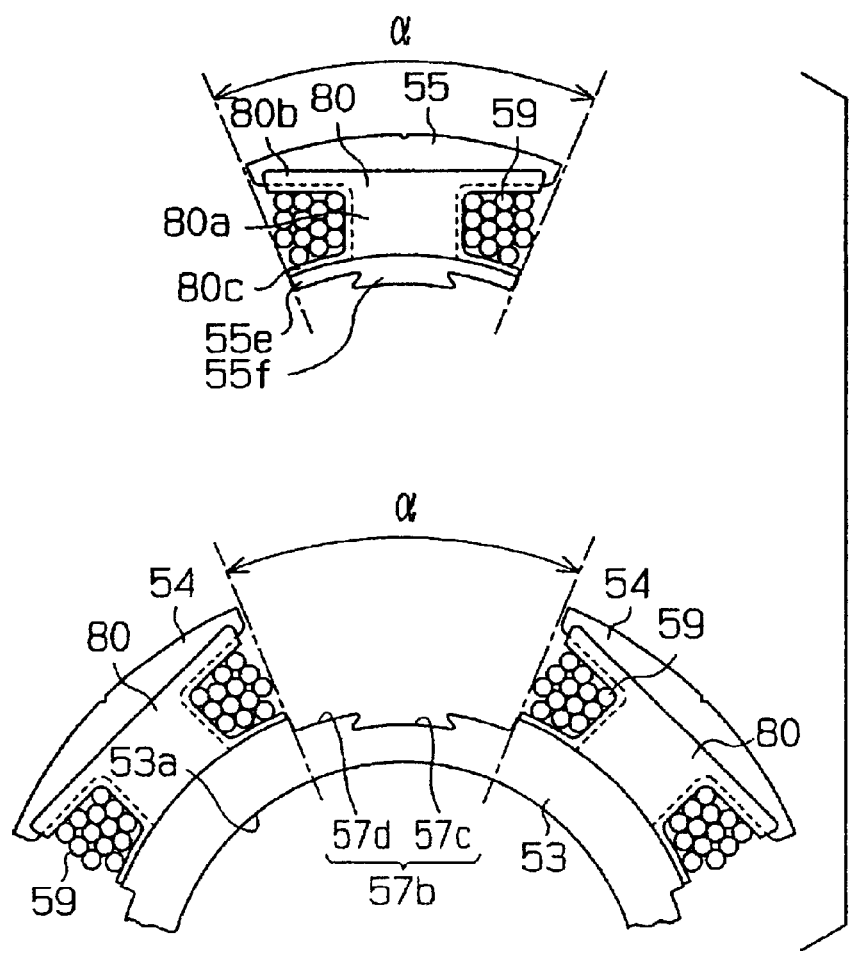
FIG. 56 is an exploded partial plan view showing the core shown in FIG. 55.

The fifth embodiment may be modified as shown in FIGS. 55 and 56. In the modification shown in FIGS. 55 and 56, each separate tooth member 55 has a part for preventing the insulator from being flexed. Specifically, each separate tooth member 55 includes a coil winding section 55a, a distal section 55b formed at one end of the coil winding section 55a, the part of preventing the insulator from being flexed, which is a thin plate section 55e in this modification, and a second engaging portion, which is a base section 55f in this modification. The base section 55f projects from the center of the thin plate section 55e. The thin plate section 55e is formed arcuate and has substantially the same circumferential dimension as the base section 80c of the insulator 80, which corresponds to the angle α. The base section 55f has a trapezoidal cross section.

Recesses 57b are formed in the outer circumference of the ring 53. Each recess 57b is formed between an adjacent pair of the teeth 54. Each recess 57b includes a first engaging portion, which is an engaging recess 57c in this modification, and an accommodating recess 57d for accommodating the corresponding thin plate section 55e. The cross section of each engaging recess 57c is the same as the cross section of the base section 55f. Each accommodating recess 57d has substantially the same circumferential dimension as that of each base section 55f. In other words, each accommodating recess 57d corresponds to the angle α. Each accommodating recess 57d has substantially the same radial dimension as that of each thin plate section 55e.

The insulators 80 are arranged on the teeth 58 such that each insulator base section 80c contacts the outer surface of the corresponding thin plate section 55e, and the coil 59 is wound about the coil winding section 80a. The base section 55c of each separate tooth member 55 is fitted in the corresponding engaging recesses 57, and the thin plate section 55e is accommodated in the accommodating recess 57d. In this manner, the first and second core pieces 51, 52 are coupled to each other. This structure has the same advantages as the fifth embodiment.

The fifth embodiment and the modification shown in FIGS. 55, 56 may be applied to the core 70 of the fourth embodiment and the core 60 of FIG. 52.

In the fifth embodiment, the angle a may be less than a value represented by a formula 360°/(the number of teeth or slots) as long as the circumferential dimension of each base section 55c (or the thin plate section 55e) is equal to or longer than that of the insulator base section 80c of the insulator 80.

The core 50 of the third embodiment may be applied to the motor of the first embodiment. In this case, the coils are wound in one of the manners shown in FIGS. 4, 33, 34 and 37. This structure reduces the radial dimension and the axial dimension of the motor and also reduces vibration and noise. The number of the magnetic poles and the number of the slots need not be six and eight but may be changed any even numbers. However, as discussed in the second embodiment, the torque vector resultant acting on the armature is set to zero so that the armature receives no radial force. A core having first and second core pieces such as the core 50 (a core functioning as a rotor) of the third embodiment and the core 70 (a core functioning as a stator) of the fourth embodiment is used.

Figure 57:
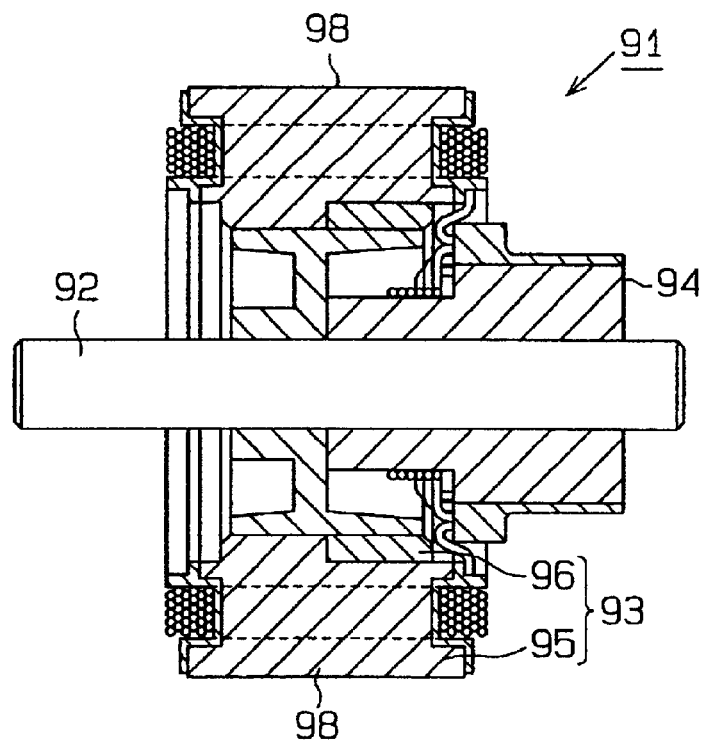
FIG. 57 is a cross-sectional view illustrating an armature according to a sixth embodiment of the present invention.

An armature (rotor) 91 of a six-pole eight-slot direct-current motor according to a sixth embodiment of the present invention will now be described with reference to the drawings. FIG. 57 is a cross-sectional view illustrating the armature 91, and FIG. 58 is an axial plan view of the armature 91.

Figure 58:
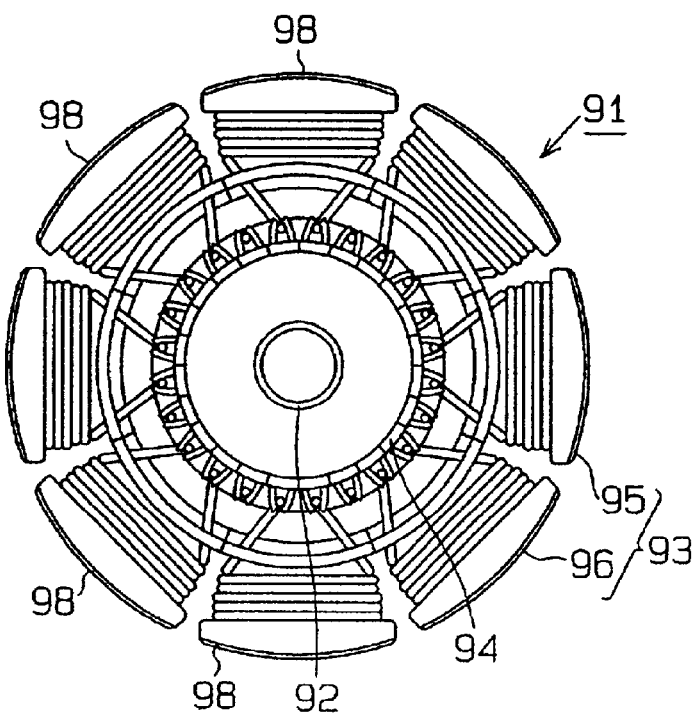
FIG. 58 is a plan view illustrating the armature shown in FIG. 57.

As shown in FIGS. 57, 58, the armature 91 includes a rotary shaft 92, a core 93 secured to the rotary shaft 92, and a commutator 94 fixed to one end of the rotary shaft 92.

The core 93 includes a first core piece 95 and a second core piece 96, which are engaged with each other. FIGS.

Figure 59A:
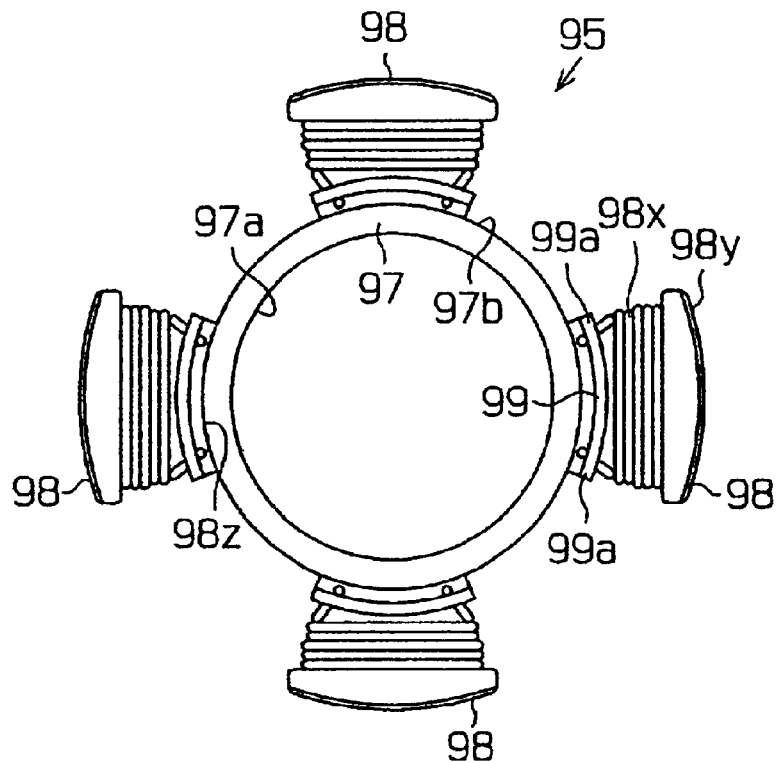
FIG. 59(a) is a plan view illustrating the first core piece of the armature shown in FIG. 57.
Figure 59B:
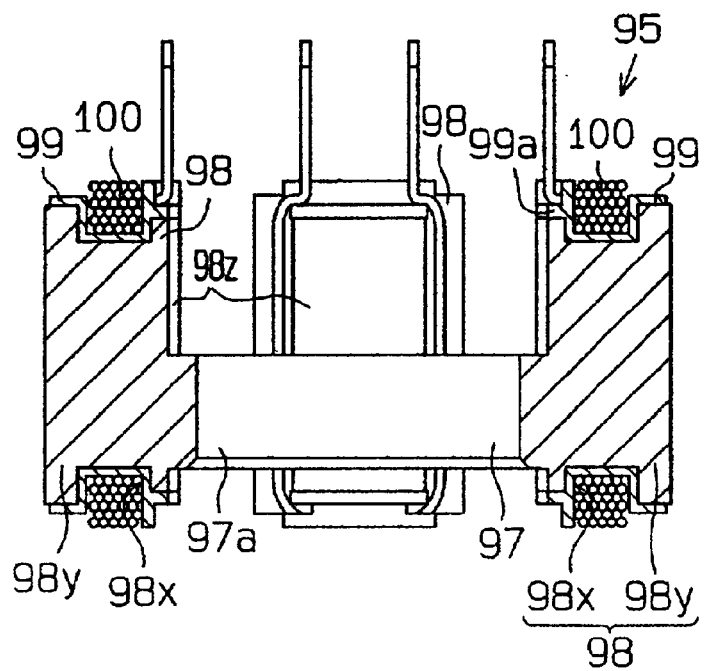
FIG. 59(b) is a cross-sectional view illustrating the first core piece of the armature shown in FIG. 57.
Figure 60A:
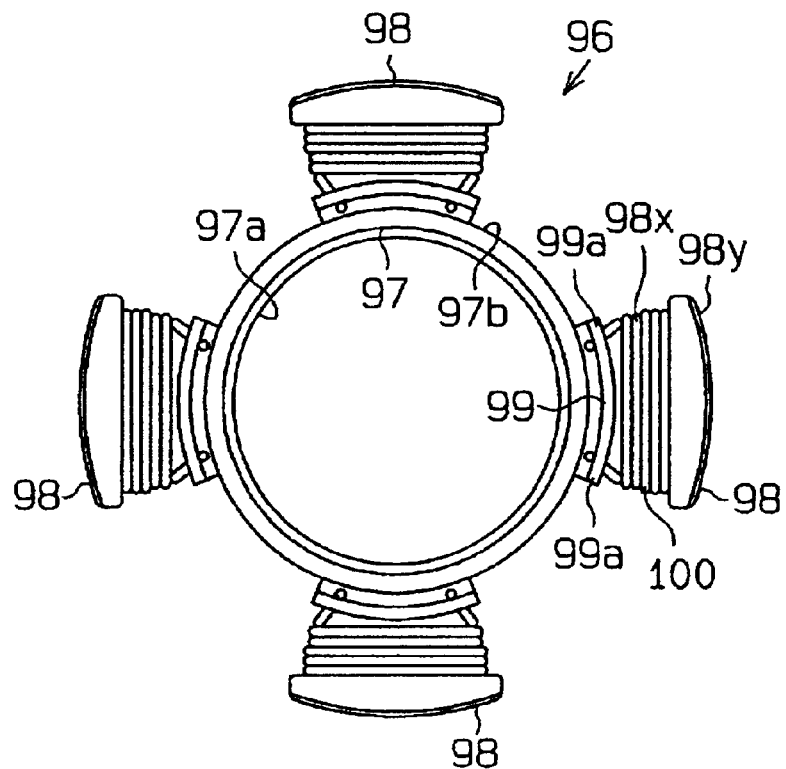
FIG. 60(a) is a plan view illustrating the second core piece of the armature shown in FIG. 57.
Figure 60B:
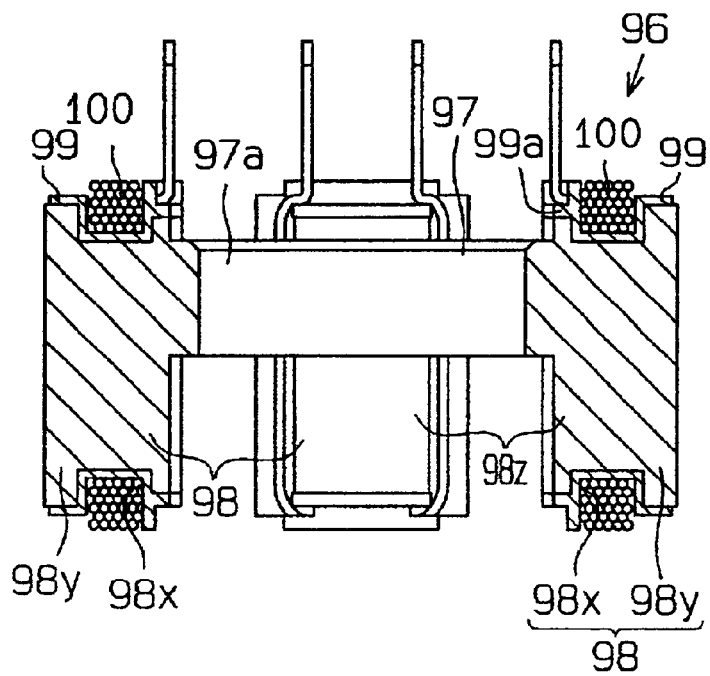
FIG. 60(b) is a cross-sectional view illustrating the second core piece of the armature shown in FIG. 57.

59(a), 59(b) illustrate the first core piece 95 and FIGS. 60(a), 60(b) illustrate the second core piece 96. FIGS. 59(a), 60(a) are viewed from the end of the commutator 94. FIGS. 59(b), 60(b) are cross-sectional views showing the first and second core pieces 95, 96.

As shown in FIGS. 59(a), 59(b), the first core piece 95 includes a ring 97 having a center hole 97a and four teeth 98 radially extending outward from the ring 97. The teeth 98 are arranged at equal angular intervals (ninety degrees). As shown in FIGS. 60(a) and 60(b), the second core piece 96 includes a ring 97 having a center hole 97a and four teeth 98 radially extending outward from the ring 97. The teeth 98 of the second core piece 96 are arranged at equal angular intervals (ninety degrees). The axial dimension of each tooth 98 is equal to or greater than the doubled axial dimension of each ring 97. As shown in FIG. 59(b), the ring 97 of the first core piece 95 is located below the axial center. As shown in FIG. 60(b), the ring 97 of the second core piece 96 is located above the axial center.

If the second core piece 96 is inverted, the structure (the shapes of the ring 97 and the teeth 98) is identical with that of the first core piece 95. The first and second core pieces 95, 96 are formed with magnetic powder through compression molding such that each ring 97 and the associated teeth 98 are integrated.

As shown in FIGS. 59(a) to 60(b), each tooth 98 of the first and second core pieces 95, 96 includes a coil winding section 98x and a distal section 98y, which is formed at the distal end of the coil winding section 98x. An insulator 99 is attached to the coil winding section 98x of each tooth 98. The shape of the insulator 99 conforms to the shape of the tooth 98. A coil 100 is wound about the insulator 99 on the coil winding section 98x of each tooth 98 in a concentrated manner. The ends of the coil 100 are drawn at the side of the commutator 94, or upward as viewed in FIGS. 59(b) and 60(b). Specifically, each insulator 99 has an engaging section 99a, through which the ends of the coil 100 are drawn out.

After winding the coils 100 about the teeth 98, the first core piece 95 and the second core piece 96 are arranged to face each other such that the rings 97 are axially aligned. Also, the positions of the teeth 98 in the core pieces 95, 96 are rotated by forty-five degrees. The first core piece 95 and the second core piece 96 are then assembled. The ring 97 of the first core piece 95 is fitted into the teeth 98 of the second core piece 96, and the ring 97 of the second core piece 96 is fitted into the teeth 98 of the first core piece 95.

Figure 61:
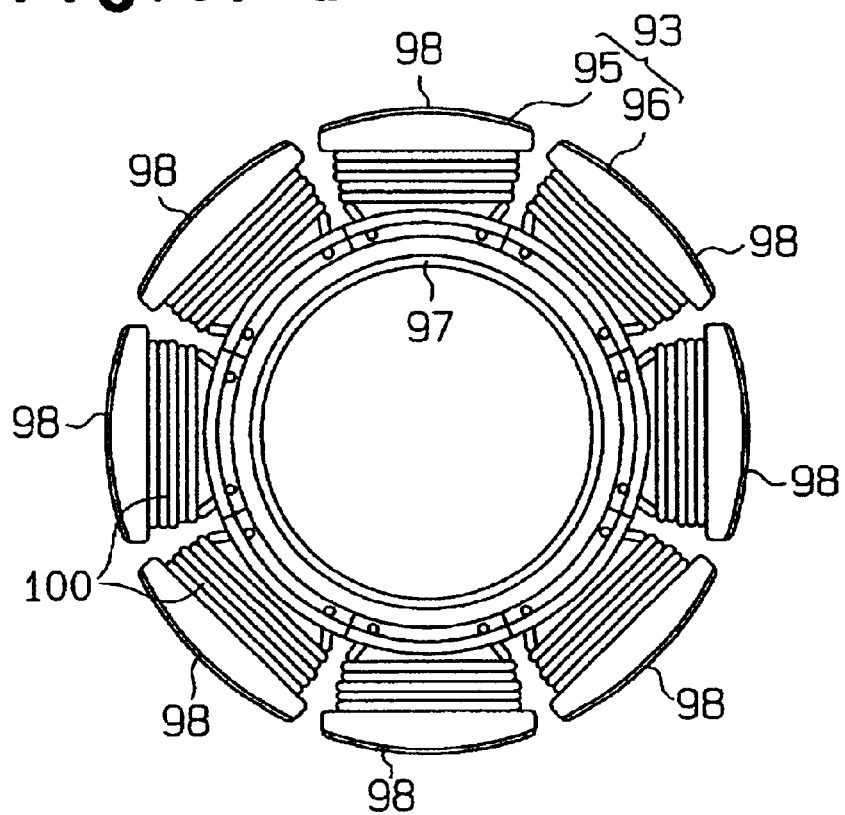
FIG. 61(a) is a plan view illustrating a core of the armature shown in FIG. 57.
FIG. 61(b) is a cross-sectional view illustrating the core of FIG. 61(a)
Figure 61:
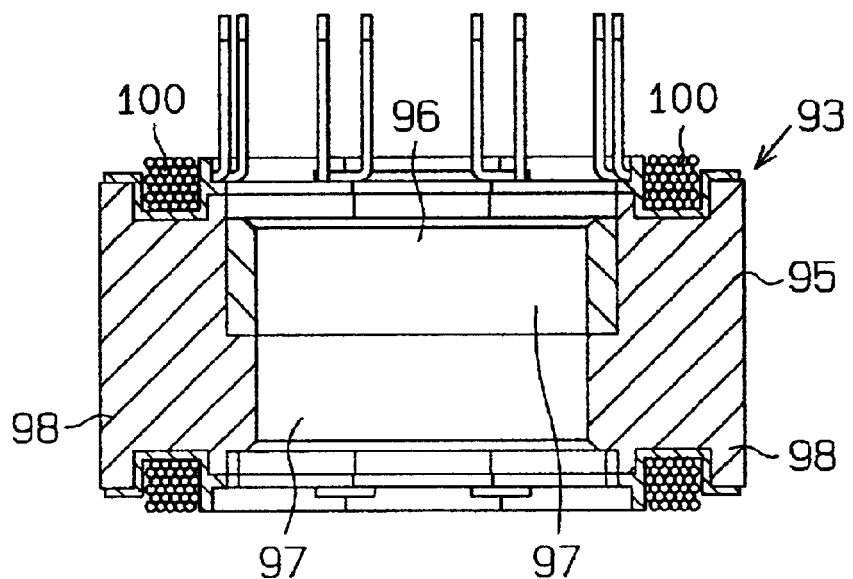

The outer circumference 97b of the ring 97 of the first core piece 95 contacts and is adhered to the lower inner surface 98z (see FIG. 60(b)) of each tooth 98 of the second core piece 96. Likewise, the outer circumference 97b of the ring 97 of the second core piece 96 contacts and is adhered to the upper inner surface 98z (see FIG. 59(b)) of each tooth 98 of the first core piece 95. Accordingly, as shown in FIGS. 61(a) and 61(b), the core 93, which has the eight teeth 98, is assembled. Sixteen coil terminals (only some of them are shown) are drawn upward as viewed in FIG. 61(b). In this embodiment, the outer circumference 97b of the ring 97 in each core piece 95, 96 corresponds to the first engaging portion, and the inner surfaces 98z of the teeth 98 in each core piece 95, 96 correspond to the second engaging portion.

Figure 62:
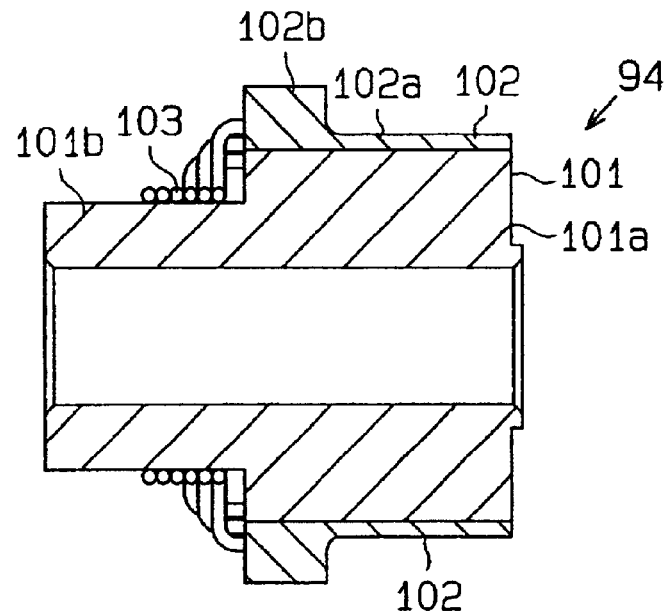
FIG. 62 is a cross-sectional view illustrating the commutator of the armature shown in FIG. 57.

As shown in FIG. 62, the commutator 94 includes a cylindrical insulator 101 and segments 102, which are located on the outer circumference of the insulator 101. Like the first embodiment, the number of the segments 102 is twenty-four. Each segment 102 has a main portion 102a, which contacts the brushes 39, and a coil connector 102b, which is located at one end of the main portion 102a. The coils 100 are coupled to the coil connectors 102b. Each coil connector 102b has slot to receive and hold and an end of a coil (see FIG. 64). The insulator 101 includes a large diameter portion 101a and a small diameter portion 101b. The segments 102 are located on the outer circumference of the large diameter portion 101a.

In the first embodiment, the coils 41 are connected to every third one of the segments 40 as shown in FIG. 4. In this case, the segments 40 that are not connected to the coils 41 never receive electric current. In other words, the segments 40 that receive current exist among the segments 40 that receive no current. Therefore, if the direct-current motor 31 is used over an extended period, the segments 40 are worn by different degrees depending on whether current is supplied or not. This makes the outer circumference of the commutator 38 uneven.

In this embodiment, however, short-circuit lines 103 connect the segments 102 to one another in addition to the coils 100 wound about the teeth 98. Therefore, when the motor is operating, the all the segments 102 receive current.

Figure 63:
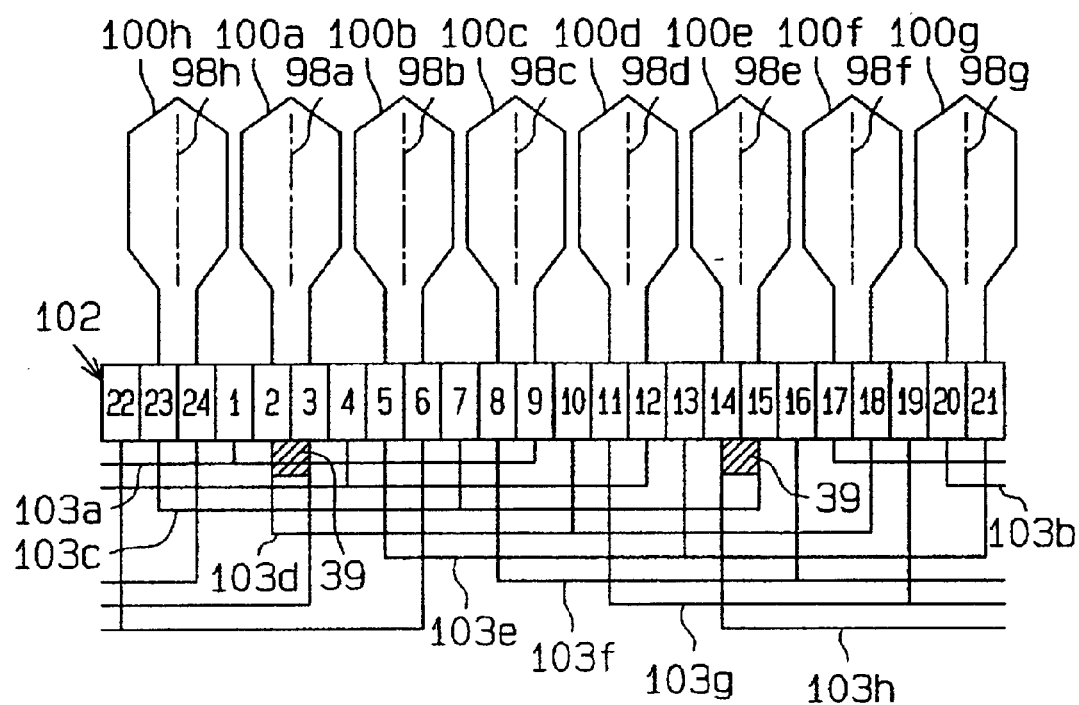
FIG. 63 is a developed diagram showing the coil structure of the armature shown in FIG. 57.

FIG. 63 is a developed diagram showing the coil structure of the armature 91. The first to twenty-fourth segments 102 are denoted by numbers 1 to 24 in FIG. 63. Also, the first to eighth teeth 98, the first to eighth core coils 100, and the first to eighth short-circuit lines 103 are distinguished by adding the signs a, b, c, d, e, f, g, h to the numerals.

In this embodiment, one of the short-circuit lines 103 establishes a short circuit in three of the segments 102 that are in the same phase. Since the motor of this embodiment is six-pole eight-slot type, a group of every eighth segment 102 is in the same phase.

Specifically, the first short-circuit line 103a establishes a short circuit in the first segment 1, the ninth segment 9 and the seventeenth segment 17. The second short-circuit line 103b establishes a short circuit in the fourth segment 4, the twelfth segment 12 and the twentieth segment 20. The third short-circuit line 103 establishes a short circuit in the seventh segment 7, the fifteenth segment 15 and the twenty-third segment 23. The fourth short-circuit line 103d establishes a short circuit in the tenth segment 10, the eighteenth segment 18, and the second segment 2. The fifth short-circuit line 103e establishes a short circuit in the thirteenth segment 13, the twenty-first segment 21 and the fifth segment 5. The sixth short-circuit line 103f establishes a short circuit in the sixteenth segment 16, the twenty-fourth segment 24 and the eighth segment 8. The seventh short-circuit line 103g establishes a short-circuit in the nineteenth segment 19, the third segment 3, and the eleventh segment 11. The eighth short-circuit line 103h establishes a short circuit in the twenty-second segment 22, the sixth segment 6, and the fourteenth segment 14.

The first core coil 100a, which is wound about the first tooth 98a, is connected to the second segment 2 and the third segment 3. The second core coil 100b, which is wound about the second tooth 98b, is connected to the fifth segment 5 and the sixth segment 6. The third core coil 100c, which is wound about the third tooth 98c, is connected to the eighth segment 8 and the ninth segment 9. The fourth core coil 100d, which is wound about the fourth tooth 98d, is connected to the eleventh segment 11 and the twelfth segment 12. The fifth core coil 100e, which is wound about the fifth tooth 98e, is connected to the fourteenth segment 14 and the fifteenth segment 15. The sixth core coil 100f, which is wound about the sixth tooth 98f, is connected to the seventeenth segment 17 and the eighteenth segment 18. The seventh core coil 100g, which is wound about the seventh tooth 98g, is connected to the twentieth segment 20 and the twenty-first segment 21. The eighth core coil 100h, which is wound about the eight tooth 98h, is connected to the twenty-third segment 23 and the twenty-fourth segment 24. In this manner, each core coil 100, which is wound about one of the teeth 98, is connected to an adjacent pair of the segments 102.

The core coils 100 are not connected to any of the first segment 1, the fourth segment 4, the seventh segment 7, the tenth segment 10, the thirteenth segment 13, the sixteenth segment 16, the nineteenth segment 19, and the twenty-second segment 22. Each of these segments 1, 4, 7, 10, 13, 16, 19, 22 is connected to the center portion of the corresponding one of the short-circuit lines 103. That is, each of the segments 102 that is not connected to the core coils 100 is connected to other two of the segments 102 through the corresponding one of the short-circuit lines 103.

The core coils 100 and the short-circuit lines 103 are connected to the commutator 94 in the following manner. First, the short-circuit lines 103 are connected to the segments 102. Specifically, the center portion of each of the short-circuit lines 103a to 103h is bent. Each bent portion is held by the coil connector 102b of a segment 102 that is not connected to any core coils 100. Thus, each of the short-circuit lines 103a to 103h is V-shaped and arranged along the circumference of the insulator 101. The ends of the line 103 are held by the coil connectors 102b of the segments 102 that are away from the segment 102 holding the center potion by eight consecutive segments 102.

Figure 64:
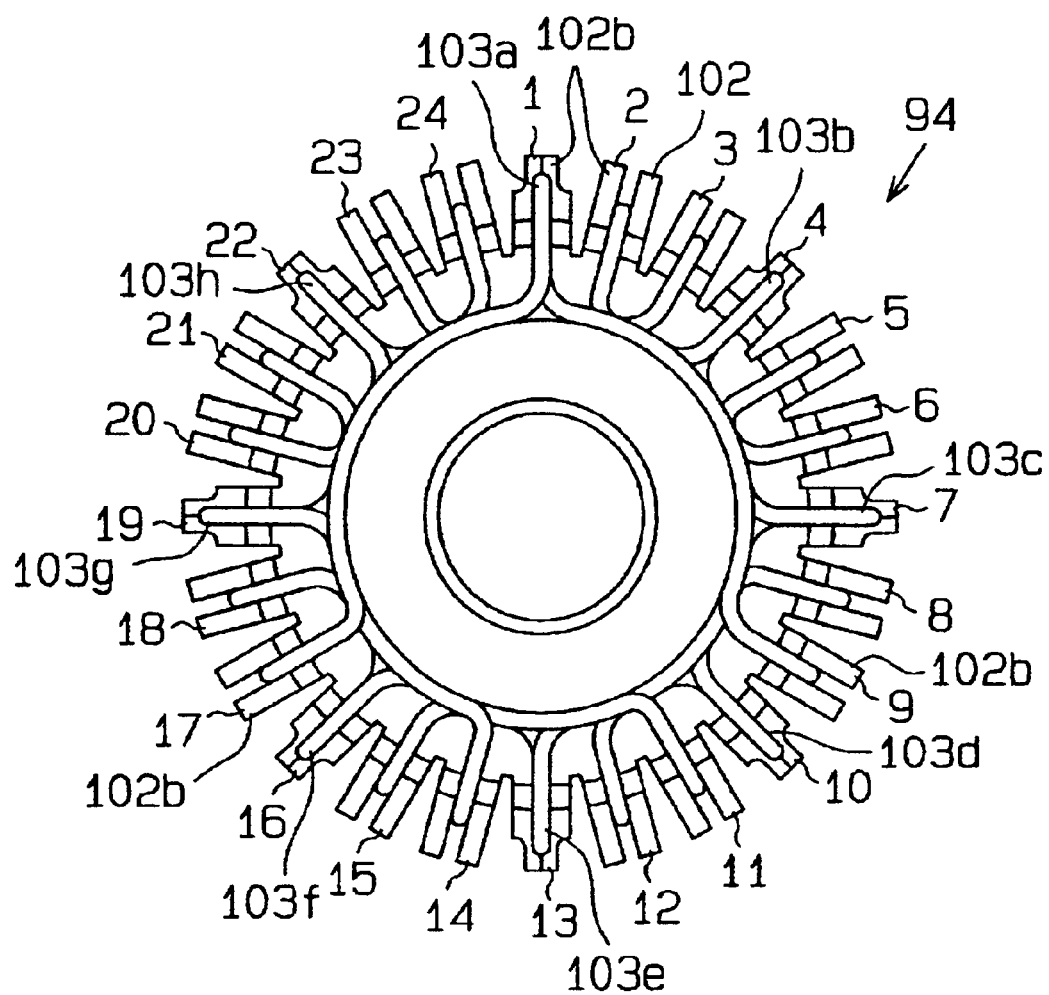
FIG. 64 is a plan view showing the procedure for attaching short-circuit lines to the commutator shown FIG. 62.

For example, the first short-circuit line 103a is bent at the center and fitted in the coil connector 102b of the first segment 1. One end of the first short-circuit line 103a is fitted to the coil connector 102b of the ninth segment 9, and the other end of the first short-circuit line 103 is fitted in the coil connector 102b of the seventeenth segment 17. Also, each of the other short-circuit lines 103b to 103h is held by the coil connector 102 of the corresponding segment 102. The center portion of each short-circuit line 103 is fuse welded to the associated coil connector 102b. FIG. 64 shows a state in which the center portion of each short-circuit line 103 has been fuse welded to the corresponding segments 102 (the first segment 1, the fourth segment 4, the seventh segment 7, the tenth segment 10, the thirteenth segment 13, the sixteenth segment 16, the nineteenth segment 19, the twenty-second segment 22).

Thereafter, each coil connector 102b holding the end of the corresponding short-circuit line 103 receives the end of the coil 100 wound about a tooth 98. For example, the coil connector 102b of the ninth segment 9 holds one end of the first short-circuit line 103a and one end of the third core coil 100c, and the coil connector 102b of the seventeenth segment 17 holds the other end of the first short-circuit line 103a and one end of the six core coil 100f. After the coils 100 are held by the coil connectors 102b, the coils 100 are fuse welded to the coil connectors 102b. Accordingly, the short-circuit lines 103 and the core coils 100 are electrically connected to the segments 102.

Each short-circuit line 103 is bent to be V-shaped at the center and the bent portion is connected to one of the segments 102. The ends of each short-circuit line 103 are connected to the corresponding segments 102, to which the ends of the corresponding core coils 100 are connected. Therefore, each segment 102 is connected to two lines, which equalizes the connecting (fusing) condition in all the segments 102. Thus, each connection is mechanically and electrically stable.

The sixth embodiment is applied to the six-pole eight-slot direct-current motor, which has twenty-four segments and the coils wound in a concentrated manner. Three of the segments 102 in the same phase are connected to one another by the corresponding short-circuit line 103 and are connected to two of the core coils 100. Therefore, when each brush 39 contacts any one of the three segments 102, which are connected to one another by the corresponding short-circuit line, current through the short-circuit line 103 is equal to the current through the core coil 100 regardless of the contacting position of the brush 39.

Figure 65:
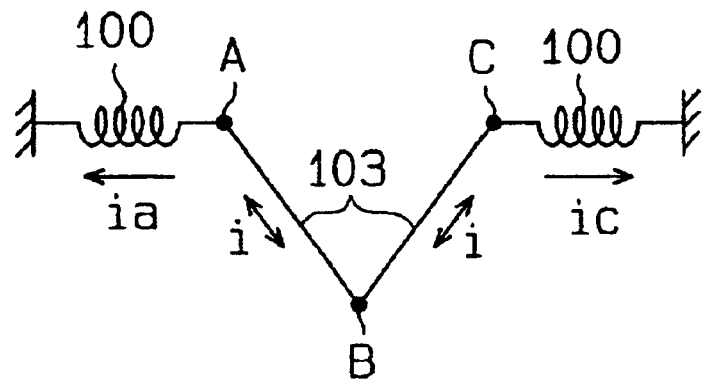
FIG. 65 is a circuit diagram showing currents through a short circuit lines and the core coils in the armature 57 shown in FIG. 57.

Referring to FIG. 65, the relationship between the current through one of the short-circuit lines 103 and the current though the corresponding core coils 100 will be discussed. In FIG. 65, the three of the segments 102 are denoted by signs A, B and C. When one of the segments A, B, C contacts one of the brushes 39 and is supplied with a current ($2i$), the current ia from the segment A to the corresponding core coil 100, the current ic from the segment C to the corresponding core coil 100, and the current i in the short-circuit line 103 are equalized (i=ia=ic).

Figure 66:
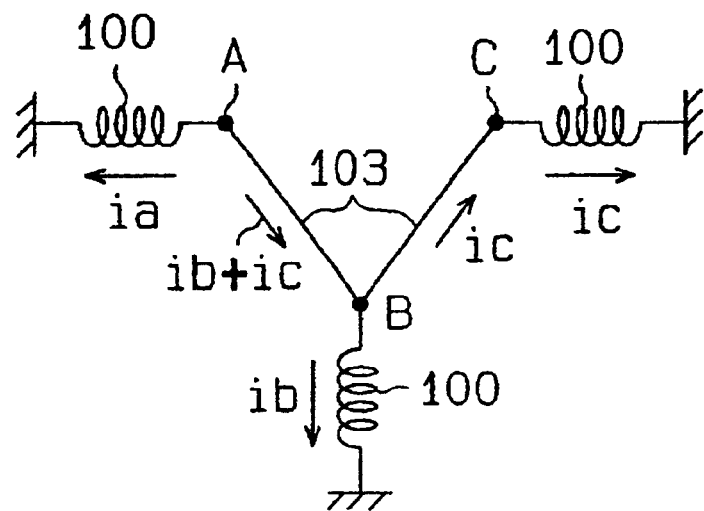
FIG. 66 is a circuit diagram showing currents through short circuit lines and core coils in an armature of a comparison example.
Figure 68:
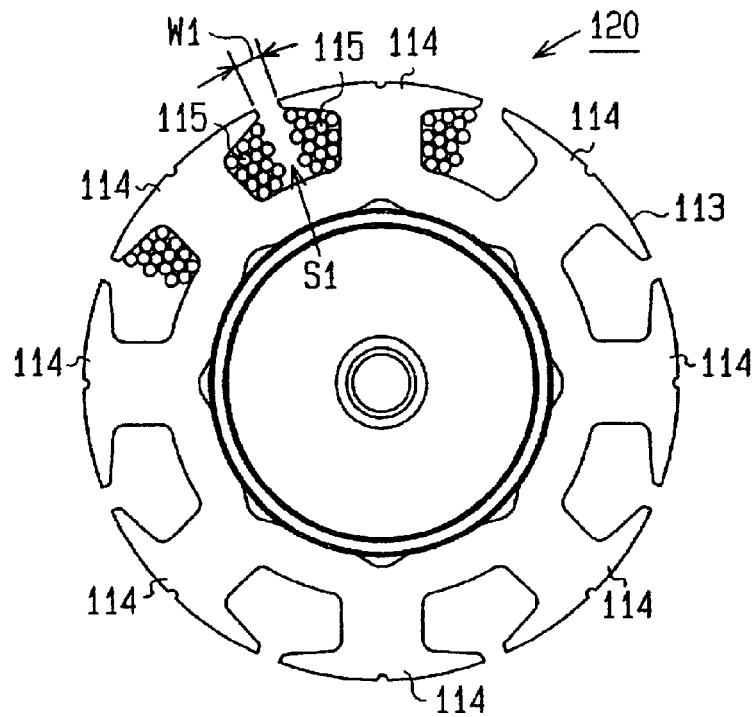
FIG. 68 is a plan view showing a prior art armature.
Figure 69:
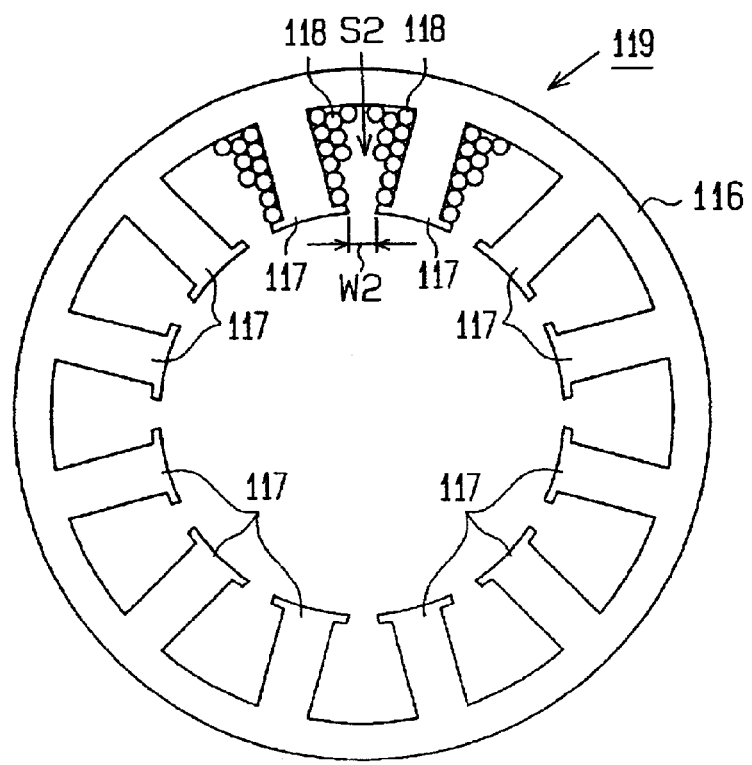
FIG. 69 is a plan view showing another prior art armature.

If the sixth embodiment is applied to the six-pole twenty-four-slot direct-current motor in which the coils wound in laps, each segment A, B, C is connected a core coil 100 as shown in FIG. 66. Therefore, when one of the brushes 39 contacts the segment A, the current ib flows from the segment B to the corresponding core coil 100, and the current ic flows from the segment C to the corresponding core coil 100. In this case, the sum of the currents ib, ic (ib+ic) flows in the short-circuit line 103 between the segments A and B. The short-circuit line 103 receives the current twice as great as that in each core coil 100. Thus, the size of the short-circuit line 103 needs to be increased. Alternatively, the segments A and C need to be connected by another short-circuit line so that the circuit is A-shaped rather than V-shaped.

However, in the sixth embodiment, the current i in the short-circuit line 103 is equal to the currents ia, ic in the core coils 100. Thus, there is no need for increasing the size of the short-circuit line 103 or for connecting the segments A and C. Thus, the short-circuit line 103 is relatively short and occupies relatively small space.

The sixth embodiment has the following advantages.

(1) The core 93 includes the stacked first and second core pieces 95, 96. Each core piece 95, 96 has the teeth 98, about each of which a core coil 100 is wound. Since the coils 100 are wound before assembling the first and second core pieces 95, 96, a relatively large space exists at each circumferential end of each tooth 98 when a coil 100 is wound thereabout. Therefore, like the third embodiment, the space factor of each core coil 100 is increased. Thus, the radial dimension and the axial dimension of the direct-current motor is reduced, and vibration and noise are reduced.

(2) Each of the first and second core pieces 95, 96 is formed as an integral member with magnetic powder through compression molding. Thus, the number of parts in the motor is reduced.

(3) Each short-circuit line 103 establishes a short circuit between one of the segments 102 to which no core coil 100 is connected and two of the segments 102 to which the corresponding core coils 100 are connected. When the motor is operating, all of the twenty-four segments 102 receive current. Therefore, the segments 102 are not worn by different degrees depending on whether current is supplied or not. This reduces vibration and noise.

Since all the segments 102 at the same phase are connected to one another by the corresponding short-circuit line 103, the number of the brush 39 can be two as illustrated in the embodiment. That is, compared to the motor 31 of the first embodiment, which uses the six brushes 39, the motor of the present invention requires fewer brushes 39, which reduces the costs.

(4) Each short-circuit line 103 is V-shaped and is located on the outer circumference of the insulator 101. The center of each V-shaped line 103 is connected to one of the segments 102 that are not connected to any core coil 100. The centers of the V-shaped short-circuit coils 103 are connected to every third segment 102. This structure prevents the weight balance from being degraded by the short-circuit lines 103 and thus maintains a preferable weight balance of the armature 91.

(5) The center of each short-circuit line 103 is connected to one of the segments 102. Then, the ends of the short-circuit line 103 are connected to two other segments 102, to which the corresponding coils 100 are connected. This structure permits the short-circuit lines 103 and the core coils 100 to be easily connected to the segments 102 of the commutator 94.

It should be apparent to those skilled in the art that the present invention may be embodied in many other specific forms without departing from the spirit or scope of the invention. Particularly, it should be understood that the invention may be embodied in the following forms.

In the first and second core pieces 51, 52 according to the third embodiment, the separate tooth members 55 are attached to the integral tooth member 54. However, the first and second core pieces 51, 52 may be different. Specifically, as in the sixth embodiment, each of the first and second core pieces 51, 52 may be formed as a single member by compression molding magnetic powder. This structure reduces the number of the parts in the direct-current motor.

In the illustrated embodiments and the modifications of the embodiments, the present invention is applied to the direct-current motors. However, the present invention may be applied to any rotation apparatus other than electric motor.

Therefore, the present examples and embodiments are to be considered as illustrative and not restrictive and the invention is not to be limited to the details given herein, but may be modified within the scope and equivalence of the appended claims.

What is claimed is:

1. The rotation apparatus comprising:

a rotor having a plurality of teeth, wherein a coil is wound about each tooth;

a commutator secured to the rotor, wherein the commutator is connected to the coils;

wherein the rotor includes at least a first core piece and a second core piece, wherein each core piece includes a ring having a plurality of first engaging portions, the teeth extending radially from each ring, and wherein the teeth of each core have a plurality of second engaging portions, each of which corresponds to one of the first engaging portions of the other core piece; and wherein the core pieces are assembled when the first engaging portions of the first core piece are engaged with the second engaging portions of the second core piece and the first engaging portions of the second core piece are engaged with the second engaging portions of the first core piece.

2. The rotation apparatus according to claim 1, wherein each core piece formed from magnetic powder through compression molding such that each tooth is integrated with the corresponding ring.

3. The rotation apparatus according claim 1 further comprising a stator having a plurality of magnetic poles, wherein the number of the magnetic poles is six, and the number of the teeth is eight, and wherein each coils is wound about the corresponding tooth in a concentrated manner.

4. The rotation apparatus according claim 1, wherein the commutator includes a substantially cylindrical insulator and a plurality of segments arranged about the insulator, wherein each end of each coil is connected to one of the segments, and wherein each of the segments that are not connected to the coils is connected to two of the segments that are connected to the coils by a short-circuit line.

5. The rotation apparatus according to claim 4, wherein each short-circuit line connects one of the segments that are not connected to the coils with two other segments that are spaced from the one segment in the opposite directions along the circumference of the commutator.

6. The rotation apparatus according to claim 4, wherein the center portion of each short circuit line is bent, wherein the bent portion is connected to one of the segments that are not connected to the coils, and wherein the ends of each short-circuit line is connected to two of the segments that are not connected to the coils.

7. The rotation apparatus according to claim 1, wherein an insulator is attached to each tooth, each of the coils is wound about the insulator on the corresponding tooth.

8. The rotation apparatus according to claim 1, wherein, when the core pieces are assembled, each tooth of one of the core pieces is located between the adjacent two teeth of the other core piece.

9. The rotation apparatus according to claim 1, wherein each of the first engaging portions of each core piece is part of an outer circumference of the ring.

* * * * *

UNITED STATES PATENT AND TRADEMARK OFFICE
CERTIFICATE OF CORRECTION

PATENT NO.     : 6,819,025 B2
DATED          : November 16, 2004
INVENTOR(S)    : K. Egawa et al.

It is certified that error appears in the above-identified patent and that said Letters Patent is hereby corrected as shown below:

Column 23,
Line 44, the word "The" should be changed to -- A --;

Coulmn 24,
Line 13, the word -- is -- should be inserted before the word "formed"; and
Line 16, the word -- to -- should be inserted before the word "claim".

Signed and Sealed this

Fifth Day of April, 2005

JON W. DUDAS
*Director of the United States Patent and Trademark Office*